(12) United States Patent
Ikäheimo

(10) Patent No.: US 12,701,070 B2
(45) Date of Patent: *Aug. 4, 2026

(54) ACTIVE ASSURANCE OF NETWORK SLICES

(71) Applicant: Juniper Networks, Inc., Sunnyvale, CA (US)

(72) Inventor: Jorma Ikäheimo, Oulu (FI)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/814,045

(22) Filed: Aug. 23, 2024

(65) Prior Publication Data

US 2024/0422090 A1 Dec. 19, 2024

Related U.S. Application Data

(63) Continuation of application No. 17/455,214, filed on Nov. 16, 2021, now Pat. No. 12,074,780.

(Continued)

(51) Int. Cl.
*H04L 43/50* (2022.01)
*H04L 41/08* (2022.01)
(Continued)

(52) U.S. Cl.
CPC .......... *H04L 43/50* (2013.01); *H04L 41/0816* (2013.01); *H04L 41/0853* (2013.01);
(Continued)

(58) Field of Classification Search
CPC ......... H04L 43/50; H04L 41/145; H04L 1/24; H04L 43/20; H04L 41/40; H04L 41/0895
See application file for complete search history.

(56) References Cited

U.S. PATENT DOCUMENTS

| | | | | |
|---|---|---|---|---|
| 7,159,021 B2 * | 1/2007 | Boldman | ................ | H04L 43/50 |
| | | | | 714/724 |
| 8,248,958 B1 * | 8/2012 | Tulasi | .................... | H04L 43/50 |
| | | | | 370/241 |

(Continued)

FOREIGN PATENT DOCUMENTS

| | | |
|---|---|---|
| CN | 109981771 A | 7/2019 |
| CN | 111181801 A | 5/2020 |

(Continued)

OTHER PUBLICATIONS

"COVID-19 makes universal digital access and cooperation essential: UN tech agency," United Nations, May 5, 2020, Retrieved from the Internet from URL: https://news.un.org/en/story/2020/05/1063272, 3 pp.

(Continued)

*Primary Examiner* — Alex Tran
(74) *Attorney, Agent, or Firm* — Shumaker & Sieffert P.A.

(57) ABSTRACT

A method includes receiving, by a computing system, a declarative testing descriptor for active testing of a network slice implemented by first virtualized services in a network; receiving, by the computing system and from an orchestration layer, metadata associated with the network slice; determining, by the computing system and based on the declarative testing description and the metadata, active testing configuration for testing the network slice; and starting an active test according to the active testing configuration and determining service level violations based on a result of the active test.

20 Claims, 27 Drawing Sheets

Related U.S. Application Data

(60) Provisional application No. 63/261,943, filed on Sep. 30, 2021, provisional application No. 63/114,444, filed on Nov. 16, 2020.

(51) Int. Cl.

| | |
|---|---|
| *H04L 41/0816* | (2022.01) |
| *H04L 41/0853* | (2022.01) |
| *H04L 41/5019* | (2022.01) |
| *H04L 43/55* | (2022.01) |
| *H04L 67/10* | (2022.01) |

(52) U.S. Cl.
CPC ...... *H04L 41/0883* (2013.01); *H04L 41/5019* (2013.01); *H04L 43/55* (2022.05); *H04L 67/10* (2013.01)

(56) References Cited

U.S. PATENT DOCUMENTS

| | | | | |
|---|---|---|---|---|
| 9,444,717 | B1 * | 9/2016 | Aithal | H04L 41/0897 |
| 9,560,081 | B1 | 1/2017 | Woolward | |
| 9,571,394 | B1 | 2/2017 | Sivaramakrishnan et al. | |
| 9,882,784 | B1 * | 1/2018 | Lotfi | H04L 41/145 |
| 9,917,745 | B2 * | 3/2018 | Aldrin | H04L 43/55 |
| 10,015,098 | B2 * | 7/2018 | Chu | H04L 45/24 |
| 10,187,287 | B2 * | 1/2019 | Viswanathan | H04L 43/50 |
| 10,581,687 | B2 | 3/2020 | Singh et al. | |
| 10,708,082 | B1 | 7/2020 | Bakiaraj et al. | |
| 10,728,145 | B2 | 7/2020 | Rao et al. | |
| 10,735,300 | B1 * | 8/2020 | Willson | H04L 43/16 |
| 10,779,178 | B1 | 9/2020 | Ramanathan et al. | |
| 10,841,196 | B2 * | 11/2020 | Menon | H04L 43/0829 |
| 10,880,173 | B2 * | 12/2020 | Seenappa | H04L 41/5058 |
| 10,938,706 | B1 * | 3/2021 | Zacks | H04L 43/14 |
| 10,963,349 | B2 * | 3/2021 | Dhamdhere | G06F 11/1438 |
| 10,983,897 | B2 * | 4/2021 | Epperlein | G06F 11/3698 |
| 11,012,343 | B2 * | 5/2021 | Nahata | G06F 9/45558 |
| 11,042,474 | B2 * | 6/2021 | Rodrigues | G06F 11/3692 |
| 11,128,556 | B2 * | 9/2021 | Prasad | G06F 9/45558 |
| 11,307,967 | B2 * | 4/2022 | Zhang | G06F 11/3684 |
| 11,350,294 | B1 * | 5/2022 | Balmakhtar | H04W 24/04 |
| 11,366,744 | B2 * | 6/2022 | Sherafat Kazemzadeh | H04L 67/34 |
| 11,425,049 | B2 | 8/2022 | Zhang et al. | |
| 11,463,327 | B2 | 10/2022 | Chen et al. | |
| 11,575,572 | B2 | 2/2023 | Nagaprakash et al. | |
| 11,659,420 | B2 * | 5/2023 | Ramanathan | H04L 43/20 455/67.11 |
| 11,936,548 | B2 | 3/2024 | Wennerström et al. | |
| 12,074,780 | B2 | 8/2024 | Ikäheimo | |
| 2010/0082316 | A1 * | 4/2010 | Chawla | H04L 41/0869 703/13 |
| 2015/0229549 | A1 | 8/2015 | Ennis | |
| 2018/0167285 | A1 * | 6/2018 | Constantinescu | H04L 43/50 |
| 2018/0239647 | A1 | 8/2018 | Tsai et al. | |
| 2018/0241627 | A1 * | 8/2018 | Rodrigues | H04L 41/0813 |
| 2018/0288129 | A1 | 10/2018 | Joshi et al. | |
| 2019/0116110 | A1 * | 4/2019 | Raney | G06F 8/60 |
| 2019/0174449 | A1 | 6/2019 | Shan et al. | |
| 2020/0076685 | A1 | 3/2020 | Vaidya et al. | |
| 2020/0133688 | A1 * | 4/2020 | Shinde | G06F 9/45558 |
| 2020/0177457 | A1 | 6/2020 | Seenappa et al. | |
| 2020/0221346 | A1 * | 7/2020 | Park | H04W 16/02 |
| 2020/0314015 | A1 | 10/2020 | Mariappan et al. | |
| 2021/0153044 | A1 * | 5/2021 | Ramanathan | H04W 24/08 |
| 2021/0226849 | A1 * | 7/2021 | Malhotra | H04L 41/0894 |
| 2021/0297318 | A1 * | 9/2021 | Chatterjee | H04L 41/145 |
| 2022/0095122 | A1 * | 3/2022 | Emani | H04L 41/22 |
| 2022/0124150 | A1 | 4/2022 | Alagna et al. | |
| 2022/0138081 | A1 * | 5/2022 | Varma | G06F 11/3684 717/124 |
| 2022/0158912 | A1 | 5/2022 | Ikäheimo | |
| 2022/0279420 | A1 | 9/2022 | Akkipeddi et al. | |
| 2023/0007576 | A1 | 1/2023 | Akman | |
| 2024/0048471 | A1 | 2/2024 | Wennerström et al. | |

FOREIGN PATENT DOCUMENTS

| | | | |
|---|---|---|---|
| EP | 3681105 | A1 | 7/2020 |
| WO | 2013184846 | A1 | 12/2013 |
| WO | 2017053961 | A1 | 3/2017 |
| WO | 2017144432 | A1 | 8/2017 |
| WO | 2019197487 | A1 | 10/2019 |
| WO | 2022074435 | A1 | 4/2022 |

OTHER PUBLICATIONS

Accelerate, "State of DevOps Report 2019", Dora Devops Research and Assessment, Sep. 23, 2020, 82 pp., Retrieved from the Internet: https://services.google.com/fh/files/misc/state-of-devops-2019.pdf.

Amazon, "Sustainability in the Cloud", Retrieved from the Internet on, Jan. 16, 2021, from URL: https://sustainability.aboutamazon.com/environment/the-cloud?energyType=true, 25 pp.

Amazon, "Testing—ACK", AWS, Oct. 12, 2020, 5 pp., http://web.archive.org/web/20200820041536/https://aws.github.io/aws-controllers-k8s/dev-docs/testing/.

Amazon, "Using Helm with Amazon EKS", AWS, Retrieved from the Internet on, Sep. 28, 2020, from URL: https://docs.aws.amazon.com/eks/latest/userguide/helm.html, 3 pp.

Arkko, "Service-Based Architecture in 5G", Sep. 2017, 4 pp., Retrieved from the Internet: URL: https://www.ericsson.com/en/blog/2017/9/service-based-architecture-in-5g.

Bäckström et al., "Benefits of Kubernetes on bare metal cloud infrastructure", Ericsson, Retrieved from the Internet on, Oct. 22, 2020, URL: https://www.ericsson.com/en/blog/2020/3/benefits-of-kubernetes-on-bare-metal-cloud-infrastructure, 4 pp.

Balasubramaniam, "End to End Network Slicing in 5G System: 3GPP Standards Perspective", Nokia, 2016, 22 pp., (Applicant points out, in accordance with MPEP 609.04(a), that the year of publication, 2016, is sufficiently earlier than the effective U.S. filing date, so that the particular month of publication is not an issue.).

Betz et al., "Understanding kubernetes net-working: pods", Medium.com, Oct. 26, 2017, 10 pp., Retrieved from the Internet: URL: medium.com /google-cloud/understanding-kubernetes-networking-pods-7117dd28727.

Bias et al., "The History of Pets vs Cattle and How to Use the Analogy Properly", cloudscaling, Sep. 26, 2016, 4 pp., Retrieved from the Internet: URL: http://cloudscaling.com/blog/cloud-computing/the-history-of-pets-vs-cattle/.

Burns et al., "Managing Kubernetes: Operatng Kubernetes Clusters in the Real World", O'Reilly Media, Dec. 25, 2018, pp. 10, 43-44, and 37-38.

Chaos Mesh, "A Chaos Engineering Platform for Kubernetes", Github, Retrieved from the Internet on, Oct. 15, 2020, 7 pp., from URL https://github.com/chaos-mesh/chaos-mesh . . . .

Chaos Mesh, "IOChaos Experiment", 2 pp., Retrieved from the Internet on Oct. 15, 2020 from URL: https://chaos-mesh.org/docs/user_guides/timechaos_experiment.

Chaos Mesh, "IOChaos Experiment", 7 pp., Retrieved from the Internet on Oct. 15, 2020 from URL: https://chaos-mesh.org/docs/0.9.1/user_guides/iochaos/ . . . .

Chaos Mesh, "KernelChaos Experiment", Retrieved from the Internet on, Oct. 15, 2020, URL: https://chaos-,esh.org/docs/user_guides/kernelchaos_experiment, 4 pp.

Chaos Mesh, "PodChaos Experiment", Retrieved from the Internet on, Oct. 15, 2020, from URL: https://chaos-mesh.org/docs/user_guides/podchaos_experiment, 3 pp.

Chaos Mesh, "StressChaos Experiment", Retrieved from the Internet on, Oct. 15, 2020, from URL: https://chaos-mesh.org/docs/user_guides/stresschaos_experiment, 3 pp.

Choas Mesh, "NetworkChaos Experiment", Retrieved from the Internet on, Oct. 15, 2020, from URL: https://chaos-mesh.org/docs/user_guides/networkchaos_experiment, 4 pp.

Cisco, "Cisco Virtualized Infrastructure Manager Installation Guide, 3.2.2", Cisco Install and Upgrade Guides, Jan. 29, 2020, 84 pp.

(56) References Cited

OTHER PUBLICATIONS

CNCF, "CNCF Survey 2019", Tech. Report, Retrieved from the Internet on, Sep. 28, 2020, from https://www.cncf.io/wp-content/uploads/2020/08/CNCF_Survey_Report.pdf, 16 pp.

Docker, Inc., "Docker Overview", Jul. 9, 2016, 10 pp., Retrieved from docs.docker.com/engine/understanding-docker.

Ericsson, "Cloud Execution Environment", Retrieved from the Internet:, Oct. 22, 2020, from URL: www.ericsson.com /en/portfolio/digital-services/cloud-infrastructure/cloud-execution-environment, 2 pp.

Ericsson, "Cloud native network applications for 5G—Ericsson", 2020, 2 pp., Retrieved from the Internet on Sep. 16, 2020: URL: https://www.ericsson.com/en/digital-services/cloud-infrastructure/cloud-native.

Ericsson, "Edge computing—a must for 5G success", Retrieved from the Internet on, Jun. 8, 2022, URL: https://www.ericsson.com/en/digital-services/edge-computing, 12 pp.

Ericsson, "Edge computing and 5G", Tech. Report, Jun. 2019, 8 pp., Retrieved from the Internet: URL: https://attom.tech/wp-content/uploads/2019/10/edge-computing-and-5g.pdf.

Ericsson, "Ericsson Technology Review Cloud-Native Application Design", Tech. Report, Jun. 5, 2019, 11 pp.

Ericsson, "NFVI providing low risk transformation and TCO", Retrieved from the Internet on, Sep. 16, 2020, from URL: https://www.ericsson.com/en/portfolio/digital-services/cloud-infrastructure/nfvi, 2pp.

Ericsson, "Why you should be taking note of cloud native NFVI", Sep. 23, 2020, 2 pp., Retrieved from the Internet on Oct. 22, 2020 from URL: https://www.ericsson.com/en/portfolio/digital-services/cloud-infrastructure/cloud-native-infrastructure.

ESTI GS NFV 001 V1.1.1 et al., "Network Functions Virtualisation (NFV); Use Cases", Oct. 2013, 50 pp., Retrieved from the Internet: URL: https://www.etsi.org/deliver/etsi_gs/NFV/001_099/001/01.01.01_60/gs_NFV001v010101p.pdf.

ETSI GS NFV-MAN 001 V1.1.1, "Network Functions Virtualisation (NFV); Management and Orchestration", Tech. Report, Dec. 2014, 184 pp.

ETSI TS 123 501 V15.5.0, "System architecture for the 5G system (5GS)", ETSI, Apr. 2019, 242 pp.

ETSI TS 123 501 V16.6.0, "5G; System architecture for the 5G System (5GS) (3GPP TS 23.501", Version 16.6.0, Release 16, Oct. 2020, 450 pp.

ETSI TS 123 502 V15.2.0, "5G; Procedures for the 5G System", Jun. 2018, 311 pp.

ETSI TS 138 300 V16.4.0, "5G; NR; NR and NG-RAN Overall Description; Stage-2", ETSI, Jan. 2021, 151 pp.

Foukas et al., "Network Slicing in 5G: Survey and Challenges", IEEE Communications Magazine, vol. 55, No. 5, May 12, 2017, pp. 94-100.

github.com, "aligungr/UERANSIM", Retrieved from the Internet on, Jun. 22, 2022, 2 pp., from URL: https://github.com/aligungr/UERANSIM.

github.com, "aligungr/UERANSIM," Retrieved from the Internet: URL: https://github.com/aligungr/UERANSIM/blob/master/config/free5gc-gnb.yaml on Jun. 7, 2022.

github.com, "aligungr/UERANSIM," Retrieved from the Internet: URL: https://github.com/aligungr/UERANSIM/blob/master/config/free5gc-ue.yaml on Jun. 7, 2022.

github.com, "CNF Conformance", Retrieved from the Internet on, Oct. 30, 2020, 2 pp., from https://github.com/cncf/cnf-conformance.

github.com, "DataDog/extendeddaemonset", Retrieved from the Internet: URL: https://github.com/DataDog/extendeddaemonset on Jun. 1, 2022, 11 pp.

github.com, "kubernetes/client-go," Retrieved from the Internet: URL: https://github.com/kubernetes/client-go on Jun. 7, 2022.

github.com, "open5gs-ue", Ueransim Master Config., 2 pp., Retrieved from the Internet Aug. 19, 2022, https://raw.githubusercontent.com/aligungr/UERANSIM/master/config/open5gs-ue.yaml.

github.com, "spf13/cobra," Retrieved from the Internet: URL: https://github.com/spf13/cobra on Jun. 7, 2022.

github.com, "Support removing ephemeral container from pod", Nov. 5, 2019, 13 pp., Retrieved from the Internet on Sep. 28, 2020 from https://github.com/kubernetes/kubernetes/issues/84764.

Gitlab, "GitLab Runner Helm Chart", Retrieved from the Internet on, Sep. 28, 2020, from URL: https://docs.gitlab.com/runner/install/kubernetes.html, 20 pp.

Helm, "Celebrating Helm's CNCF Graduation", Apr. 30, 2020, 3 pp., Retrieved from the Internet on Sep. 28, 2020 from URL: https://helm.sh/blog/celebrating-helms-cncf-graduation/.

Helm, "Charts", 2020, 23 pp., Retrieved from the Internet on Sep. 12, 2020 from: https://helm.sh/docs/topics/charts/.

Helm, "Helm Hub datadog 7 for Kubernetes", 10 pp., Retrieved from the Internet on Sep. 12, 2020 from https://artifacthub.io/packages/helm/datadog/datadog.

Helm, "Helm Hub jaeger 1.19.2 for Kubernetes", 11 pp., Retrieved from the Internet on Sep. 12, 2020 from https://artifacthub.io/packages/helm/jaegertracing/jaeger.

Helm, "Helm Hub", 110 pp., Retrieved from the Internet on Sep. 28, 2020 from http://web.archive.org/web/20200819091041/https://hub.helm.sh/.

Helm, "Helm", 2020, 4 pp., Retrieved from the Internet on Sep. 12, 2020 from URL: https://helm.sh/.

Helm, "newrelic-infrastructure 1.26.1 for Kubernetes / Helm Hub / Monocular", 8 pp., Retrieved from the Internet on Sep. 12, 2020 from URL: https://artifacthub.io/packages/helm/newrelic/newrelic-infrastructure.

Ibryam et al., "Kubernetes Patterns", O'Reilly Media, Apr. 2019, 266 pp., ISBN 9781492050285. Retrieved from the Internet: URL: https://learning.oreilly.com/library/view/kubernetespatterns/9781492050278/ . . . .

Intel Corp., "PCI-SIG SR-IOV Primer: An Introduction to SR-IOV Technology", Rev. 2.5,, Jan. 2011, 28 pp.

Intel, "PoC Demonstrates Automated Assurance and DevOps in Service Chains and 5G Network Slices", White Paper, Feb. 2017, 12 pp.

International Search Report and Written Opinion of International Application No. PCT/US2021/072446, dated Mar. 14, 2022, 15 pp.

Isberner, "A Guide to Kubernetes Admission Controllers", Kubernetes, Mar. 21, 2019, 3 pp., Retrieved from the Internet: URL: https://kubernetes.io/blog/2019/03/21/a-guide-to-kubernetes-admission-controllers/.

Juniper Networks, "Juniper Paragon Active Assurance", Juniper Networks, Engineering Simplicity, Jan. 2021, 10 pp.

Kubebuilder, "Controller Watch Functions", The Kubebuilder Book, 2020, 4 pp., Retrieved from the Internet on Sep. 14, 2020 from URL: https://book-v1.book.kubebuilder.io/beyond_basics/controller_watches.html.

Kubernetes, "Annotations", Jul. 28, 2021, 2 pp., Retrieved from the Internet: URL: https://kubernetes.io/docs/concepts/overview/working-with-objects/annotations/.

Kubernetes, "API Overview", Kubernetes API reference v1.18, Apr. 13, 2020, 1639 pp., https://kubernetes.io/docs/reference/generated/kubernetes-api/v1.18/ . . . .

Kubernetes, "Cluster Networking", Mar. 2, 2022, 5 pp., Retrieved from the Internet: URL: https://kubernetes.io/docs/concepts/cluster-administration/networking/.

Kubernetes, "Control Plane Components/Kubernetes", 2020, Retrieved from the Internet on Sep. 10, 2020 from URL: https://kubernetes.io/docs/concepts/overview/components/#control-plane-components, 4 pp.

Kubernetes, "Custom Resources", Retrieved from the Internet on, Oct. 12, 2020, from https://kubernetes.io/docs/concepts/extend-kubernetes/api-extension/custom-resources/, 8 pp.

Kubernetes, "DaemonSet", 2020, 6 pp., Retrieved from the Internet on Sep. 14, 2020 from URL: https://kubernetes.io/docs/concepts/workloads/controllers/daemonset/.

Kubernetes, "Deployments", 2020, 22 pp., Retrieved from the Internet on Sep. 14, 2020 from URL: https://kubernetes.io/docs/concepts/workloads/controllers/deployment/.

Kubernetes, "Ephemeral Containers", 2020, 2 pp., Retrieved from the Internet on Sep. 28, 2020 from URL: https://kubernetes.io/docs/concepts/workloads/pods/ephemeral-containers/.

(56) References Cited

OTHER PUBLICATIONS

Kubernetes, "Jobs", 2020, 12 pp., Retrieved from the Internet on Sep. 14, 2020 from URL: https://kubernetes.io/docs/concepts/workloads/controllers/job/.

Kubernetes, "Kubernetes Control Plane-Node Communication", 2020, 3 pp., Retrieved from the Internet on Sep. 14, 2020 from URL: https://kubernetes.io/docs/concepts/architecture/control-plane-node-communication/.

Kubernetes, "Kubernetes Deprecation Policy", 2020, 7 pp., Retrieved from the Internet on Sep. 28, 2020 from URL: https://kubernetes.io/docs/reference/using-api/deprecation-policy/.

Kubernetes, "Kubernetes End-to-end Testing for Everyone", Mar. 22, 2019, 5 pp., Retrieved from the Internet on Oct. 30, 2020 from URL: https://kubernetes.io/docs/2019/03/22/kubernetes-end-to-end-testing-for-everyone/.

Kubernetes, "Labels and Selectors", 2020, 5 pp., Retrieved from the Internet on Nov. 3, 2020 from URL: https://kubernetes.io/docs/concepts/overview/working-with-objects/labels/.

Kubernetes, "Namespaces", 2020, 3 pp., Retrieved from the Internet on Sep. 14, 2020 from URL: https://kubernetes.io/docs/concepts/overview/working-with-objects/namespaces/.

Kubernetes, "Pods", 2020, 6 pp., Retrieved from the Internet on Sep. 14, 2020 from URL: https://kubernetes.io/docs/concepts/workloads/pods/.

Kubernetes, "ReplicaSet", 2020, 9 pp., Retrieved from the Internet on Sep. 14, 2020 from URL: https://kubernetes.io/docs/concepts/workloads/controllers/replicaset/.

Kubernetes, "Service", 2020, 22 pp., Retrieved from the Internet on Oct. 15, 2020 from URL: https://kubernetes.io/docs/concepts/services-networking/service/.

Kubernetes, "Standardized Glossary", 2020, 7 pp., Retrieved from the Internet on Sep. 10, 2020 from URL: https://kubernetes.io/docs/reference/glossary/?all=true.

Kubernetes, "TTL Controller for Finished Resources", 2020, 2 pp., Retrieved from the Internet on Sep. 14, 2020 from URL: https://kubernetes.io/docs/concepts/workloads/controllers/ttlafterfinished/.

kubernetes.com, "Use Custom Resources," Retrieved from the Internet: URL: https://kubernetes.io/docs/tasks/extend-kubernetes/custom-resources/_print/ on Jun. 7, 2022, 41 pp.

Kubevirt, "Building a virtualization API for Kubernetes", KubeVirt.io, Retrieved from the Internet on, Oct. 22, 2022, from URL: https://kubevirt.io/, 3 pp.

Lowe, "Introducing Linux Network Namespaces", Scott's Weblog The weblog of an IT pro focusing on cloud computing, Kubernetes, Linux, containers, and networking, Sep. 4, 2013, 5 pp.

Maeda, "Performance evaluation of object serialization libraries in XML, JSON and binary formats", 2012 Second International Conference on Digital Information and Communication Technology and it's Applications (DICTAP), 2012, pp. 177-182, (Applicant points out, in accordance with MPEP 609.04(a), that the year of publication, 2012, is sufficiently earlier than the effective U.S. filing date, so that the particular month of publication is not in issue.).

man7.org, "ipc_namespaces(7)—Linux manual page.", Aug. 2, 2019, 2 pp., Retrieved from the Internet: URL: https://man7.org/linux/man-pages/man7/ipc_namespaces.7.html.

Martin, "Goal 9: Build resilient infrastructure, promote sustainable industrialization and foster innovation", United Nations, Aug. 11, 2020, 6 pp., Retrieved from the Internet from URL: https://www.un.org/sustainabledevelopment/infrastructure-industrialization/.

Metaswitch Networks, "What is the 5G Service-Based Architecture (SBA)?", Retrieved from the Internet on, Sep. 16, 2020, from URL: https://www.metaswitch.com/knowledge-center/reference/what-is-the-5g-service-based-architecture-sba, 4 pp.

Metaswitch Networks, "What is the 5G User Plane Function (UPF)?", Retrieved from the Internet on, Sep. 16, 2020, from URL: https://www.metaswitch.com/knowledge-center/reference/what-is-the-5g-user-plane-function-upf, 4 pp.

Microsoft, "Azure sustainability", Jan. 16, 2021, 46 pp., https://azure.microsoft.com/en-us/global-infrastructure/sustainability/.

Microsoft, "Install existing applications with Helm in Azure Kubernetes Service (AKS)", Apr. 28, 2022, 7 pp., Originally viewed on Sep. 28, 2020 from URL: https://docs.microsoft.com/en-us/azure/aks/kubernetes-helm.

Netrounds, "Netrounds Test Agents; Real-world traffic generation for automated active assurance", Netrounds AB, 2016, 8 pp., (Applicant points out, in accordance with MPEP 609.04(a), that the year of publication, 2016, is sufficiently earlier than the effective U.S. filing date, so that the particular month of publication is not an issue.).

Nokia, "DISH chooses Nokia cloud-native, 5G standalone Core software to build U.S. 5G network with scale, performance, and efficiency", Sep. 14, 2020, 4 pp., Retrieved from the Internet: URL: https://www.nokia.com/about-us/news/releases/2020/09/14/dish-chooses-nokia-cloud-native-5g-standalone-core-software-to-buildus-5g-network-with-scale-performanceand-efficiency/.

OpenStack, "OpenStack", Retrieved from the Internet on, Oct. 22, 2020, from URL: https://www.openstack.org/, 9 pp.

Pipes et al., "Introducing the AWS Controllers for Kubernetes (ACK)", AWS, Aug. 19, 2020, 7 pp., Retrieved from the Internet from URL: https://aws.amazon.com/blogs/containers/aws-controllers-for-kubernetes-ack/.

Popovski et al., "Scenarios, requirements and KPIs for 5G mobile and wireless system", Mobile and wireless communications Enablers for the Twenty-twenty Information Society, Jan. 5, 2013, 84 pp.

Prosecution History from U.S. Appl. No. 17/455,213, now issued U.S. Pat. No. 11,936,548, dated Jan. 31, 2022 through Feb. 15, 2024, 387 pp.

Prosecution History from U.S. Appl. No. 17/455,214, now issued U.S. Pat. No. 12,074,780, dated Jan. 31, 2022 through Jul. 18, 2024, 497 pp.

Prosecution History from U.S. Appl. No. 18/478,740, dated Apr. 5, 2024 through Aug. 15, 2024, 14 pp.

Rao, "5G network slicing: cross-domain orchestration and management will drive commercialization", White Paper, Analysys Mason, Sep. 2020, 22 pp.

Redhat, "What is a Kubernetes operator?", May 11, 2022, 9 pp., Retrieved from the Internet: URL: https://www.redhat.com/en/topics/containers/what-is-a-kubernetes-operator.

Response to Communication Pursuant to Rules 161(1) and 162 EPC dated Jun. 28, 2023, from counterpart European Application No. 21831467.2, filed Dec. 28, 2024, 288 pp.

Rosen et al., "BGP/MPLS IP Virtual Private Networks (VPNs)", RFC 4364, Network Working Group of Internet Engineering Task Force, Feb. 2006, 47 pp.

Shkuro, "Evolving Distributed Tracing at Uber Engineering", Uber Engineering, Feb. 2, 2017, 12 pp.

The FREE5GC Project, "free6gc", Communication Service/Software Laboratory (CS Lab), Retrieved from the Internet on, Jun. 22, 2022, 3 pp., from URL: https://www.free5gc.org/.

The FREE5GC Project, "Installing UERANSIM—a UE/RAN Simulator", Communication Service/Software Laboratory (CS Lab), Dec. 31, 2001, 8 pp., Retrieved from the Internet from URL: https://www.free5gc.org/installations/stage-3-sim-install/.

The Jaeger Authors, "Architecture", Jaeger documentation, The Linux Foundation, Retrieved from the Internet on, Oct. 13, 2020, URL: https://www.jaegertracing.io/docs/1.19/architecture/, 5 pp.

The Jaeger Authors, "Deployment", Jaeger Documentation, The Linux Foundation, Retrieved from the Internet on, Oct. 13, 2020, from https://www.jaegertracing.io/docs/1.20/.

The Jaeger Authors, "Inject Sidecar via Mutating Webhook Admission Controller", GitHub, Jan. 18, 2019, Retrieved from the Internet on Oct. 13, 2020: URL: https://github.com/jaegertracing/jaeger-operator/issues/171.

The Jaeger Authors, "Jaeger documentation", The Linux Foundation, Retrieved from the Internet on, Oct. 13, 2020, from https://www.jaegertracing.io/docs/1.20/, 3 pp.

The Jaeger Authors, "jaegeroperator/deployment_controller.go at 8c8fdf8cd8c6c7207c4199214dca69e91901elbc", Github.com, Retrieved from the Internet on, Oct. 13, 2020, from URL: https://github.com/jaegertracing/jaeger-operator/blob/8c8fdf8cd8c6c7207c4199214dca69e91901elbc/pkg/controller/deployment/deployment_controller.go, 4 pp.

(56) References Cited

OTHER PUBLICATIONS

The Jaeger Authors, "Noticing weird kubernetes pods being deployed and terminated immediately", Github, Jun. 12, 2020, 5 pp., Retrieved from the Internet: URL: https://github.com/jaegertracing/jaeger-operator/issues/1089.

The Jaeger Authors, "Operator for Kubernetes", Jaeger Documentation, The Linux Foundation, Retrieved from the Internet on, Oct. 13, 2020, from URL: https://www.jaegertracing.io/docs/1.19/operator/.

The Network Service Mesh, "What is Network Service Mesh?", Sep. 23, 2020, 5 pp., http://web.archive.org/web/20200414131411/https://networkservicemesh.io/docs/concepts/what-is-nsm/.

United Nations, "Progress towards the Sustainable Development Goals", Jul. 22, 2020, 23 pp.

United Nations, "World Population Prospects 2019", Department of Economic and Social Affairs, Population Division, United Nations, New York, 2019, 46 pp., (Applicant points out, in accordance with MPEP 609.04(a), that the year of publication, 2019, is sufficiently earlier than the effective U.S. filing date, so that the particular month of publication is not in issue.).

Veitch et al., "Managing 5G Slice Quality of Service End-to-End", Juniper Networks, Engineering Simplicity, Apr. 2021, 6 pp.

Vmware, "What is vSphere?", 7 Server Virtualization Software, Oct. 20, 2020, 5 pp., http://web.archive.org/web/20201022042927/https://www.vmware.com/products/vsphere.html.

Wiggins, "The Twelve-Factor App", Retrieved from the Internet on, Sep. 23, 2020, from URL: https://12factor.net/, 2 pp.

Notice of Allowance from U.S. Appl. No. 18/478,740 dated Nov. 18, 2024, 7 pp.

Response to Final Office Action dated Aug. 15, 2024 from U.S. Appl. No. 18/478,740, filed Oct. 29, 2024, 8 pp.

Response to Communication pursuant to Article 94(3) EPC dated Mar. 5, 2025, from counterpart European Application No. 21831467.2 filed Jul. 2, 2025, 14 pp.

Communication pursuant to Article 94(3) EPC from counterpart European Application No. 21831467.2 dated Mar. 5, 2025, 5 pp.

* cited by examiner

The Operator

*Template-driven Declarative Active Testing and Monitoring*

- Talks with the K8s API
- Orchestrates Tests and Monitors
  - ○ Collect, match, start, stop...
- Populates Template Inputs
- Resource Matching
  - ○ K8s resources by metadata
  - ○ Remote Agents by tags
- ... and deploys Agent Sidecars!

Node to Node

```
apiVersion: observability.example.com/v1alpha1
kind: Monitor
metadata:
  name: scenario-1
spec:
  templateId: 1
  agents:
    - name: geared-marsupi
      selector:
        matchLabels:
          "app": "geared-marsupi-agent"
      inputs:
        clients:
          type: interface_list
          agents: [geared-marsupi]
        cc_rate:
          type: float
          value: 0.1
        rate:
          type: float
          value: 1.0
``` ta-edge14
Tokyo, Japan

Uptime: 05:10:44
Version: 3.0.0.23
Memory: 20.38% CPU: 14.26%
Load avg: 0.06 (1 minute) 0.07 (5 minutes) 0.09 (15 minutes)
Login towards: ncc.text.netrounds.com6000

| INTERFACE | INTERFACES (METADATA) | APPLICATIONS | RAN | STREAMS | LICENSE | UTILS | GPS LOCATION | PLATFORM INFORMATION |

4G eNodeB    5G gNodeB    UE

+    ⊤    ↓    ☑ ∨    ✎ ∨    ☐ Delete all

| Name ● | IMSI | IMEI | SIM ● | DHCP ● | Network search | | Tags ☐ |
|--------|------|------|-------|--------|----------------|---|--------|

CLEAR enb1
| ☐ | ue1 | 1019191919 | 1019191919 | server | 10.88.3.100 | ● |
| ☐ | ue2 | 1019191919 | 1019191919 | server | <none> | ○ |

· · · gnb4
| ☐ | ue1 | 1019191919 | 1019191919 | soft | 10.160.0.14 | ● |
| ☐ | ue2 | 1019191919 | 1019191919 | soft | 10.154.0.13 | ● |

Page  1  of 1  I< < > >I

FIG. 20

Testing network slices #2 (UE/gNB separate objects)

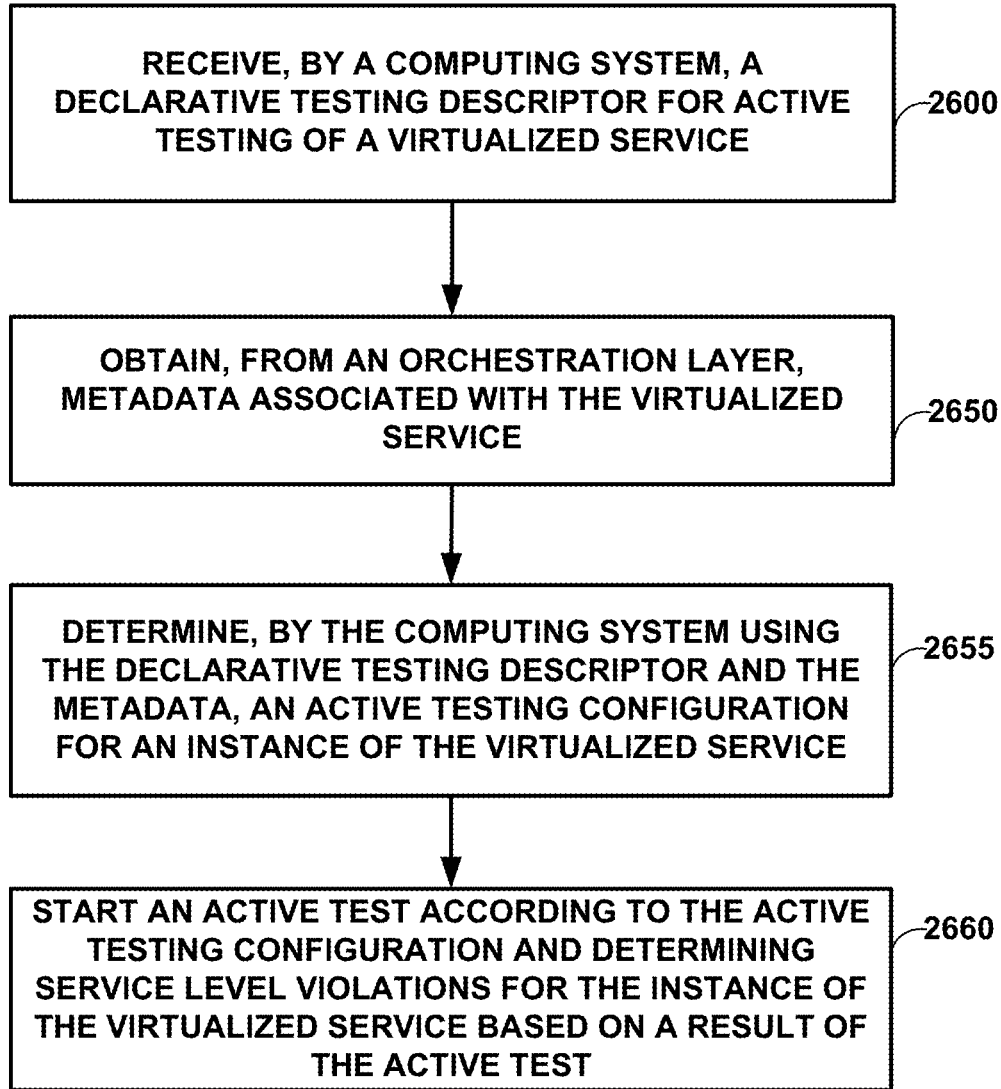

RECEIVE, BY A COMPUTING SYSTEM, A DECLARATIVE TESTING DESCRIPTOR FOR ACTIVE TESTING OF A VIRTUALIZED SERVICE — 2600

OBTAIN, FROM AN ORCHESTRATION LAYER, METADATA ASSOCIATED WITH THE VIRTUALIZED SERVICE — 2650

DETERMINE, BY THE COMPUTING SYSTEM USING THE DECLARATIVE TESTING DESCRIPTOR AND THE METADATA, AN ACTIVE TESTING CONFIGURATION FOR AN INSTANCE OF THE VIRTUALIZED SERVICE — 2655

START AN ACTIVE TEST ACCORDING TO THE ACTIVE TESTING CONFIGURATION AND DETERMINING SERVICE LEVEL VIOLATIONS FOR THE INSTANCE OF THE VIRTUALIZED SERVICE BASED ON A RESULT OF THE ACTIVE TEST — 2660

FIG. 26

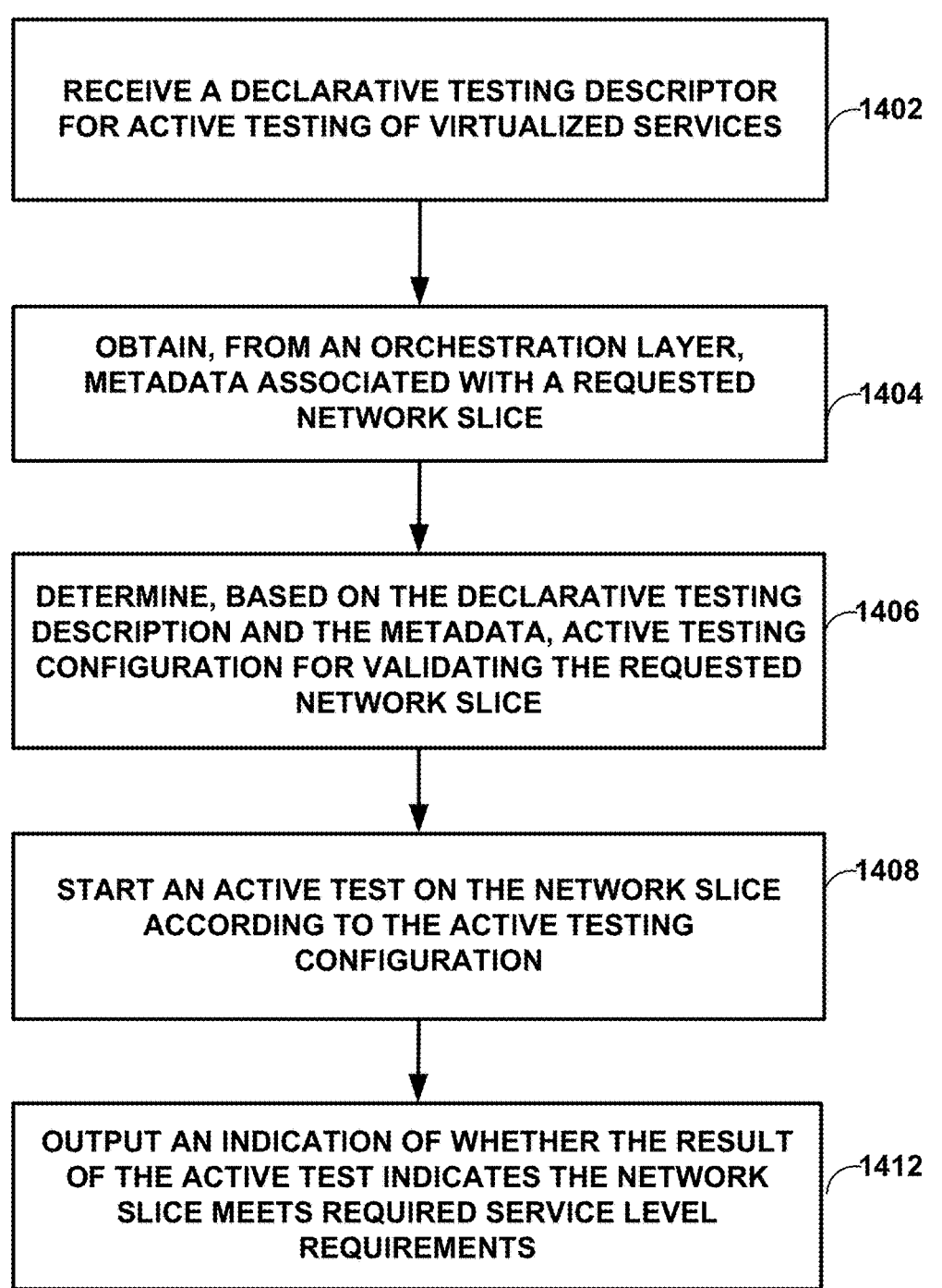

RECEIVE A DECLARATIVE TESTING DESCRIPTOR FOR ACTIVE TESTING OF VIRTUALIZED SERVICES ⌐1402

OBTAIN, FROM AN ORCHESTRATION LAYER, METADATA ASSOCIATED WITH A REQUESTED NETWORK SLICE ⌐1404

DETERMINE, BASED ON THE DECLARATIVE TESTING DESCRIPTION AND THE METADATA, ACTIVE TESTING CONFIGURATION FOR VALIDATING THE REQUESTED NETWORK SLICE ⌐1406

START AN ACTIVE TEST ON THE NETWORK SLICE ACCORDING TO THE ACTIVE TESTING CONFIGURATION ⌐1408

OUTPUT AN INDICATION OF WHETHER THE RESULT OF THE ACTIVE TEST INDICATES THE NETWORK SLICE MEETS REQUIRED SERVICE LEVEL REQUIREMENTS ⌐1412

FIG. 27

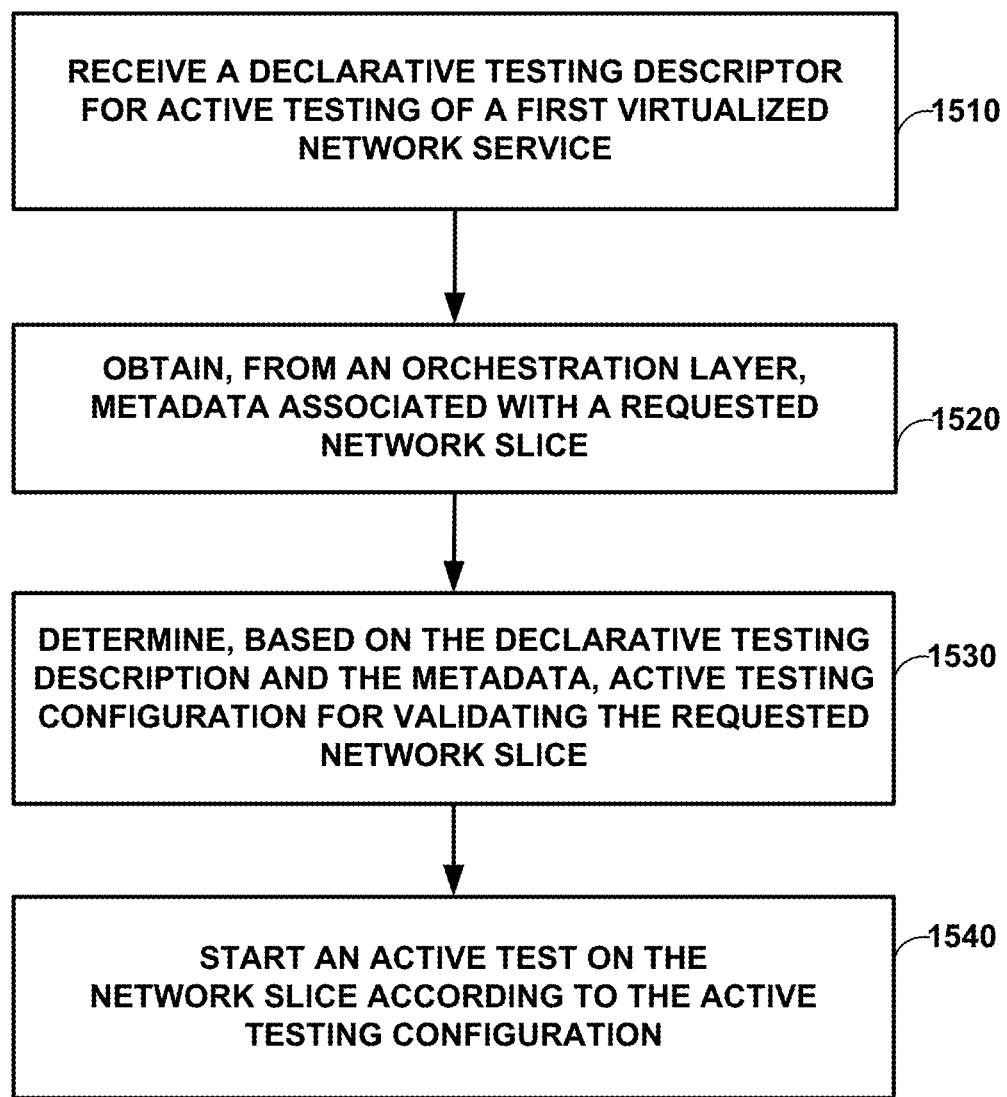

RECEIVE A DECLARATIVE TESTING DESCRIPTOR
FOR ACTIVE TESTING OF A FIRST VIRTUALIZED
NETWORK SERVICE — 1510

OBTAIN, FROM AN ORCHESTRATION LAYER,
METADATA ASSOCIATED WITH A REQUESTED
NETWORK SLICE — 1520

DETERMINE, BASED ON THE DECLARATIVE TESTING
DESCRIPTION AND THE METADATA, ACTIVE TESTING
CONFIGURATION FOR VALIDATING THE REQUESTED
NETWORK SLICE — 1530

START AN ACTIVE TEST ON THE
NETWORK SLICE ACCORDING TO THE ACTIVE
TESTING CONFIGURATION — 1540

FIG. 28

ACTIVE ASSURANCE OF NETWORK SLICES

This application is a continuation of U.S. application Ser. No. 17/455,214, filed Nov. 16, 2021, which claims the benefit of U.S. Provisional Patent Application No. 63/261,943, filed 30 Sep. 2021 and U.S. Provisional Patent Application No. 63/114,444, filed 16 Nov. 2020, the entire content of each of which being incorporated by reference herein.

TECHNICAL FIELD

The disclosure relates to monitoring services provided by virtual execution elements (e.g., virtual machines or containers) deployed to virtualized computing infrastructure within a network.

BACKGROUND

Computer networks have become ubiquitous and the number of network applications, network-connected devices, and types of network-connected devices rapidly expanding. Such devices now include computers, smart phones, Internet-of-Things (IoT) devices, cars, medical devices factory equipment, etc. An end-user network-connected device typically cannot directly access a public network such as the Internet. Instead, an end-user network device establishes a network connection with an access network, and the access network communicates with a core network that is connected to one or more packet data networks (PDNs) offering services. There are several different types of access networks currently in use. Examples include Radio Access Networks (RANs) that are access networks for 3rd Generation Partnership Project (3GPP) networks, trusted and untrusted non-3GPP networks such as Wi-Fi or WiMAX networks, and fixed/wireline networks such as Digital Subscriber Line (DSL), Passive Optical Network (PON), and cable networks. The core network may be that of a mobile service provider network, such as a 3G, 4G/LTE, or 5G network.

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical central processing unit (CPU), virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise information technology (IT) staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). These systems are characterized by being dynamic and ephemeral, as hosted services can be quickly scaled up or adapted to new requirements. Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for monitoring services provided by virtual execution elements. Active monitoring is performed to provide active assurance. The active monitoring is configured using a declarative testing descriptor. Metadata is received by a monitoring operator from an orchestration layer of a system, such as a Kubernetes platform. the metadata is associated with a plurality of services provided by the virtual execution elements, such as Kubernetes services, for example. The monitoring operator determines an active testing configuration using the declarative testing description and the metadata. In some examples, active monitoring of the services is performed based on the active testing configuration, and service level requirement violations for the service can be determined based on the active test results.

Active monitoring/testing refers to active network probing techniques (e.g., sending test packets), as opposed to passive monitoring in which network traffic itself is monitored without sending separate test packets. The active testing configuration includes test agents that send active probes to determine network quality. The test agents can be deployed as a Kubernetes pod that hosts containers, a virtual machine, or as an appliance, for example. A monitoring operator, e.g., a Kubernetes operator, reads the labels of services and provides test agent IP addresses and tags, service endpoints, template names and parameters to a central control center that orchestrates the monitoring. The central control center then instantiates the test agents and services based on the configuration provided by the monitoring operator. Where a Kubernetes external test agent is used, tags/labels are used to bind the test agent to the service. Due to the declarative testing descriptor and the metadata, the test agent can automatically and dynamically update the testing configuration as updates occur to the virtual execution elements. The techniques described herein can provide a technical advantage over other approaches such as manually updating testing configuration, which would become impractical or unfeasible at scale in a dynamic virtualized environment.

In some examples described herein, the active assurance techniques may be used for automatically setting up and performing active monitoring of a network slice in response to the network slice being created. The active monitoring is configured using a declarative testing descriptor. Metadata about a network slice is received by a monitoring operator from an orchestration layer of a system, such as a Kubernetes platform. The monitoring operator determines an association between the metadata and a plurality of RAN element simulation services provided by virtual execution elements, such as based on labels of the virtual execution elements. The monitoring operator determines an active testing configuration using the declarative testing description and the metadata. In some example uses, the active testing configuration may include provisions for validating the network slice in a simulated environment using virtual execution elements that simulate elements of a Radio Access Network. After validating the network slice with emulated UEs and gNodeBs, the network slice is used in the mobile network. In some examples, active monitoring of the network slice operation is performed based on the active testing configuration, and service level requirement violations for the network slice can be determined based on the active test results.

In the case of monitoring network slices, the techniques disclosed herein can provide a technical advantage over previous systems by automatically enabling active monitoring of a network slice upon creation of the network slice, without requiring manual placement and removal of virtual execution elements for simulating RAN functions of the network slice for testing purposes. As a practical application of the techniques described in this disclosure, the monitoring operator automatically detects metadata associated with a network slice being created and connects appropriate virtual execution elements (e.g., Kubernetes resource instances) for testing and monitoring the network slice based on a service type found in the metadata.

Applications integrated with the monitoring operator can provide fine-grained common control to monitoring services, authentication services, network slicing services, resource management services. Thus, the monitoring operator can be integrated with the orchestrator to provide a platform for testing and monitoring network slices, such as across 5G core networks and RANs. A service-oriented view of network slices, access networks, and core networks, and the active assurance monitoring thereof, facilitates software-defined networking (SDN) and network function virtualization (NFV) that allow the implementation of flexible and scalable network services on top of differing underlying network infrastructures.

In one example, this disclosure describes a method that includes receiving, by a computing system, a declarative testing descriptor for active testing of a virtualized service; obtaining, from an orchestration layer, metadata associated with the virtualized service, wherein the metadata specifies a unique name for a virtualized service within the namespace of a cluster managed by the orchestration layer; determining, by the computing system using the declarative testing descriptor and the metadata, an active testing configuration for an instance of the virtualized service; and starting an active test according to the active testing configuration and determining service level violations for the instance of the virtualized service based on a result of the active test.

In one example, this disclosure describes a computing system that includes processing circuitry coupled to a memory device, the processing circuitry configured to: receive a declarative testing descriptor for active testing of a first virtualized service; obtain, from an orchestration layer, metadata associated with a requested network slice, the network slice implemented by the first virtualized services, wherein the metadata specifies a unique name for the first virtualized service within a namespace of a cluster managed by the orchestration layer; determine, based on the declarative testing descriptor and the metadata, an active testing configuration for validating the requested network slice, the active testing configuration including test configuration parameters, placement of a test agent, and simulation elements to be assigned for validating the requested network slice and implemented by second virtualized services; start an active test on the network slice using the simulation elements according to the active testing configuration; and output an indication of whether a result of the active test indicates the network slice meets service level requirements.

In another example, this disclosure describes a method that includes receiving, by a computing system, a declarative testing descriptor for active testing of virtualized services in a network; obtaining, from an orchestration layer, metadata associated with a requested network slice, the network slice implemented by first virtualized services; determining, by the computing system and based on the declarative testing description and the metadata, active testing configuration for validating the requested network slice, the active testing configuration including test configuration parameters, placement of a test agent, and simulation elements to be assigned for validating the requested network slice and implemented by second virtualized services; starting an active test on the network slice using the simulation elements according to the active testing configuration; determining, by the computing system, whether a result of the active test indicates the network slice meets required service level requirements; and outputting an indication of whether the result of the active test indicates the network slice meets required service level requirements.

In another example, this disclosure describes a method that includes receiving, by a computing system, a declarative testing descriptor for active testing of a network slice implemented by first virtualized services in a network; receiving, by the computing system and from an orchestration layer, metadata associated with the network slice; determining, by the computing system and based on the declarative testing description and the metadata, active testing configuration for testing the network slice; and starting an active test according to the active testing configuration and determining service level violations based on a result of the active test.

The details of one or more embodiments of this disclosure are set forth in the accompanying drawings and the description below. Other features, objects, and advantages will be apparent from the description and drawings, and from the claims.

BRIEF DESCRIPTION OF DRAWINGS

FIG. 20 is an example user interface display for configuring simulated Radio Access Network (RAN) elements such as UEs.

FIGS. 26-28 are flowcharts illustrating example operation of a computing system, in accordance with one or more techniques of this disclosure.

Like reference characters denote like elements throughout the description and figures.

DETAILED DESCRIPTION

Figure 1:
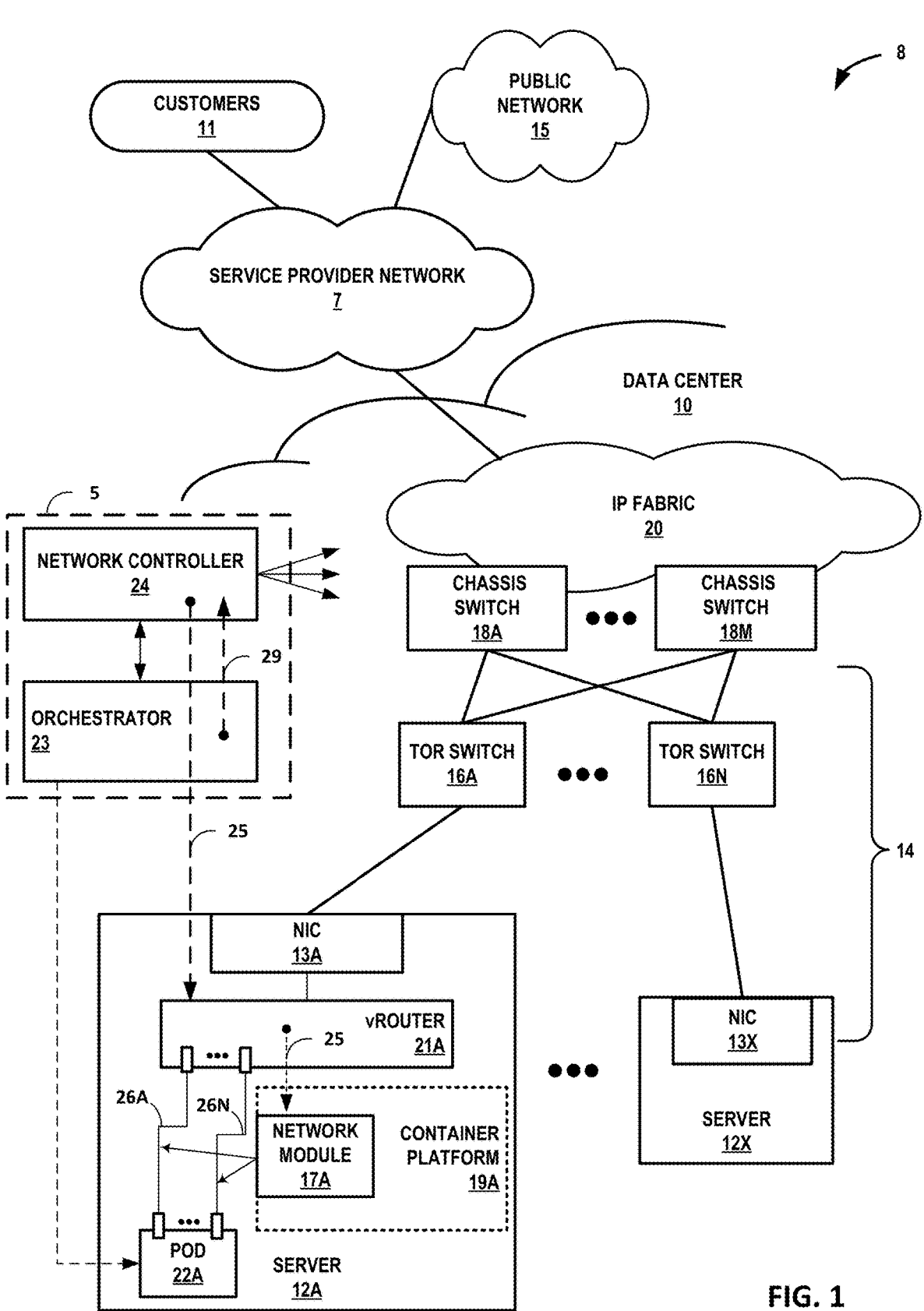
FIG. 1 is a block diagram illustrating an example computing infrastructure 8 in which examples of the techniques described herein may be implemented.

The number of mobile devices is ever-increasing and sets new demands on the telecommunications network infrastructure that is becoming ever more critical. Use cases include, among other things, mobile broadband, autonomous driving, massive Internet of Things (IoT) systems, and Content Delivery Network (CDN) and must be considered for the future infrastructure.

The 5G infrastructure is one of the main driving factors for massive networks of connected devices and services. It is envisioned that many businesses will run their systems on the infrastructure that allows them to move processing closer to the end users or devices. This will require guarantees on available resources and service level agreements-giving rise to new concepts such as 5G network slicing that allow the isolation between services that run on the infrastructure.

Producers of telecommunications equipment and carriers are moving towards a cloud native approach where they provide an execution platform for software defined containerized Network Functions (CNFs) and Virtualized Network Functions (VNFs) in a cloud on top of the physical infrastructure. This Network Function (NF) execution environment brings the flexibility of locating the processing of content closer to the consumer by providing mobile edge computing, but also hosting other services in a cloud farther from the consumer for services where the latency may not matter as much.

Vendors are aiming for a cloud native approach that incorporates Kubernetes (abbreviated as "Kubernetes") as an underlying orchestration engine and execution environment for deploying CNFs on bare metal and closer to the edge. The Kubernetes container orchestration system and related projects in the Cloud Native Computing Foundation (CNCF) portfolio is a large ecosystem that is extensible allowing for many components to inter-operate together following a micro-services architecture. Kubernetes brings, among other things, easier lifecycle management NFs and less overhead by eliminating the virtualization layer that VNFs requires.

These clouds with isolated network slices and edge computing capabilities may benefit from active monitoring and testing, to ensure the function and service level agreement between devices and services that run as CNFs in a Kubernetes environment. In some examples, in accordance with one or more techniques of this disclosure, test agents are available as hardware and software containers. The test agents can produce traffic to validate and monitor the network functions. Tools are configured and deployed using the Control Center User Interface (UI) that is hosted as a web application. In some examples the functionality may be provided as a Software as a Service (SaaS) and an on-premises offering. The SaaS instance is managed and hosted by an operator while the on-premises offering can be hosted on the customers' hardware.

This disclosure describes techniques for integrating an active assurance platform with a Kubernetes ecosystem in the context of network slicing, for active testing of simulated network slices and/or active monitoring of deployed network slices. This disclosure describes how active testing can be aligned to work with the dynamic cluster environment with ephemeral components that Kubernetes brings.

FIG. 1 is a block diagram illustrating an example computing infrastructure 8 in which examples of the techniques described herein may be implemented. In general, data center 10 provides an operating environment for applications and services for customer sites 11 (illustrated as "customers 11") having one or more customer networks coupled to the data center by service provider network 7. Data center 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10 may host multiple tenants (customers) each associated with one or more virtual private networks (VPNs), each of which may implement one of customer sites 11.

Service provider network 7 offers packet-based connectivity to attached customer sites 11, data center 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "hosts" or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10 may also include one or more physical network functions (PNFs) such as physical firewalls, load balancers, routers, route reflectors, broadband network gateways (BNGs), Evolved Packet Cores or other cellular network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center 10 is merely an example. Other switching architectures may have more or fewer switching layers, for instance.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server, switch, or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., data center 10. Each tenant or an application can have one or more virtual networks. Each virtual network may be isolated from all the other virtual networks unless explicitly allowed by security policy.

Virtual networks can be connected to, and extended across physical Multi-Protocol Label Switching (MPLS) Layer 3 Virtual Private Networks (L3VPNs) and Ethernet Virtual Private Networks (EVPNs) networks using a datacenter 10 edge router (not shown in FIG. 1). Virtual networks may also used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in the kernels or hypervisors of the virtualized servers 12 create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not contain any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance. The schema of the messages exchanged over XMPP may accord with Mackie et. al, "BGP-Signaled End-System IP/VPNs," draft-ietf-l3vpn-end-system-06, Dec. 15, 2016, which is incorporated by reference herein in its entirety.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and provide only an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel. LXC is an operating-system-level virtualization method for running multiple isolated Linux systems (containers) on a single control host (LXC host). An LXC does not use a virtual machine (although an LXC may be hosted by a virtual machine). Instead, an LXC uses a virtual environment with its own CPU, memory, block I/O, network, and/or other resource space. The LXC resource control mechanism is provided by namespaces and cgroups in the Linux kernel on the LXC host. Additional information regarding containers is found in "Docker Overview," Docker, Inc., available at docs.docker-.com/engine/understanding-docker, last accessed Jul. 9, 2016. Additional examples of containerization methods include OpenVZ, FreeBSD jail, AIX Workload partitions, and Solaris containers. Accordingly, as used herein, the term "containers" may encompass not only LXC-style containers but also any one or more of virtualization engines, virtual private servers, silos, or jails.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts one virtual network endpoint in the form of pod 22A having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each includes at least one network interface card (NIC) 13, which each includes at least one interface to exchange packets with TOR switches 16 over a communication link. For example, server 12A includes NIC 13A. Any of NICs 13 may provide one or more virtual hardware components 21 for virtualized input/output (I/O). A virtual hardware component for I/O maybe a virtualization of a physical NIC 13 (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components 21.

As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions.

In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components 21 associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

To switch data between virtual hardware components associated with NIC 13A, internal device switch may perform layer 2 forwarding to switch or bridge layer 2 packets between virtual hardware components and the physical hardware component for NIC 13A. Each virtual hardware component may be located on a virtual local area network (VLAN) for the virtual network for the virtual network endpoint that uses the virtual hardware component for I/O. Further example details of SR-IOV implementations within a NIC are described in "PCI-SIG SR-IOV Primer: An Introduction to SR-IOV Technology," Rev. 2.5, Intel Corp., January 2011, which is incorporated herein by reference in its entirety.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22A), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Elements of the automation platform of computing infrastructure 8 include at least servers 12, orchestrator 23, and network controller 24. Virtual execution elements may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily virtual execution element hosting devices of a cluster. For example, the Kubernetes platform uses the terms "cluster master" and "minion nodes," while the Docker Swarm platform refers to cluster managers and cluster nodes.

Orchestrator 23 and network controller 24 together implement a controller 5 for the computing infrastructure 8. Orchestrator 23 and network controller 24 may execute on separate computing devices as part of a computing system, or may execute on the same computing device. Each of orchestrator 23 and network controller 24 may be a distributed application that executes on one or more computing devices of a computing system. Orchestrator 23 and network controller 24 may implement respective master nodes for one or more clusters each having one or more minion nodes implemented by respective servers 12. In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" in U.S. patent application Ser. No. 14/226,509, filed Mar. 26, 2014, and entitled "Tunneled Packet Aggregation for Virtual Networks;" and in U.S. patent application Ser. No. 17/305,110, filed Jun. 30, 2021, and entitled "Network Controller Horizontal Scaling for Network Device Configurations Session Management;" each of which is incorporated by reference as if fully set forth herein. U.S. patent application Ser. No. 14/226,509 also includes further description of a virtual router, such as virtual router 21A.

In general, orchestrator 23 controls the deployment, scaling, and operations of virtual execution elements across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform.

In one example, pod 22A is a Kubernetes pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include System V semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers.

Container platform 19A includes a network module 17A that configures virtual network interfaces for virtual network endpoints. The container platform 19A uses network module 17A to manage networking for pods, including pod 22A. For example, the network module 17A creates virtual network interfaces to connect pods to virtual router 21A and enable containers of such pods to communicate, via the virtual network interfaces, to other virtual network endpoints over the virtual networks. Network module 17A may, for example, insert a virtual network interface for a virtual network into the network namespace for containers of in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network.

Network module 17A may assign a network address (e.g., a virtual IP address for the virtual network) and may setup routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network Network module 17A may represent a library, a plugin, a module, a runtime, or other executable code for server 12A. Network module 17A may conform, at least in part, to the Container Networking Interface (CNI) specification or the rkt Networking Proposal. Network module 17A may represent a Contrail or OpenContrail network plugin. Network module 17A may alternatively be referred to as a network plugin or CNI plugin or CNI instance. For purposes of the Container Networking Interface (CNI) specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate among each other. This could be either an individual container, a machine/server (real or virtual), or some other network device (e.g., a router). Containers can be conceptually added to or removed from one or more networks.

Further examples of techniques involving virtual execution elements are described in MULTIPLE VIRTUAL NETWORK INTERFACE SUPPORT FOR VIRTUAL EXECUTION ELEMENTS, U.S. application Ser. No. 16/118,107, filed Aug. 20, 2018; and UNIFIED CONTROL PLANE FOR NESTED CLUSTERS IN A VIRTUALIZED COMPUTING INFRASTRUCTURE, U.S. application Ser. No. 16/118,731, filed Aug. 31, 2018, the entire contents of each of which are incorporated by reference herein.

In the example of FIG. 1, the orchestrator is a computing system that receives a declarative testing descriptor for active testing of a virtualized service; obtaining, from an orchestration layer, metadata associated with the virtualized service, wherein the metadata specifies a unique name for a virtualized service within the namespace of a cluster managed by the orchestration layer; determining, by the computing system using the declarative testing descriptor and the metadata, an active testing configuration for an instance of the virtualized service; and starting an active test according to the active testing configuration and determining service level violations for the instance of the virtualized service based on a result of the active test.

"Active assurance" refers to assuring that measured service levels conform to service level requirements, by active monitoring using active network probing techniques (e.g., sending test packets) such as those described above, such that remedial actions can be taken in a network if SLA requirements are not being met.

A declarative testing descriptor is a declarative input (e.g., intent-based) that is understood by monitoring operator 50. In some examples, monitoring operator 50 may enable intent-based configuration and management of network system 100. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur.

Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient.

Figure 2:
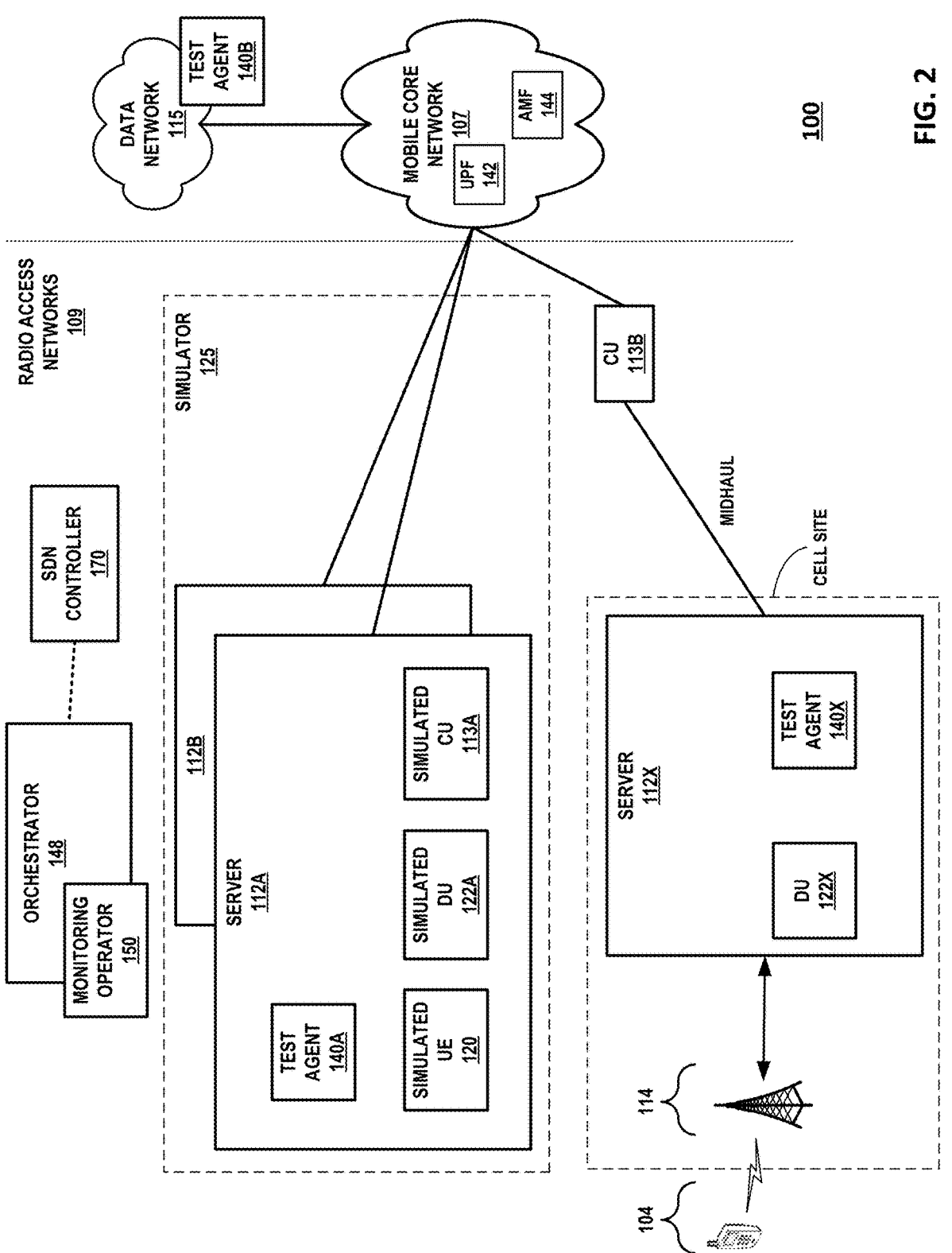
FIG. 2 is a block diagram illustrating an example mobile network system, in accordance with techniques described in this disclosure.

FIG. 2 is a block diagram illustrating an example mobile network system, in accordance with techniques described in this disclosure. Mobile network system 100 may be a 5G network that implements 5G standards promulgated by, e.g., the 3rd Generation Partnership Project (3GPP), the Open Radio Access Network ("O-RAN" or "ORAN") Alliance, the European Telecommunications Standards Institute (ETSI), the Internet Engineering Task Force (IETF), and the International Telecommunication Union (ITU).

5G networks allow for disaggregation of mobile fronthaul and midhaul networks by building then around cloud native principles. As a result, service providers may avoid becoming locked into particular appliance vendors and may combine effective solutions from different vendors at different layers and locations to build and provision the mobile network system. This can improve the radio access networks (RANs), in particular, by making them more open, resilient, and scalable.

O-RAN-based networks decompose the baseband unit (BBU) found in traditional telco networks into three functional units: a Radio Unit (RU), a Distributed Unit (DU), and a Centralized Unit (CU). Different functions of RUs, DUs, and CUs may be implemented by software executed by x86-based or ARM-based host servers. The CU can be further segregated into distinct control plane (CU-CP) and user plane (CU-UP) functions to further control user plane separation (CUPS). This decoupling helps bring flexibility to deployment-different combinations of RU, DU, and CU may be deployed at the same location, or at different locations. For example, where latency is critical, RU, DU, and CU can be placed together at the edge. DUs and CUs that conform to O-RAN are often referred to as O-DUs and O-CUs, respectively. Additional data plane elements known as user plane functions (UPFs) operate in mobile core network 107 to forward traffic between the CU and data network 115. Additional control plane elements operate in mobile core network 107. These control plane elements include Network Slice Selection Function (NSSF), Policy Control Function (PCF), Authentication Server Function (ASUF), Access and Mobility Management Function (AMF), Network Exposure Function (NEF), Network Function Repository Function (NRF), Application Function (AF), Unified Data Management (UDM), and Session Management Function (SMF).

Mobile network system 100 includes radio access networks 109 and mobile core network 107. Radio access networks 109 include RUs 114 located at various cellular network sites ("cell sites"). Each RU 114 consists of an LO PHY and a RF transmitter. The LO PHY component may be implemented using specialized hardware for high-performance packet processing.

RUs 114 connect to DUs 122A-122X (collectively, "IDUs 22") via the fronthaul network. The fronthaul network connects LO PHY and HI PHY and is used by RUs 114 and DUs 122 to implement the F2 interface of 5G. DUs 122 manage the packet transmission of radio by the RUs 114. In some cases, such packet transmission conforms to the Common Packet Radio Interface (CPRI) and/or to the enhanced CPRI (CCPRI) standard, or to IEEE 1914.3. DUs 122 may implement the Radio Link Control (RLC), Media Access Control (MAC), and the HI PHY layer. DUs 122 are at least partially controlled by CUs 113A-113B (collectively, "CUs 113").

DUs 122 connect to CUs 113 via the midhaul network, which may be used by DUs 122 and CUs 113 to implement the F1 interface of 5G. CUs 113 may implement the Radio Resource Control (RRC) and Packet Data Convergence Protocol (PDCP) layers. CUs 113 connect to mobile core network 107 via a backhaul network. The midhaul and backhaul networks may each be wide area networks (WANs).

In radio access networks 109 of mobile network system 100, the gNodeB includes one of CUs 113 and one of DUs 122. A CU may support multiple DUs to implement multiple gNodeBs. And one or more RUs may be supported by a single DU. Thus, for example with respect to FIG. 2, simulated CU 113A and simulated DU 122A and a simulated RUs may form one simulated eNodeB, while CU 113B and DU 122X (of server 112X) and one of RUs may form another eNodeB.

Any DU of DUs 122 may or may not be located at the cell site that includes the RU(s) 114 supported by the DU. Mobile network system 100 may have radio access networks 109 that include many thousands of cell sites, each having one or more RUs 114s and optionally one or more DUs 122. Whether located at a cell site or offsite, a DU is typically within 20 km of the supported RUs. CUs 113 are shown in FIG. 2 as located at a regional data center, typically within 40 km of the supported DUs 122.

Radio access networks 109 connect to mobile core network 107 to exchange packets with data network 115. Mobile core network 107 may be a 5G core network, and data network (DN) 115 may represent, for example, one or more service provider networks and services, the Internet, $3^{rd}$ party services, an IP-multimedia subsystem, or other network.

Mobile network system 100 includes multiple servers 112A-112X to execute DUs 122. Each of servers 112 may be a real or virtual server that hosts/executes software that implements DUs 122. Such software may include one or more applications deployed as, e.g., virtual machine or containers, to servers 112. While not shown in FIG. 2, CUs 113 may also be executed by servers. The combination of DUs 122, the midhaul network, CUs 113, and the backhaul network effectively implement an IP-based transport network between the radio units 114 and mobile core network 107. Further details of 5G systems are described in U.S. Provisional Patent Application No. 63/202,928, filed 30 Jun. 2021; and U.S. Provisional Patent Application No. 63/242,434, filed 9 Sep. 2021, the entire contents of each of which are incorporated by reference herein.

Orchestrator 148 represents a container orchestration platform. Orchestrator 148 orchestrates simulated UE 120, simulated DU 122, simulated CU 113, DU 22X, CU 113B and at least containerized test agents 140A, 140X of servers 112.

Containers, including those implementing simulator 125 and test agents 140, may be deployed to a virtualization environment using a cluster-based framework in which a cluster master node of a cluster manages the deployment and operation of containers to one or more cluster minion nodes of the cluster. Servers 112 or virtual machines thereon may represent cluster nodes.

In accordance with aspects of the techniques of this disclosure, orchestrator 148 includes a monitor operator 150 to manage testing of network slices deployed to system 100.

The monitor operator 150 of orchestrator 148 can deploy test agents 140A-140X (collectively, "test agents 140") as part of simulator 125 and/or to another service provider network (e.g., data network 115) to simulate and test a RAN network for a requested network slice. In addition, after the network slice has been tested and validated, monitor operator 150 may, in some examples, insert and control test agents 140 to monitor network slices in operation while transporting layer 3 packets among DUs 122, CUs 113, and mobile core network 107. Application workloads can be containerized network functions (CNFs), such as DUs 122, CUs 113, and RUs.

Orchestrator 148 and software defined network (SDN) controller 170 may execute on separate computing devices or execute on the same computing device. Each of orchestrator 148 and SDN controller 170 may each be a distributed application that executes on one or more computing devices. Orchestrator 148 and SDN controller 170 may implement master nodes for one or more clusters each having one or more minion nodes implemented by respective servers 112. In general, SDN controller 170 controls the network configuration of radio access network 109 to facilitate packetized communications among DUs 122, CUs 113, and mobile core network 107. SDN controller 170 may distribute routing and configuration information to the control plane elements of radio access networks 109. SDN controller 170 may, for instance, program segment routing headers, configure L3VPNs, configure virtual routing and forwarding instances (VRFs) in routers of radio access network 109 (including cell site routers (not shown)). SDN controller 170 may implement one or more southbound protocols for configuring router, switches, and other networks devices of the midhaul and backhaul networks. Example southbound protocols may include Path Computation Element Protocol (PCEP), BGP, Netconf, OpenConfig, and so forth. Additional information regarding L3VPNs is found in "BGP/MPLS IP Virtual Private Networks (VPNs)," Request for Comments 4364, Network Working Group of Internet Engineering Task Force, February 2006, which is incorporated by reference in its entirety.

SDN controller 170 may provide a logically and in some cases physically centralized controller. In some examples, SDN controller 170 may operate in response to configuration input received from orchestrator 48 and/or an administrator/operator. SDN controller 170 may program NFV infrastructure (NFVI) such as servers 112, network switches/routers, and/or other network infrastructure. In the case of NFVI programming, SDN controller 170 may configure aspects of the operating system kernel to configure L3 IP routing, Linux bridges, iptables, network namespaces, and/or virtual switches.

Additional information of an example SDN controller 170, virtual router, and virtual router agent is found in International Application Number PCT/US2013/044378, filed Jun. 5, 2013, and entitled "PHYSICAL PATH DETERMINATION FOR VIRTUAL NETWORK PACKET FLOWS;" U.S. patent application Ser. No. 14/226,509, filed Mar. 26, 2014, and entitled "Tunneled Packet Aggregation for Virtual Networks;" and in U.S. patent application Ser. No. 17/305,110, filed Jun. 30, 2021, and entitled "Network Controller Horizontal Scaling for Network Device Configurations Session Management;" each of which is incorporated by reference as if fully set forth herein.

In some examples, components of simulator 125, such as simulated UE 120, simulated DU 122A, and simulated CU 113A, can be integrated into a Kubernetes infrastructure by presenting the components of simulator 125 as Kubernetes resources to the orchestration platform, usable for simulating a RAN for a network slice. Thus, by deploying containerized simulator components and test agents for use as Kubernetes resources, integrating into mobile network system 100, and integrating into Kubernetes, the techniques may facilitate a cloud native experience for network slice deployment, configuration, testing, and operation monitoring. Integrating in Kubernetes permits leveraging its existing mechanism for monitoring the health of containerized network slices and restarting if necessary, along with managing the life-cycle of the network slices and in particular, containerized network slices.

Orchestrator 148 may be similar to orchestrator 23 of FIG. 1, and network controller 170 may be similar to network controller 24 of FIG. 1. Orchestrator 148 implements an automation platform for automating deployment, scaling, and operations of virtual execution elements across servers 112 to provide virtualized infrastructure for executing application workloads and services.

Server 112A includes a container platform for running containerized applications, such as one or more pods. The container platform receives requests from orchestrator 148 to obtain and host, in server 112A, containers. The container platform obtains and executes the containers. A pod is a group of one or more logically-related containers, the shared storage for the containers, and options on how to run the containers. Where instantiated for execution, a pod may alternatively be referred to as a "pod replica." A pod or each container of a pod is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Network slice testing may be performed according to techniques of the present disclosure. When a network slice is created, a network simulator is created with UE and gNB configurations by network operator. UE configuration includes configuration for UEs to be attached to the gNB including network slice identifiers and types to be used. gNB configuration includes gNB IP addresses and AMF IP address. A simulator is deployed into Kubernetes with the configurations. While deploying, simulator service is created for every UE and service type to expose services for quality assurance. Services may be labeled with labels needed by monitoring operator 50 to launch quality assurance, describing for example, slice service type and test agent to be used in quality assurance. Creation of configurations and deploying to Kubernetes may be automated. Monitoring operator 150 starts slice service verification by starting relevant tests for service level verification.

Test agents 140 may be delivered from a cloud as a Software-as-a-Service (SaaS) solution or deployed on premise in NFV environments. Test agents 140 perform service level verification, for example with a UDP test that sends constant rate UDP stream between test agents and the service level may be determined from received rate, jitter and drops between endpoints. As further examples, test agents 40 may send and/or receive test packets to compute one or more key performance indicators (KPIs) of the network, such as latency, delay (inter frame gap), jitter, packet loss, throughput, and the like. A measured service level KPI is compared to a predefined service level requirement.

Test agents 140 may send test packets in accordance with various protocols, such as Hypertext Transfer Protocol (HTTP), Internet Control Message Protocol (ICMP), Speedtest, User Datagram Protocol (UDP), Transmission Control Protocol (TCP), Operations, Administration and Maintenance (OAM) functions (e.g., Y.1731), Two-Way Active Measurement Protocol (TWAMP), Internet Protocol television (IPTV) and Over the Top (OTT) protocol, VOIP telephony and Session Initiation Protocol (SIP), mobile radio, remote packet inspection, and other protocols to measure network performance. Service level requirement verification results are collected by a control center (not shown) and may be provided to network operators. Service level requirements can be obtained from a service level agreement between a provider and a customer, for example.

The services being simulated may be Kubernetes services. Test Agents and UE/eNodeB/gNodeB services may be in the same pod, or in separate pods. The test agent 140A on simulator 125 connects to test agent 140B at data network 115 through the actual mobile core network 107, which includes UPF 142 and AMF 144. In some examples, systems or techniques according to the present disclosure may use software component(s) that emulate the RAN network 109. UE and/or eNodeB/gNodeB emulators may be used to connect test agent 140A to mobile core network 107.

In some examples, after validating the network slice in the simulated environment using the UE and/or eNodeB/gNodeB emulators, the same test agent 140A can be used for subsequent monitoring of the network slice when processing live network traffic. Test agent 140X is an example of a test agent that is used for monitoring a deployed network slice through RAN 109 and mobile core network 107 using DU 122X in the cell site and CU 113B.

Figure 3:
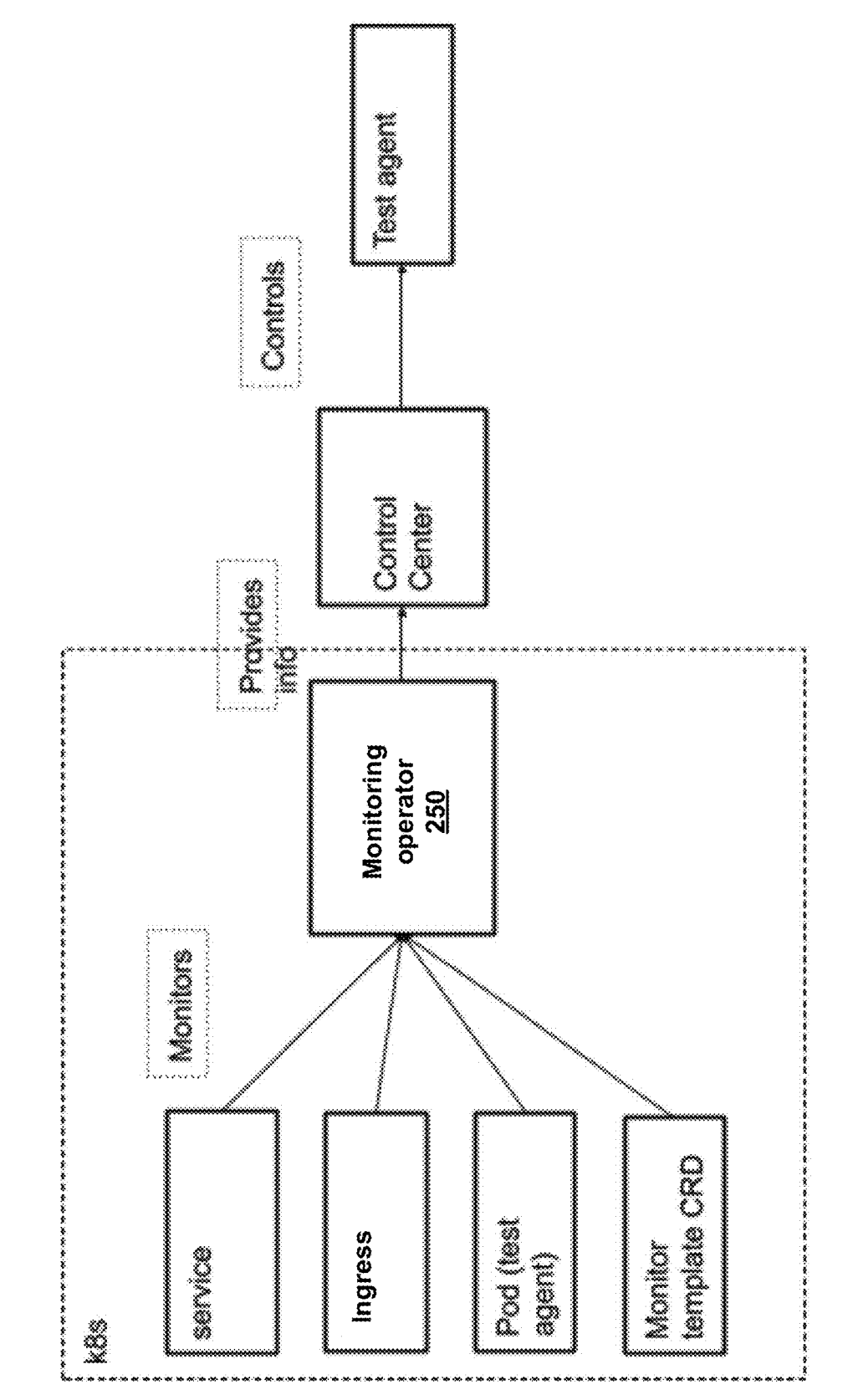
FIG. 3 is a block diagram illustrating an example computing system that includes a monitoring operator integrated with a Kubernetes platform, in accordance with techniques described in this disclosure.

FIG. 3 is a block diagram illustrating an example computing system 200 that includes a monitoring operator 250 integrated with a Kubernetes platform, in accordance with techniques described in this disclosure. The monitoring operator 250 provides information to a control center, which controls a test agent for monitoring a virtualized service. Computing system 200 provides programmable, active test and monitoring services for physical, hybrid, and virtual networks. Unlike passive monitoring approaches, this disclosure describes test agents that send active, synthetic traffic to automatically verify application and service performance at the time of service delivery and throughout the life of the service.

Active testing involves injecting time-stamped synthetic packet streams to allow proactive detection of anomalies and performance degradation in the network.

The Control Center may be a cloud-ready multitenant Control Center, which provides a user-friendly Web portal GUI which operations staff can use to run on-demand tests and view real-time and aggregated results as well as key performance indicators (KPIs) and service-level agreement (SLA) monitoring metrics. The Control Center includes a feature-rich cloud API allowing external operations support systems (OSS) and Network Functions Virtualization (NFV) orchestrators to easily automate distributed activation tests or monitoring scenarios.

The system of FIG. 3 may include additional test agents beyond those shown. The Control Center remotely controls software-based and traffic-generating Test Agents, which provide distributed measurement metrics for service activation testing, quality monitoring, and troubleshooting. The Control Center also displays detailed, real-time results and statistics actively measured by the Test Agents and reflector streams across multiple applications, services, and interfaces. Test Agent capabilities include service activation (Y.1564, MEF 48), network performance (UDP, TCP, Y.1731, TWAMP, path trace), Internet performance (HTTP, DNS), rich media (IPTV, OTT video, VoIP telephony, and SIP), as well as support for controlling Wi-Fi interfaces, and performing remote packet inspection.

Test Agents may be placed in strategic locations across a network for continuous quality monitoring. They may also be installed on demand for more temporary purposes, such as activation testing of newly deployed services. Test Agents may be deployed in any of several formats, for example: as software to be run as a virtual machine on a hypervisor, as a container application, or as a software appliance for installation on dedicated x86 hardware.

The computing system 200 provides an integrated, dynamic solution for full multilayer, multidomain service life-cycle management, that combines service activation testing, quality monitoring, and troubleshooting provide fully orchestrated assurance.

In some examples, the virtualized service is associated with a network service. In some examples, the network service is a simulated network slice or an active network slice, in accordance with example aspects of the techniques of this disclosure. According to some example aspects of the techniques of this disclosure, testing of Kubernetes services or other virtual execution element services can be orchestrated with minimal effort by labeling the existing services and ingresses and deploying the monitoring operator, monitoring templates, test agents and control center. Deploying monitoring operator, monitoring templates, test agents and control center can be done with Helm, for example. Test agents and control center can be deployed into Kubernetes cluster or appliances according to the needs of the use case. This disclosure describes a use case that employs UE/eNodeB emulation to enable 5G network slicing testing in a dynamic way.

The system of FIG. 3 provides for implementing a monitoring operator 250 that is integrated into a Kubernetes platform. In some examples, monitoring operator is configured to enable automatic monitoring of network slices. The monitoring operator 250 reads labels of Kubernetes services and ingresses and uses the labels to automatically start monitoring tasks. For example, services may be labeled with test_agent_external, http_monitor, ping_monitor. When services are deployed, corresponding monitoring functions are created and run from the labeled test agents. In the example of FIG. 3, orchestrating Test Agents is done with existing Kubernetes resources, pods, deployments, replica sets etc., which are well-suited for the tasks. In some cases, a custom resource definition (CRD) System could be used. A CRD is defined to provide parameters for monitoring. In some examples, the CRD does not bind together monitors and test agents.

EXAMPLES

```
apiVersion: example.com/vlalpha2
kind: MonitorTemplate
namespace: default
metadata:
    name: http-monitor
selector:
  matchLabels:
      Company.com/monitor: http
      endpoints:
      port: 80
Company -template:
  template: 1
  inputs:
  ratedown:
  type: integer
  value: 10
```

The services and ingresses are labelled with matching labels.

```
apiVersion: v1
kind: Service
metadata:
annotations:
labels:
app-kubernetes-io/instance: ncc
app-kubernetes-io/name: ncc
Company.com/monitor: http
Company.com/test-agent: ta-in-cluster
name: ncc
namespace: ncc
spec:
ports:
name: ncc
port: 80
protocol: TCP
targetPort: 80
selector:
app-kubernetes-io/instance: ncc
app-kubernetes-io/name: ncc
sessionAffinity: None
type: ClusterIP
status:
loadBalancer: { }
```

Example of an Ingress:

```
apiVersion: extensions/vlbeta1
kind: Ingress
metadata:
annotations:
labels:
app-kubernetes-io/instance: ncc
Company.com/monitor: http
Company.com/test-agent: ta-outside-cluster
name: ncc-https
namespace: ncc
spec:
rules:
host: app.ncctest.Company.com
http:
paths:
backend:
serviceName: ncc
servicePort: 80
path: /
pathType: ImplementationSpecific
tls:
hosts:
app.ncctest. Company.com
```

As shown in FIG. 3, active monitoring (also referred to as active testing) can be performed. The monitoring is put in place using a declarative testing descriptor. The monitoring operator 250 receives metadata from an orchestration layer of a system (e.g., Kubernetes), the metadata being associated with a plurality of services provided by the virtual execution elements. Active testing configuration is determined using the declarative testing description and the metadata. An active test is then started with the configuration applied, and service level violations can be determined based on the active test results.

A test agent is deployed separately, either as a Kubernetes pod or docker engine or as an appliance. Monitoring operator 250 reads the labels and provides test agent IP addresses and tags, service endpoints, template names and parameters to the connected control center that orchestrates the monitoring. In case a Kubernetes external test agent is used, tags/labels are used to bind it. Due to the declarative testing descriptor and the metadata, the test agent can automatically and dynamically update the testing configuration as updates occur to the virtual execution elements. Additional examples are described in U.S. Provisional Patent Application No. 63/114,444, filed 16 Nov. 2020, the entire contents of which are incorporated by reference herein.

Although described for purposes of example in terms of Kubernetes, the techniques described herein may be applied to other types of virtual execution elements. As described in further detail, the operator can, in some examples, be running on other platforms, such as a Contrail Insights platform, and OpenStack platform, a vCenter for Contrail environment, in an edge cloud use case, and in 5G systems. The techniques of this disclosure are not limited to cloud services, but may be performed in any of a cloud environment, data center environment, or on premises environment.

There are many upcoming architectures for 5G, including cloud-native 5G infrastructure. Cloud-native infrastructure relies on Software Defined Network (SDN) and a Service Based Architecture (SBA) of the 5G core system. The cloud-native 5G system architecture described in the 3GPP TS 23.501 technical specification for the 5G System (5GS) is built with NF service components that follow the micro-services design pattern. The services are part of the SBA architecture that uses a service discovery mechanism where services can discover each other and communicate, i.e., a service mesh.

The 5GS is divided into two planes, the control plane and user plane. This separation of logic is commonly called Control and User Plane Separation (CUPS). The control plane consists of NFs that are responsible for, to name a few, authentication, session management, network slice provisioning and QoS policy control. While the user plane consists of User Plane Functions (UPFs) and customer defined services that are able to run closer to the end-users or devices. The UPF is a function that is responsible for, among other things, QoS traffic shaping, traffic usage reporting, transport level packet marking, and packet routing and forwarding.

The customer defined services that require close proximity to the end-user and devices give rise to the concept of edge computing. Edge computing will give resources for running applications closer to the user when low latency and high bandwidth between devices is required, e.g., IoT use-cases. The execution environment that is provided by edge computing can be compared to a distributed cloud where computing resources are not only located in data centers, but also in nodes located close to the end-user.

A Network Functions Virtualization Infrastructure (NFVI) is an execution environment that provides a platform for vendors to deploy their VNFs and container-based applications on. The NFVI concept is not only limited to host cloud-native telecommunication components, e.g., 5G infrastructure. NFVI can be used for, among other things, content delivery networks (CDNs), Internet of Things (IoT), mobile broadband, enterprise, and media vendors as customers that can make use of NFVI.

Ultimately, the network orchestration and management of the NFVI is handled by a Network Function Virtualization (NFV) Management and Orchestration (MANO) entity. In the ETSI NFV-MANO architectural framework, major function blocks of the NFV-MANO are, among other things: NFV Orchestrator—Orchestration of NFVI resources interfacing with the Virtualized Infrastructure Managers (VIMs) mentioned below, VNF Manager—Lifecycle management of VNF instances, e.g., instantiation, modification, and upgrades, and Virtualized Infrastructure Manager (VIM)— Controls and manages NFVI compute, storage, and network resources.

The VIM function block may, in some examples, be backed by a cloud computing infrastructure, such as those provided by OpenStack and VMware. In some examples, the OpenStack platform can be used to provide compute, storage, and network capabilities. However, these VIM platforms backed by OpenStack and VMware are not the only alternatives. NFVI vendors are moving towards incorporating Kubernetes as an execution environment for NFs in their platforms. The Kubernetes environment is thought to bring, among other things, easier lifecycle management and less overhead without any virtualization layer.

The NFVI may rely on unified container and infrastructure management where it only interfaces with the Kubernetes and Helm APIs. This MANO would be able to run both containerized NFs (CNF) and VNFs. The CNFs are run by a container runtime, e.g., Docker or rkt, while the VNFs can be run using a solution like Kube Virt that give Kubernetes the capability to run virtual machine-based workloads.

3.2 Kubernetes

Kubernetes orchestrates a system of containerized process as services and monitors the health during their lifetime. The system is highly distributed and runs on top of a set of nodes, i.e., a cluster, where Kubernetes will schedule processes onto nodes in the cluster. Services may communicate with each other, allowing for a micro-services architecture where each service can do specific business logic. One can view Kubernetes as an abstraction layer that hides the underlying infrastructure and eases the deployment and life cycle management of applications.

The controlling components of Kubernetes are commonly known as the control plane components, these are components that will together observe and act to move toward a desired cluster state. There are four components that constitute a basic setup of the Kubernetes control plane, > kube-apiserver,
> etcd,
> kube-scheduler,
> kube-controller-manager.

Lastly, there are two more components in a standard Kubernetes setup, these are commonly known as node components. These components are, > Kubelet,
> kube-proxy.

The containers are managed by the Kubelet, i.e., a node agent, where both the containers and Kubelet are hosted on a worker node. Worker nodes are prefixed with worker because they handle the actual job of running the services hosted in Kubernetes. Along with the Kubelet a service called kube-proxy is also hosted on the same worker node. kube-proxy is a misnomer as the service doesn't actually do any proxying (historically it did proxy traffic); the service instead manages the rules for forwarding of traffic to PodsK behind virtual IP addresses using iptables.

3.2.1 API

The Kubernetes API is the central component of a Kubernetes cluster. All operations of a cluster are done through the Kubernetes API and is accessible by all users and processes in Kubernetes. This is known as the hub-and-spoke API pattern. The API server (e.g., kube-apiserver) that implements the Kubernetes API is in itself stateless, and state is instead stored in a storage back end, often the etcd store. By being stateless the API server can be scaled to multiple instances, which is important because the API is such a central component that handles a large number of requests. The API server implements a RESTful API over HTTP. This entails that by following the RESTful design pattern all requests that are done for an operation are defined by a path and method (i.e., HTTP method, such as GET and POST).

Available core Kubernetes operations are either behind the /api prefix, while other operations are behind an API group prefixed by /apis. The core Kubernetes API being behind the /api prefix is mostly a historical artifact, as new Kubernetes provided APIs have been added as API groups. For API groups the prefix (/apis) is followed by the group name, e.g., /apis/apps.

Furthermore, the Kubernetes API is versioned and namespaced, giving another dimension for division. Versioning is provided after the group name, using > the last example path, the path including the version could be /apis/apps/v1. The version names follow a convention that unstable APIs are named as v1alpha1 where v1 is the planned release and alpha is the stability of the API, the integer in the end is the current revision. Once the API has become generally stable, the version is moved to v1beta1, where it works like before with the alpha release regarding planned release and revision. Lastly, a stable API can be released as v1, these APIs must be guaranteed to be backward compatible and must only be replaced with a new stable release under the next version name, i.e., v2. When working on the v2 release it would follow the same pattern as described above.

Namespacing is used to provide a scope that can be used to divide a physical cluster into several virtual clusters. It is given after the version identifier, continuing with the last example, a namespace could be a project name. Calling the namespace "production," then that would give the path /apis/apps/v1/production.

Lastly the actual object to be created is given, for a deployment the path would be /apis/apps/v1/production/ deployments. The Kubernetes API supports three different encodings, JSON, YAML, and protobuf. The JSON and YAML formats are human-readable while the protobuf format is binary over the wire resulting in a more efficient serialization and throughput.

3.2.2 Controllers & Objects

Kubernetes controllers are loops that observe the state of the cluster through the previously described Kubernetes API. The controllers' mission is to try to move the state of the cluster to the wanted state from the constraints set by Kubernetes objects. These objects are resources of a specific type (a resource type is also known as Kind in the Kubernetes nomenclature). Where a resource, i.e., object, is a persistent entity within a Kubernetes cluster that represent a wanted and current state. Examples of such Kind of objects are, Pod$^K$—a Kind of an object that describes a set of containers, ReplicaSet$^K$—a Kind of an object that describes a set of replicated Pods$^K$, Deployment$^K$—a Kind of an object that helps with the life cycle management of a ReplicaSet$^K$, DaemonSet$^K$—a Kind of an objects that replicates Pods$^K$ over several nodes, Job$^K$—a Kind of an object that runs Pods$^K$ that will eventually terminate once completed.

There are more Kinds in the Kubernetes ecosystem, and one can even define their own Kinds known as Custom Resource Definitions (CRDs). The theory behind CRDs is described in Section 3.2.4 below.

As previously mentioned, these objects of a certain Kind are observed by a controller. Once an event has been observed the controller will analyze the current state of an object in Kubernetes and compare it with the specification (or Spec). This Spec is a field stored within the object that describes the wanted state of an object. In the case that differences are found, the controller will act on the behalf of the requirements of the Spec and move the state towards the wanted one by manipulating the state through the Kubernetes API. Updates to the object will trigger the loop again. And the loop will continue until the wanted state has been reached, or continue to loop indefinitely. This loop of observe-analyze-act is known as the reconciliation loop.

There also exists controllers that together with other controllers observe a single object of a Kind. Two such controllers are the Job$^K$ controller and TTL controllers. The Job$^K$ controller starts and manages the lifetime of a job that should run to completion, while the TTL controller will remove a finished Job$^K$ object after a specified time. The other way is also possible, where a single controller observes multiple objects of certain Kinds.

Objects in Kubernetes can be labeled or annotated. Labels are used to identify an object with a certain or multiple attributes. While annotations are used to attach non-identifying data to an object. Labels and annotations are written as key-value records, where the key must be unique in the domain of a single object. As such, multiple objects in the cluster can have the same labels and annotations.

Labels are used for selecting objects that match a query, or label selector. A label selector is a collection of comma-separated requirements that are AND: ed together to form a query, i.e., all requirements must match for an object to be selected. There are two types of requirements that can be given in a label selector.

First (1), the equality-based requirement will match labels that have a given label key and matching value. The same requirement can also match for inequality, i.e., an object that does not have the specified label key and matching value. Equality uses the = or == operators and inequality uses the!=operator. For example, the label selector, zone=south, environment!=dev will select objects that have the labels as defined in Listing 3.

Second (2), the set-based requirement is oriented around three operators, in, notin, and (key) existence. The two first mentioned will check if a label has one of the values from a given set. The last one will check if a label key exists, no matter what the value is. For example, app,zone in (north, south),svc notin (web), will select a plurality of objects that fulfill the following, Has the app label key irrespective of its value (existence operator), Has the zone label key with either north or south as its value (in operator), Does not have the sve label key with web as its value (notin operator).

The equality and set-based requirements can be mixed in a single query, e.g. zone in (west,east), environment!=dev.

Annotations are used to store data that is not expected to be used for identifying an object. In Listing 4 is an example of two annotations that have been defined in an objects metadata-field. The value of an annotation can be any structured or unstructured data that can be serialized to a text-based representation.

Listing 3: Example of two labels. The data is encoded in JSON and the two labels have been defined in an objects metadata-field.

```
"metadata": {
    "annotations": {
        "sidecar.example.net/inject" : "no",
        "agent.example.com/config" : "{ }"
    }
}
```

Listing 4: Example from the Kubernetes Documentation of two annotations. The data is encoded in JSON and the two annotations have been defined in an objects metadata-field.

```
"metadata": {
    "labels": {
        "zone" : "south",
        "environment" : "production"
    }
}
```

3.2.3 Helm

Helm brands itself 'the package manager for Kubernetes'. They provide a platform to share Helm Chart's that are packaged Kubernetes applications and eases the setup of complex applications in a cluster environment. A Chart is made up of a collection of templates that describes Kubernetes resources that can be managed with the helm CLI. The templates are Kubernetes YAML files that uses the Go template language extended with specialized functions that fit the Helm use-case. The helm CLI reads values either from files or command line input to populate the templates with data e.g. name of the release and configurations for deployment strategies. In this manner, Helm is provided with input and produces Kubernetes resources.

Many APM vendors and community projects provide Helm Charts to deploy their applications in a Kubernetes cluster. These can help Kubernetes users with the deployment of the services into their clusters as they do not need to write most of the configuration themselves and can instead rely on the provided Charts.

Furthermore, Charts can be organized into Chart repositories that the helm CLI can be provided with to install the Charts from. Repositories are HTTP servers that serves the files which a Chart consists of. Similar to other package management systems the Helm package manager allow a Chart to depend on other Charts. These dependencies are declared using repository URLs, e.g., URLs with the https:// or file://schemata.

3.2.4 Operators

The Kubernetes API can be extended with Custom Resources (CRs)—custom objects of a non-standard Kind. The CR can be accessed through the API behind an API group and queried to retrieve custom data objects. Custom data is added as custom fields that are populated within the Spec field. The CR is defined using a Custom Resource Definition (CRD), which acts as a template for what fields and values a CR might take. The CRD also defines for which API group a CR should be registered so that applications or controllers running in the Kubernetes cluster can query the CR for data at that API group endpoint. To make the Kubernetes API aware of the CR the CRD is registered to the API, where the CRD is a YAML file that is sent in the request.

A CR alone can be useful without any controllers as they can be used to query information by applications running in the cluster. However, a CRD coupled with a custom controller can extend the domain of a Kubernetes cluster. A custom controller is a process that listens for events to a CR from the Kubernetes API. The custom controllers might also listen to updates to any other object in the Kubernetes cluster that might be relevant for its use case.

Instead of managing whole applications with primitive Kubernetes resources such as PodsK, Configmaps, and Deployments, CRs can be used for defining whole applications with a single CRD and a custom controller that observes a CR. The controller creates these low-level primitives previously mentioned that must exist to create the application and abstracts away much of the work that is usually required to create an application by off-loading the work to the controller. This design pattern of coupling a CRD with a custom controller is called the Operator pattern.

3.2.5 Admission Webhooks

Admission Webhooks are used to intercept Kubernetes API requests and may change the object or validate them before the objects are read by other cluster components. Admission Webhooks are divided into two types, the Mutating Admission Webhook that may change the content of the request object, and the Validating Admission Webhook that either accepts or rejects the content of the request object.

One example of usage is enforcing a security policy on objects, e.g., requiring unprivileged users in containers. This example can be applied to both types of Admission Webhooks. The Validating Admission Webhook can simply reject any request object that has any disallowed security practices, while the Mutating Admission Webhook can modify the object so that it follows the required security policy.

The consumer of Admission Webhooks are called Admission Controllers. On initialization the Admission Controller registers an URL path with Kubernetes that the Admission Controller will listen for HTTP POST requests at. The POST request will contain the request object (i.e., Kubernetes resource object) that the Admission Controller will either validate or mutate.

There are no limitations that requires the Admission Controller to only do one of validate or mutate, and it can as such also reject an object while trying to mutate it. Logically, a mutation may not be required for some objects, and the Admission Controller can simply ignore the request object altogether and leave it unchanged.

An important distinction to be made, and one that highlights one of the powers of Admission Webhooks, are that they are fired before the object is created or updated in Kubernetes unlike other controllers that are fired after the object has been created or updated.

3.2.6 Networking $Pods^K$ are small groups of tightly coupled containers that together run a single instance of an application that form a part of a service within a Kubernetes cluster. Containers share the same network namespace. In Linux network namespaces are independent sets of network interfaces and routing table entries. Containers can therefore communicate with each other over the same shared network interfaces within a network namespace, e.g., loopback. One use case for a pod with multiple containers that communicate is a proxy that adds an TLS/HTTPS encryption layer on top of unencrypted HTTP traffic. The proxy port is then what is exposed to the cluster, while the unencrypted traffic is isolated within the network namespace.

Containers in a $Pod^K$ also share the same volumes and Inter-process Communication (IPC) namespace enabling them to communicate using IPC without any networking layer. In some examples, a network stack of a $Pod^K$ uses a Docker backend.

Every $Pod^K$ within a cluster are given a unique IP for every address family, i.e., IPv4 and IPv6. Containers that share the same $Pod^K$ that want to communicate with the outside network must therefore be configured to not use the same ports for a shared address as that would result in a port collision.

$Pods^K$ are able to communicate with every other $Pod^K$ in the same cluster, because the Kubernetes cluster networking model employs a flat network topology. $Pods^K$ are scheduled by Kubernetes onto nodes where the $Pods^K$ are connected to a network bridge that transparently route packets to designated $Pods^K$ hosted in the node. Nodes are also known as workers and are usually hosted on VMs or physical machines.

A flat Kubernetes cluster networking model may be used. The networking can be implemented in other ways as long as the requirements of the Kubernetes networking model is met, i.e., all $Pods^K$ in a cluster must be able to communicate with each other.

Beyond $Pod^K$ to $Pod^K$ networking, Kubernetes provide $Services^K$ that exposes an application hosted on a set of $Pods^K$ behind a unified endpoint. There are four (4) types of $Services^k$, ClusterIP—A set of $Pods^K$ are exposed behind a single load balanced IP, NodePort—Each node in the cluster will proxy traffic to a specified port to a underlying $Service^K$, LoadBalancer—A set of $Pods^K$ are exposed by an external load balancer, ExternalName—A set of $Pods^K$ are exposed behind a external DNS name.

The ClusterIP type is the default used. In this setup, the $Service^K$ is given a cluster IP, i.e., a cluster-wide IP that all $Pods^K$ in the cluster can access. All traffic to this cluster IP will then be routed to any of the set of $Pods^K$ that the $Service^K$ exposes.

The NodePort type will assign a unique port on each node in the cluster that the $Service^K$ is accessible behind. For example, if the port 30000 is assigned for a $Service^K$, each node in the cluster will proxy any traffic to the node IP with the port 30000 to the $Service^K$. As with the ClusterIP type, the $Service^K$ is given a cluster IP that is used as a target when proxying the traffic.

The LoadBalancer type uses an external load balancer that is provided by a cloud provider. The traffic is routed to either an underlying ClusterIP or NodePort.

The ExternalName type will map the $Service^K$ to an external name (DNS), a CNAME record is created that will use the Service$^K$ cluster-local DNS name and point to an external DNS name. For example, we have a third-party database that is located outside the cluster can be accessed by querying db.example.org and a Service$^K$ named db-service. The Service$^K$ have been configured with the host db.example.org as its external name. Then the Pods$^K$ inside the cluster can access the database by querying the DNS record db-service.

3.2.7 Ephemeral Containers

Ephemeral Containers are temporary containers that can be added side-by-side to other containers in a Pod$^K$. They can be useful for deploying a troubleshooting container with more utilities than the containers that host the actual application. By off-loading the troubleshooting to these containers, the application container can be kept more minimal and possibility reducing the attack surface. Ephemeral Containers are missing most of the guarantees of execution that Kubernetes provide, i.e., they will not be restarted on failure, Ephemeral Containers are therefore not suitable for hosting applications.

There is currently no way of removing terminated Ephemeral Containers, resulting in that they will occupy a Pod$^K$ until the Pod$^K$ has been restarted or removed. Furthermore, it is not possible to create a new Ephemeral Container with the same name as another Ephemeral Container that is hosted on the targeted Pod$^K$. Every Ephemeral Container must have a unique name for the group of containers within a Pod$^K$.

3.2.8 Sidecar

A Sidecar container is run alongside the main application container in a Kubernetes deployment. These containers are mainly used to follow the principle of separation of concerns. Unlike the Ephemeral Containers described in Section 3.2.7, a Sidecar container uses the same facilities as the main application container, giving it guarantees of execution in the Kubernetes cluster. These are part of the actual Deployment$^K$ and are defined in the same way as application containers. However, adding a sidecar to an already existing Deployment$^K$ will result in that the Pods$^K$ are terminated, and new instances are started. This highlights how Sidecars are meant for running application specific code, while the Ephemeral Container that does not require any restart of Pods$^K$ can be used for troubleshooting.

An example of a use case is a Sidecar container that is running a log aggregation client that pushes logs from the main application container to a centralized log aggregation service. By using a Sidecar, the main application does not have to implement any specific code for the log aggregation and can remain agnostic to any log aggregation frameworks.

4.1 Deployments Scenarios

The networking model and Service$^K$ types provided by Kubernetes explained in Section 3.2.6 give rise to multiple use cases of how networking can be tested. The Kubernetes networking model give the nodes and Pods$^K$ in a cluster the capability to communicate with each other transparently. However, multiple problems can arise that limit and disturbs the connectivity.

Chaos Engineering platforms for Kubernetes tests the resilience of the cluster by causing chaos, i.e., disrupting the system. These platforms give insight to common problems that could cause cluster failures or disruptions. Below follows a list of common issues that will be caused on purpose by the Chaos Engineering platform Chaos Mesh to test the Kubernetes cluster resilience.

1. Pod Kill—Kill a Pod$^K$,
2. Pod Failure—Unavailable Pod$^K$ for N time (e.g., N=10 seconds),
3. Container Kill—Kill a container in a Pod$^K$,
4. Network Chaos—Cause network corruption, delay, and duplication.
5. Network Partition—Disrupting Pod$^K$ connectivity by splitting the network into independent subnets,
6. IO Chaos—Cause delay or failures to IO operations,
7. Time Chaos—Skew the clock for Pods$^K$,
8. CPU Burn—Cause load on the host CPU,
9. Memory Burn—Stress the hosts virtual memory,
10. Kernel Chaos—Cause failure for kernel specific operations, such as allocating memory.

Some of these simulations, such as 'Network Chaos' and 'Network Partitions' are directly correlated with network issues. While others, such as 'Pod Kill', 'Time Chaos' and 'CPU Chaos' can result in the inability for Pods$^K$ to function properly and cause subsequent network issues.

Disruptions could be discovered by locating Agents between connections of interest within and also outside of a Kubernetes cluster, as described in the techniques of this disclosure. A further issue:

11. Application Failure—Any kind of failure related to applications hosted in the Kubernetes cluster, e.g., timeouts, invalid responses, etc.

Application failures can occur sporadically due to unknown bugs, due to a bad new release rollout, or other things that may fail in an application.

The following description presents network scenarios and placement of Agents that could help with discovering issues.

4.1.1 Node to Node Connectivity

Figure 4:
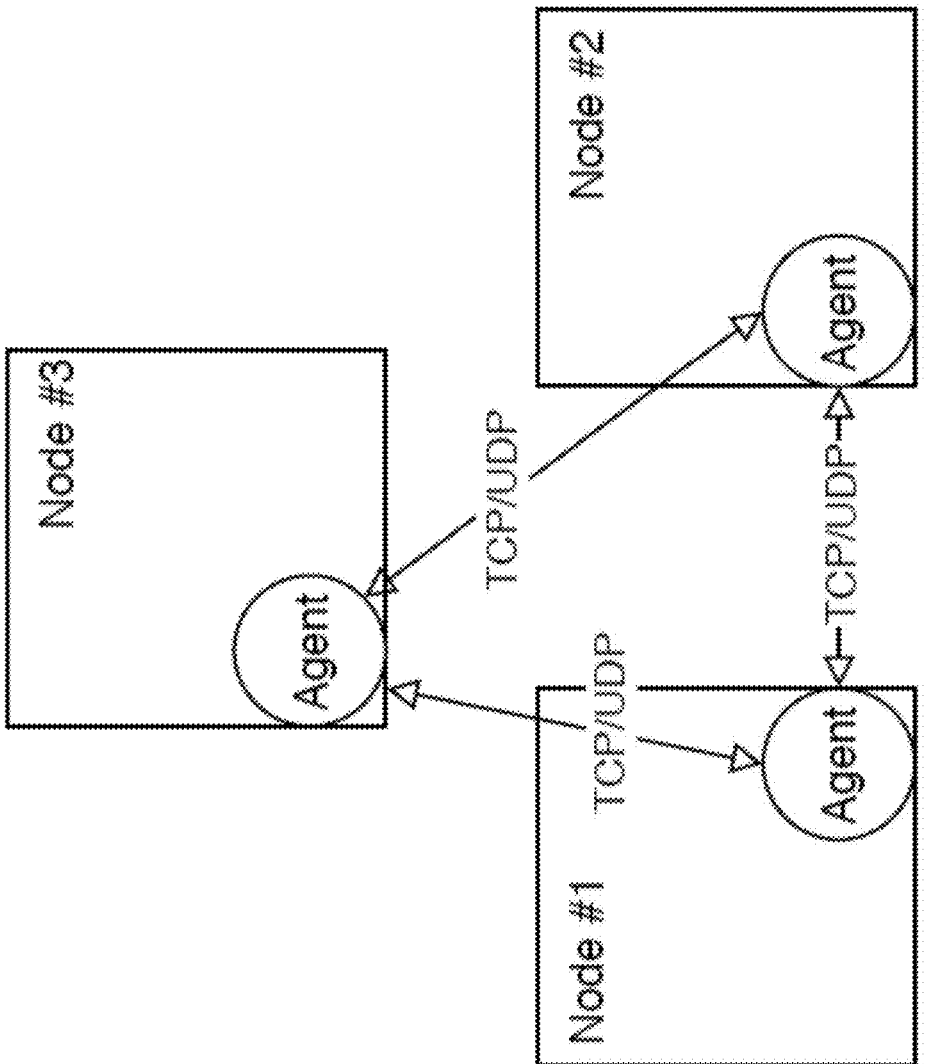
FIG. 4 is a block diagram illustrating a Node to Node Connectivity scenario.

FIG. 4 is a block diagram illustrating a Node to Node Connectivity scenario. In the example of FIG. 4, multiple agents are located on different nodes inside their own Pods$^K$. The multiple agents are running a full-mesh packet rate validating monitor. In FIG. 4 the connectivity between the nodes is validated by deploying an Agent on three (3) nodes in a Kubernetes cluster. The Agent application container is deployed inside its own Pod and the application does not share its networking and IPC namespace with any other container. On these Agents a full-mesh UDP or TCP monitoring task is run. The task will continuously test that the connection between the nodes deliver packages at a rate of N Mbit/s.

This task would be able to discover multiple of the common issues previously listed. For example, Issue 4 happens and causes a degraded connection, the problem will be discovered if one of the Agents measure a rate below N Mbit/s and the problem is reported to the Agent Controller (AC), Issue 5 happens and causes a network split, the problem will manifest itself as that one or more of the Agents are reported as offline in the AC, Any of Issues 1, 2, or 3 happens to one or more of the Agents' Pod$^K$ or container, the problem will manifest itself as that the affected Agents are reported as offline in the AC.

The other issues could potentially also trigger an alarm in the AC. However, this task should not discover Issues 1, 2, or 3 for Pods$^K$ and containers unrelated to the Agents. Furthermore, the connectivity between nodes is verified, and not the connectivity between Pods$^K$. This may potentially result in that connectivity issues between a Pod$^K$ and node is left undiscovered.

4.1.2 Node to Service Validation

Figure 5:
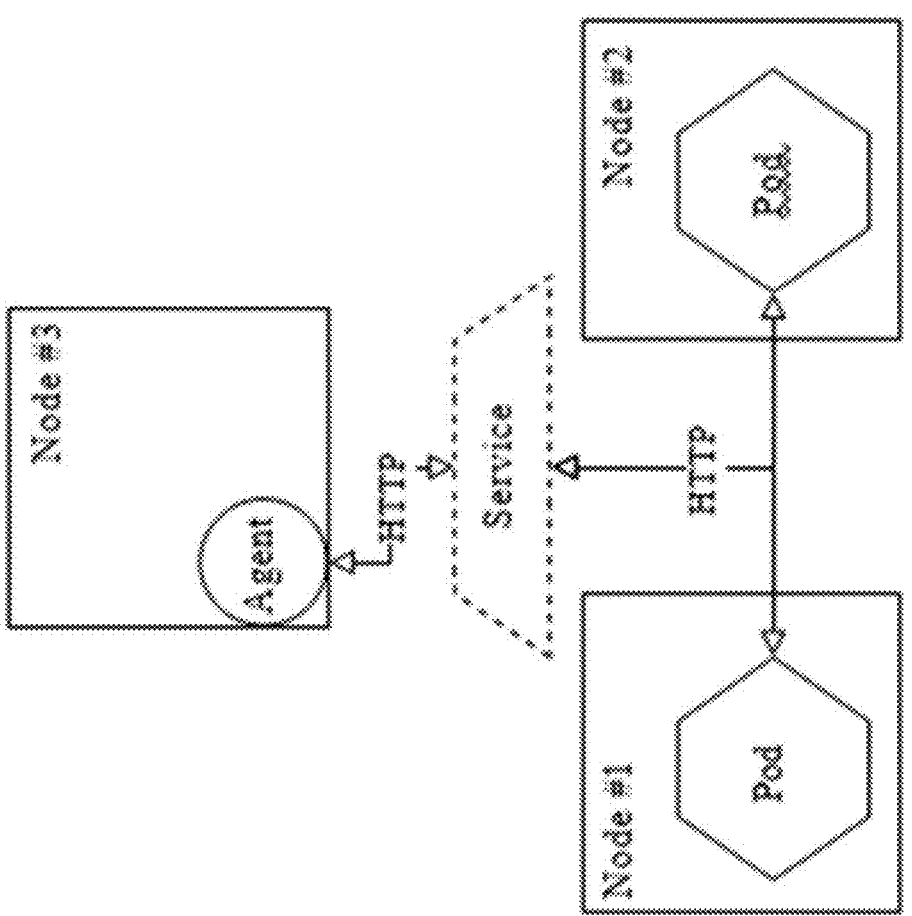
FIG. 5 is a block diagram illustrating a node to service validation scenario.

FIG. 5 is a block diagram illustrating a node to service validation scenario. In the example of FIG. 5, a single agent is continuously validating the response of the web application behind a Service$^K$. More particularly, a single Agent is continuously validating the HTTP response of a web application that is load balanced by a Service$^K$. In the example of FIG. 5, the Service$^K$ is located between the Agent and the Pods$^K$ hosting the web application whose responses are validated. In practice, the Service$^K$ is an IP address (i.e., cluster IP) that the kube-proxy intercept and route to any of the Service$^K$ Pods$^K$. For brevity, this is abstracted away in the illustration.

The continuous validation of the responses is done by verifying that response contain the correct HTTP status code and body.

Again, this task would be able to discover some common issues, such as,

Issue 4 happens and causes HTTP response timeouts,

Issue 11 happens and causes web application to respond with a 500 status code,

Issue 11 happens and causes body of the HTTP response to contain unexpected content.

4.1.3 Pod to Pod Connectivity

Figure 6:
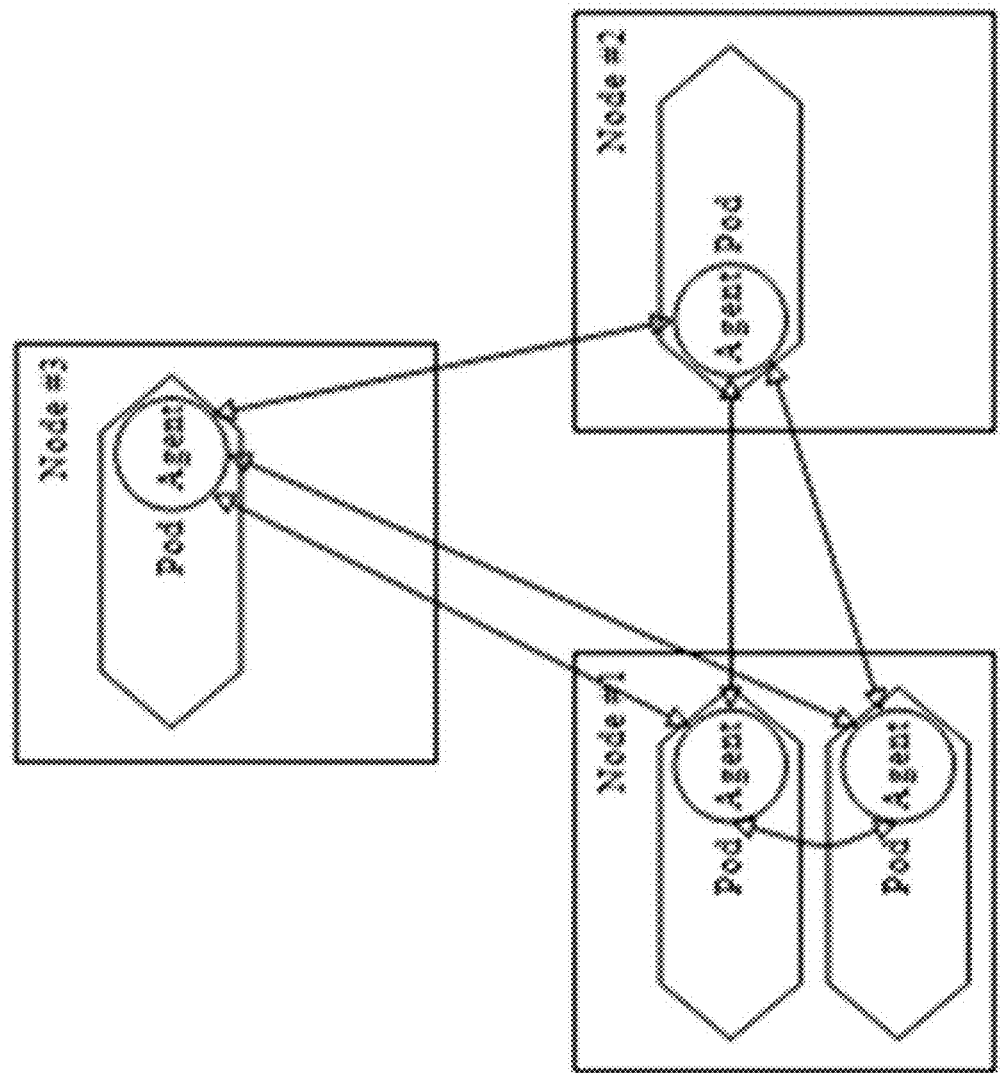
FIG. 6 is a block diagram illustrating the Pod to Pod Connectivity scenario.

FIG. 6 is a block diagram illustrating the Pod to Pod Connectivity scenario. Multiple agents are running a full-mesh TCP/UDP packet rate validating test. In this scenario, multiple Agents are located at different Pods running as Sidecars alongside other application containers.

In FIG. 6 each Agent have been deployed as Sidecars resulting in that the Agents will share the same network and IPC namespace as other applications in the same Pod$^K$.

The scenario in Section 4.1.1 only verifies the connectivity between nodes, and not the connectivity between Pods$^K$ hosted inside nodes. This scenario could give insight into whether the connectivity between Pods$^K$ is working as expected. A test is time limited to N seconds and will stop executing after the time has passed.

This test should be expected to be more bandwidth expensive than the scenario described in Section 4.1.1 if there are more Pods$^K$ than nodes as it will result in one Agent per Pod$^K$ instead of one per node.

Therefore, a user might not want to run this kind of test as a monitor and instead opt for the time limited test variant to troubleshoot issues. The test will validate the packet rate between the Pods$^K$ for a short duration, and not use up as much bandwidth after conclusion.

By running this test, undiscovered issues could be discovered, such as,

Issue 4 have happened and causes packet rate degradation,

Issue 5 have happened and causes some of the Agent connections to fail.

As Kubernetes is a dynamic system and Pods$^K$ might get terminated, e.g., less load on the application so the Kubernetes Horizonal Pod Autoscaler (HPA) is scaling down the number of Pods$^K$. This kind of test might fail as Agents are brought down with the applications Pods$^K$. This issue is also described as its own requirement in Section 4.3.

4.1.4 Ingress Validation

Figure 7:
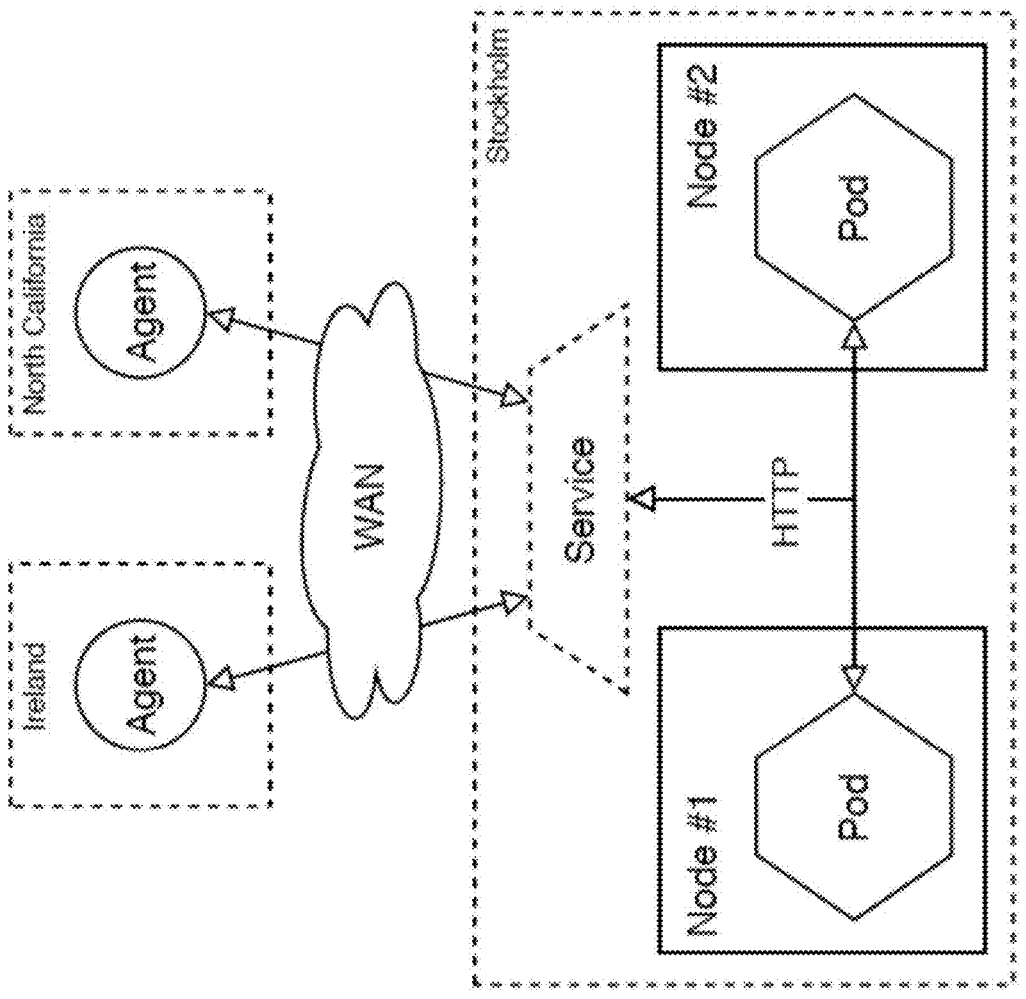
FIG. 7 is a block diagram illustrating an ingress validation scenario.

FIG. 7 is a block diagram illustrating an ingress validation scenario. In this scenario the validation of a Service$^K$ is verified from the outside of the cluster by using two (2) remote Agents. The Agents have been deployed in one region each. In FIG. 7 the Agent runs a HTTP monitor or test toward the exposed Service$^K$. The Agents is hosted outside the Kubernetes and should therefore also verify the function of external access.

As with the scenario in Section 4.1.2 the monitor or test should be able to discover issues such as, Issue 4 happens and causes HTTP response timeouts, Issue 11 happens and causes web application to respond with a 'Internal Server Error' (500) status code, Issue 11 happens and causes body of the HTTP response to contain unexpected content.

However, as the Agents are located outside of the Kubernetes cluster, errors could be due to other components that fail. For example, the Agents might get a 'Bad Gateway' (502) status code due to failures in a load balancer located in front of the Kubernetes cluster and Service$^K$.

An error due to a misconfigured Wide Area Network (WAN) between one of the Agent and Kubernetes cluster could also produce issues where the affected Agent reports the Service$^K$ as inaccessible.

It should be up to the user how granular they want the reporting to be. In the above case, the monitor or test could have been written to find any access issues that occur between the Agent and Service$^K$, including issues in the WAN. On the other hand, the user might want more granularity, and find issues only in the Kubernetes cluster, then a configuration such as the one described in Section 4.1.2 could be of interest.

4.1.5 Troubleshoot Pod

Figure 8:
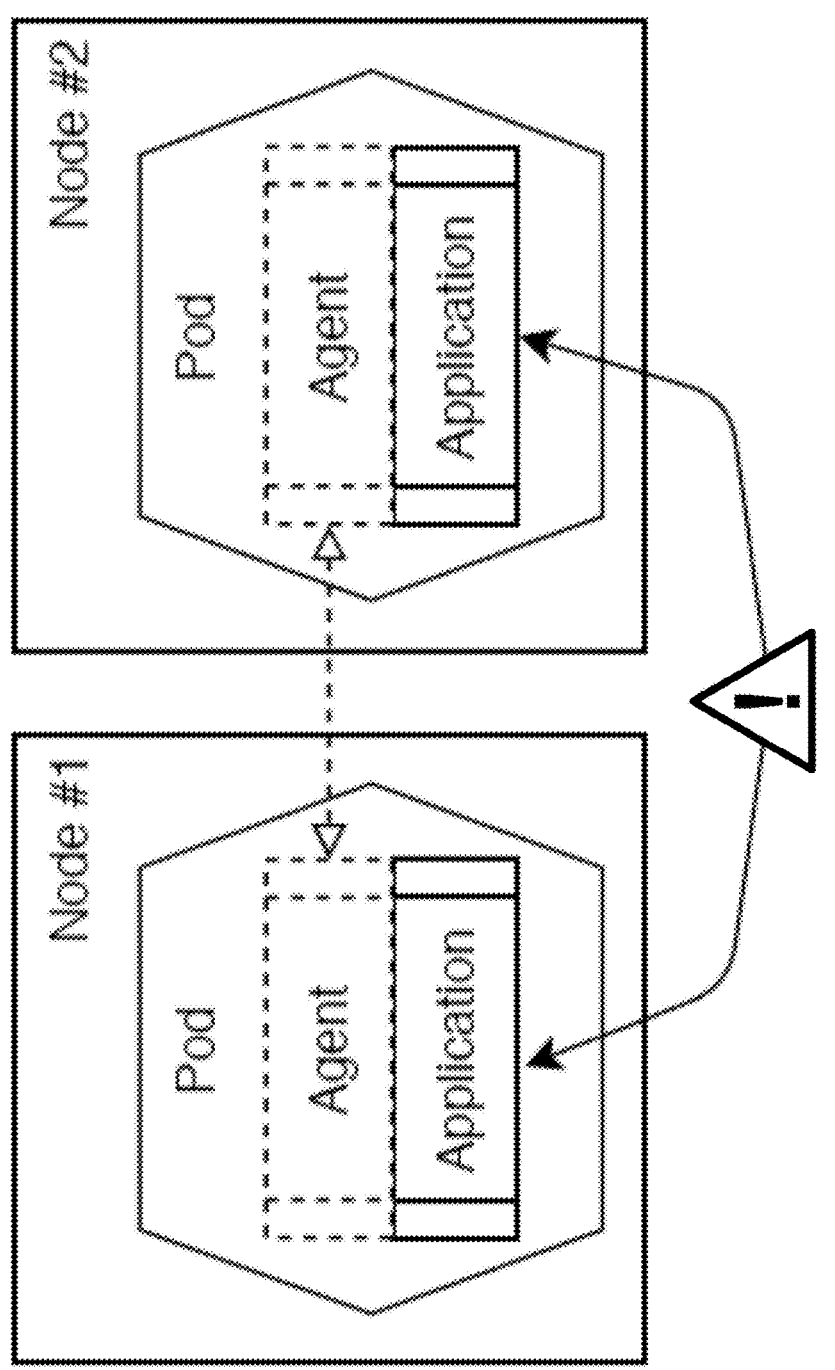
FIG. 8 is a block diagram illustrating the Troubleshoot Pod scenario.

FIG. 8 is a block diagram illustrating the Troubleshoot Pod scenario. In this scenario a bad connection between two Pods$^K$ is evaluated by troubleshooting using two Agents. In FIG. 8, the communication between two Pods$^K$ is impaired for an unknown reason. The issue is recurring but only happens for a limited number of Pods$^K$. By deploying temporary Agents as Sidecars in the affected Pods$^K$ the issue can be evaluated with the tools that the active assurance suite provides, such as packet tracing and transparency tests.

Below follows some issues that could have happened where troubleshooting using Agents could be beneficial, Issue 4 have happened and packets are corrupted, Issue 5 have happened and the Pods$^K$ cannot reach each other.

Indeed, even for a working connection Agents could be deployed between two Pods$^K$ to execute tests such as verifying the network policies and network properties, e.g., Maximum Transmission Unit (MTU) discovery.

4.1.6 Initial Deployment Validation

Figure 9:
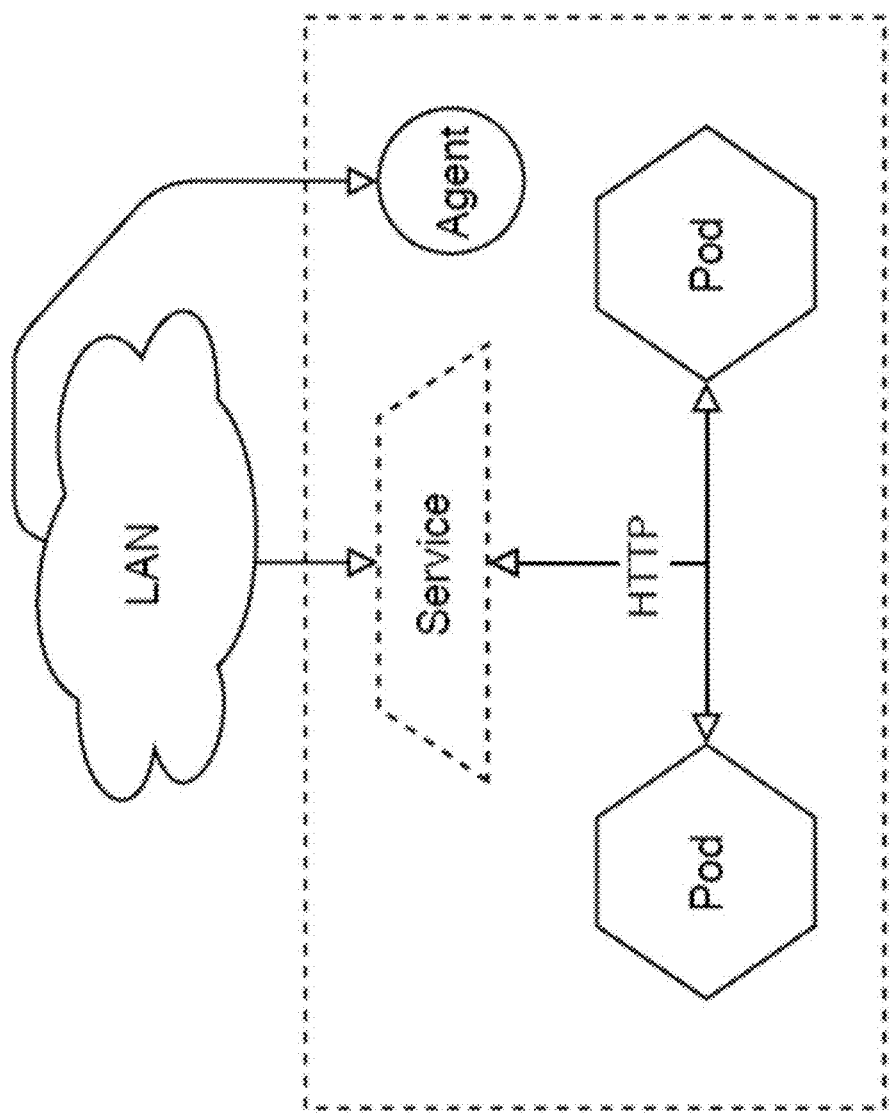
FIG. 9 is a block diagram illustrating the Initial Deployment Validation scenario.

FIG. 9 is a block diagram illustrating the Initial Deployment Validation scenario. In line with the activation testing capabilities the active assurance platform provides, this scenario validates a new deployment. In FIG. 9 the function of a new deployment is validated by running a test that accesses the Service$^K$ from the outside of the Kubernetes cluster. The Agent is placed in the same Kubernetes cluster. This gives the possibility of validating the deployment from a Local Area Network (LAN) that can access the ingress even though it is not accessible from any WAN, e.g., the Internet.

As with the scenario in Section 4.1.2, the test should be able to discover issues such as, Issue 4 happens and causes HTTP response timeouts, Issue 11 happens and causes web application to respond with a 'Internal Server Error' (500) status code, Issue 11 happens and causes body of the HTTP response to contain unexpected content.

This test could be created using an external orchestrator that uses the test to verify the function before making the externally Service$^K$ accessible. The results from the test could then be fetched by the orchestrator that would make the ultimate decision of passing traffic to the Service$^K$.

4.2 Declarative Configuration

The configuration of the Agents should be defined in configuration that can be stored in a Version Control System (VCS). The Agents should be dynamically configured during the deployment of a Kubernetes cluster. An abstract API is used that allows the VNF to specify its networking intent dynamically. The short life cycles of Pods$^K$ in Kubernetes also places a requirement on text-based declarative configuration. The configuration must be powerful enough to allow for tests to be run between Agents both located intra and inter-cluster. The configuration should allow for writing generic tests that apply to several Agents or services, but also allows for specific tests for a smaller number of Agents or services.

4.3 Ephemeral Environment

Due to resources in Kubernetes, such as Pods$^K$, that can potentially have a short life cycle, this disclosure provides that the Agents must support being removed and re-located to other locations within the cluster with monitoring and testing being resumed once an Agent is up again. This disclosure provides monitors that are continuously executing and adapts for the Kubernetes resources under test, adapting in that Kubernetes resource may be added, removed, or changed.

4.4 Helm Chart

Helm is a popular package manager for Kubernetes. Even if customers of the active assurance platform choose to not use Helm, by providing Helm Charts, the platform vendor provide a repository that their customers can use as reference while designing their own custom deployments. The active assurance platform vendor should provide a Helm Chart for simple setup of active assurance in a cluster. The Helm Chart must allow users to create Agents in the cluster that can be deployed on designated nodes. Furthermore, the Helm Chart should follow best practices for deployments in Kubernetes, helping the user to deploy agents correctly and securely. The Helm Chart should support Agent launched as DaemonSets$^K$. For better flexibility, the Helm Chart should allow the user to pass a node selector, affinity, and tolerations for controlling at what nodes the Agents are deployed. Credentials should be easy to provide as values that are passed to the Helm Chart and used to populate the template. Credentials should be stored in the Secret$^K$ Kubernetes Kind. Configuration data should be stored in the ConfigMap Kubernetes Kind.

4.5 Ephemeral Agents

Agents can be deployed in already existing Pods$^K$ in Kubernetes that allow for troubleshooting by running traffic generation tests. The use case would for example be to run network related tests from the same network namespace as the containers in a Pod$^K$ that is being targeted while troubleshooting. These ephemeral, or disposable, Agents should be simple to deploy and not require that the targeted Pods$^K$ containers are restarted as is the side effect of adding containers to a pod.

4.6 Activation Testing

As previously described, activation testing are tests done to verify the function of services that have been provisioned. The active assurance platform already provides the AC API for managing Agents and creating tests and monitors. Using the API activation testing can be automated to be done as services are provisioned.

While provisioning services in Kubernetes, there should be support for also running activation testing using the active assurance platform to verify the function of the services. There must exist an interface that allow users to easily automate the activation testing. Results from the activation testing should also be provided and be available for use in automation.

4.7 Active Testing and Monitoring

Two distinct types of traffic generation arrangements are supported by the active assurance platform. Testing is done for a limited time, while monitoring is continuously executed. A solution should align with these already preexisting types to integrate with the active assurance ecosystem.

Two important traffic generation arrangements have been identified,

1. 'One-shot tests'—Tests that run a single time and will not be executed again.
2. 'Continuous monitors'—Monitors that run continuously until removed or stopped.

A third (3) testing variant, 'Continuous tests' was identified. Here a test is run like the 'oneshot test' variant, but will be re-executed if there has been changes to the system under test.

This section describes a prototype toolbox that integrates an active assurance platform with the Kubernetes ecosystem. The prototype consists of three (3) distinct tools:

First (1), the most extensive prototype is an Operator that integrates with the Kubernetes ecosystem and the Agent Controller (AC) to manage the life cycle of tests, monitors, and Agents in a Kubernetes cluster environment. The Operator prototype proposal is described in Section 5.1.

Second (2), a prototype of a Helm Chart repository that provides common deployment strategies for Agents. The Helm Chart repository prototype is described in Section 5.2.

Third (3), a prototype of a kubectl Plugin that provides support for launching ephemeral Agent containers for easy troubleshooting. The kubectl Plugin prototype is described in Section 5.3.

5.1 The Operator

The Operator prototype provides capabilities for running tests and monitors that dynamically matches against Kubernetes Services and Agents. The prototype is limited to matching against these resources to set a good demarcation that will show case the possibility of dynamically matching against objects within a Kubernetes cluster.

The matching of objects will be done using Kubernetes labels that are provided in a CR that defines the inputs of either a test or monitor. As a second demarcation whole tests and monitors are not defined, instead only the inputs for AC templates are provided where the CR will reference the template identifier that must already exist in the AC.

The CRs uses a Domain Specific Language (DSL) language, from now on known as the Resource Matching DSL (RMD), that implements the capabilities of matching against Kubernetes Services and Agent objects which are then used when populating AC template inputs with values that are inferred from the matching objects.

Lastly, the Operator will use an Admission Webhook for deploying Agents inside Sidecar containers. The target Pods$^K$ that Sidecar Agents will be deployed on to are defined by adding a special Kubernetes annotation to the Pod$^K$ definition.

These capabilities of dynamic object matching, declarative template input definitions, and dynamic Agent Sidecar deployments should together fulfill the requirements of declarative configuration and activation testing outlined in Section 4.2 and Section 4.6 respectively.

5.2 Agent Charts

A repository that provides Helm Charts for running active assurance in Kubernetes will be created. The repository will provide a Helm Chart for deploying Agents as a DaemonSet$^K$. More deployment strategies will not be implemented to limit the scope of the prototype implementation. The DaemonSet$^K$ will allow the user to deploy Agents on a select set of Kubernetes nodes and match against these Agents using the RMD in CRs.

Node selector, affinity, and tolerations will be supported by allowing the user to pass these settings to the Helm Chart. The Helm Chart will use a ConfigMaps object for storing configuration values in Kubernetes. Credentials that are required for running Agents are to be stored in a Kubernetes Secret$^K$ object.

This should provide a good starting point of a Helm Chart repository that eases the deployment of Agents in a Kubernetes cluster.

5.3 Troubleshoot Plugin

To help with the creation of Agents that are run for troubleshooting purposes, as described in Section 4.5, a kubectl plugin is proposed. This provides a CLI that integrates with the kubectl plugin. As a starting point it should provide the capability to deploy Agents running in Ephemeral Containers.

By using Ephemeral Containers the deployed Agents will not have the side effect of restarting the targeted Pod$^K$ when it is deployed, thus fulfilling the requirement in Section 4.5. The deployed Agent will allow the user to either run tests or monitors manually from the AC UI.

It may be possible to remove Ephemeral Containers using the Kubernetes API. However, by implementing this prototype, the feasibility of deploying Agents that can troubleshoot Pods$^K$ without requiring a restart is explored.

Each section presents one of the three (3) distinct proof-of-concept prototypes:

First (1), the Operator is described in Section 6.1.

Second (2), the Helm Charts repository, is described in Section 6.2.

Third (3), the kubectl plugin for ephemeralAgents, is described in Section 6.3.

6.1 The Operator

The design follows the Operator pattern that has been described in Section 3.2.2 where the architecture consists of three important components, The Agent Controller (AC)—Controls the tasks performed by Agents and collects reports. Available over an API, The Agents—Perform tasks such as active testing, active monitoring, and activation testing. The results are reported to the AC. Deployed in containers in Kubernetes or remotely outside of Kubernetes, The Operator—Acts as a glue between the AC and resources in a Kubernetes cluster. It will match against resources, manage the life cycle of tests and monitors, and deploy Sidecar Agents.

The Operator is the central component in the implementation written in the Go language using the Operator SDK from Red Hat. Following the Operator pattern the Operator listens for Kubernetes cluster changes and fires reconciliation loops for resources. While the Operator reconciles it will fetch relevant resources from the Kubernetes API and the AC API to create a context for what actions are to be made.

Using this context it will start, stop or update tests and monitors that have been defined as CRs and are run against resources that the CR match against in the Kubernetes cluster. More details on the implementation of the CRs are described in Section 6.1.1. How resources are matched against is described in Section 6.1.2.

The Operator will only communicate with the Kubernetes and AC APIs. The Operator simply monitor the Agents and other Kubernetes resources through the Kubernetes API and acts on life cycle changes. The communication between the Kubernetes API is done over HTTP using the Kubernetes library client-go. While for the AC the communication is made with using a REST API that the active assurance platform provides. The Go standard library is used to implement a simple REST client that the controllers in the Operator uses. More details on the controllers can be found in Section 6.1.3.

Furthermore, the Operator can also deploy and remove Sidecar containers that hosts the Agent application from the active assurance platform. The Agent will set up these with the correct credentials and host settings so that the Agents can communicate with the AC. More details on how Sidecar deployments are made by the Operator is described in Section 6.1.4.

Other types of deployments of Agents in a Kubernetes cluster are left to be made using other already existing technologies such as standard Kubernetes Deployments$^K$ or Helm Charts.

Figure 10:
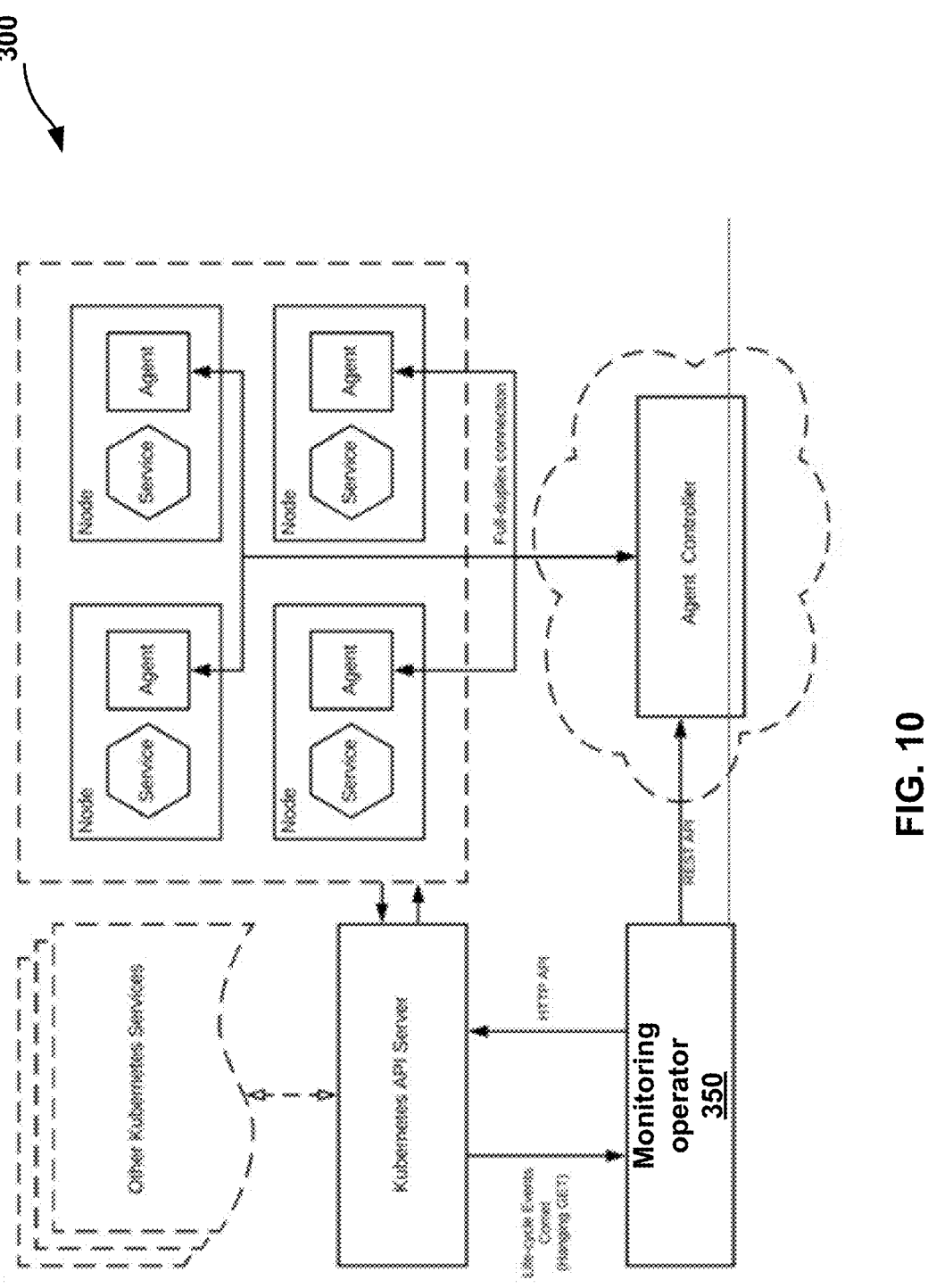
FIG. 10 is a block diagram illustrating another example computing system that includes a monitoring operator integrated with a Kubernetes platform, in accordance with techniques described in this disclosure.

FIG. 10 is a block diagram illustrating another example computing system that includes a monitoring operator 350 integrated with a Kubernetes platform, in accordance with techniques described in this disclosure. In the example of FIG. 10, monitoring operator 350 receives metadata from the Kubernetes API server, the metadata indicating information about a requested network slice. Monitoring operator 350 communicates with an agent controller (also referred to herein as a "control center") via a REST API. The agent controller instantiates and/or communicates with services and test agents on nodes to validate and monitor network performance of the network slice. For example, services on the nodes may include container-based RAN emulation services.

Figure 11:
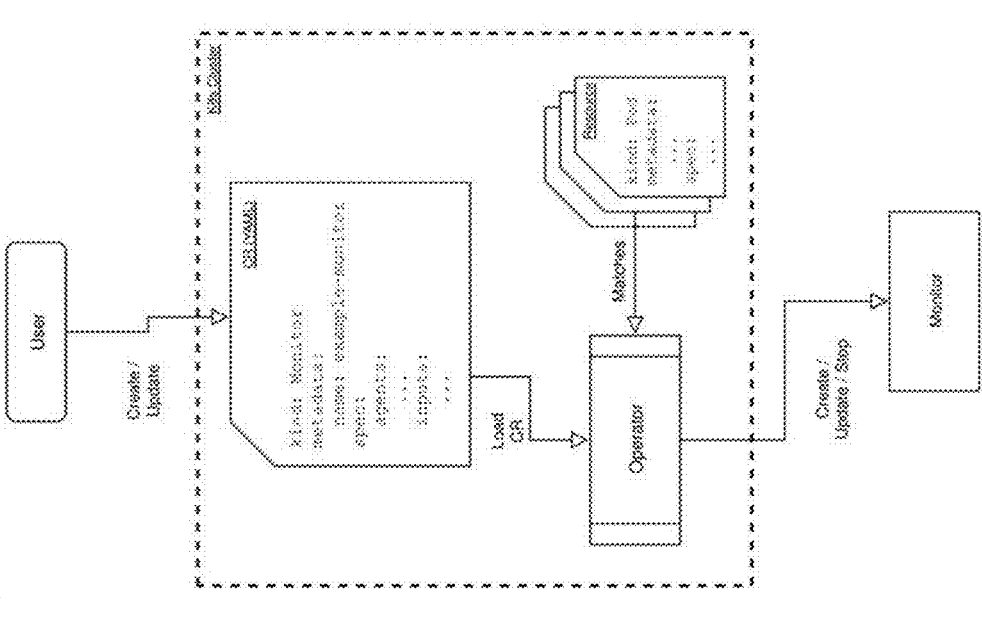
FIG. 11 is a conceptual diagram illustrating an example template-driven declarative active testing and monitoring system, in accordance with techniques described in this disclosure.

FIG. 11 is a conceptual diagram illustrating an example template-driven declarative active testing and monitoring system, in accordance with techniques described in this disclosure. In FIG. 11, a simplified flow chart from the user perspective is shown.

A user creates or updates a monitor with a custom resource, and the operator matches against Kubernetes cluster resources, and creates, updates, or stops the monitor in the AC.

The following Operator SDK practices the Operator is deployed as a Deployment$^K$ with a single replica in a separate Kubernetes namespace, e.g., active assurance-operator-system. In Operator SDK terminology the Operator that hosts the controllers is known as the manager and is in practice a single Go binary.

The Agent is expected by the Operator to have been deployed in one of two variants that the Operator supports.

Figure 12:
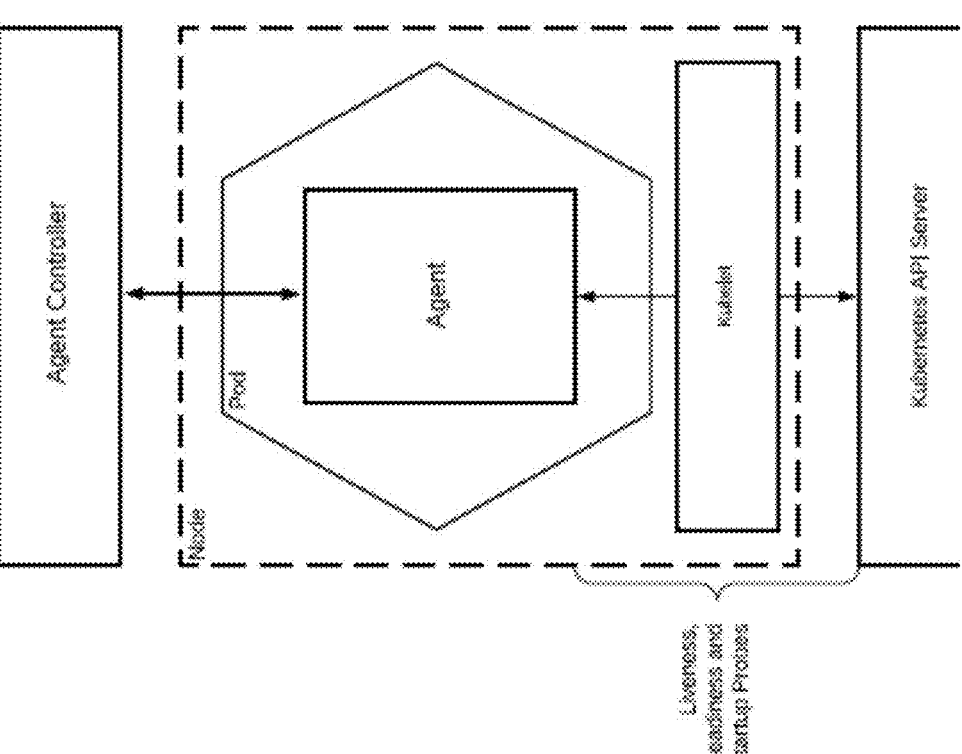
FIG. 12 is a block diagram illustrating an agent deployed as a Pod$^K$ and its interaction with other components.

FIG. 12 is a block diagram illustrating an agent deployed as a Pod$^K$ and its interaction with other components. Variant one (1), in FIG. 12 a Pod$^K$ with only a single container that hosts the Agent application is shown. In this embodiment, the Agent application does not share IPC or network namespaces with any other processes. This results in an Agent deployment that is more isolated Agent from the other services hosted in the Kubernetes cluster. More details on IPC and network namespaces for Kubernetes Pods$^K$ are described in Section 3.2.6.

Figure 13:
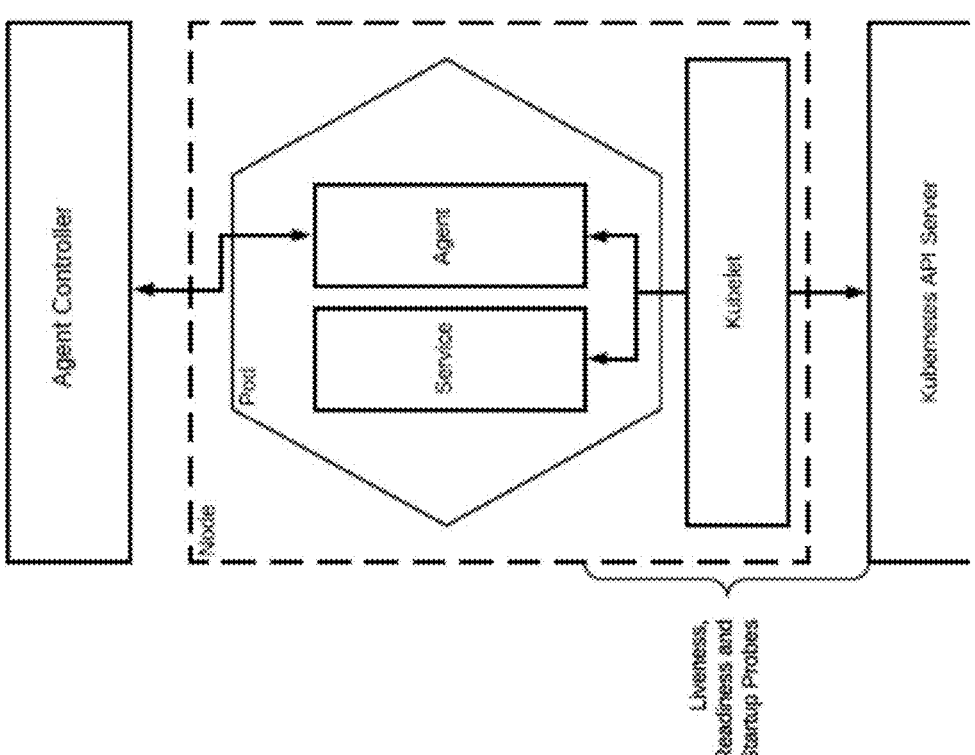
FIG. 13 is a block diagram illustrating an agent deployed as a sidecar container and its interaction with other components.

FIG. 13 is a block diagram illustrating an agent deployed as a sidecar container and its interaction with other components. Variant two (2) containers, in FIG. 13 a Pod$^K$ is shown with two containers, one that hosts a service and a second that hosts the Agent application. Here the Agent does share the same IPC and network namespace with the service container, as described in Section 3.2.6. Importantly this results in an Agent that will share the same networking, and even IP, as the containerized service.

Listing 5: Outline of a Monitor CR

```
apiVersion: example.com/v1alpha1
# The kind sets the type, either a
# Monitor or Test.
kind: Monitor
# The monitor must have a name
# that'll be used in Kubernetes and NCC.
metadata:
    name: client-server-monitor
# The Resource Matching DSL.
spec:
    templateId:
        1 agents:...
        services:...
        inputs:...
```

6.1.1 Custom Resource Definitions

Tests and monitors are generated by using templates already stored in the AC. These templates are populated by the Operator that reads CRs that reference the template and defines the required inputs. The Operator will then create the tests or monitors in the AC. The outline of an example CR can be seen in Listing 5.

The CRs are defined as CRDs that are installed to the cluster. The Operator listens for applied and updated CRs in the cluster. There are two custom Kubernetes Kinds, Tests and monitors are generated by using templates already stored in the AC. These templates are populated by the Operator that reads CRs that reference the template and defines the required inputs. The Operator will then create the tests or monitors in the AC. The outline of an example CR can be seen in Listing 5.

The CRs are defined as CRDs that are installed to the cluster. The Operator listens for applied and updated CRs in the cluster. There are two custom Kubernetes Kinds, Monitor—Used for defining monitors in the AC, Test—Used for defining tests in the AC.

The apiVersion key in Listing 5 must be populated with the current version of the API that the Operator uses. The API is versioned and the v1alpha1 string follow a convention set by Kubernetes, once a stable release is issues the string should be changed to v1. Other subsequent releases, e.g., v2 and v3 can be released and the Operator will be upgraded with a new instance using the Operator SDK Operator Lifecycle Manager. Old CRs will continue to use the old API until they have been migrated to the new format that is defined for newer releases.

Listing 6: The keys that can be given for a RMD CR.

```
# The Resource Matching DSL.
spec:
    templateId: 1
        agents:...
        services:...
        inputs:...
```

Another important key that is required for all CRs is the name metadata field. This is used for giving monitors and tests unique names within the same namespace of a cluster. These must always be unique for that namespace and no other CR of the same Kind can share the same name.

Tests and monitors that are created in the AC by the Operator are given a name that is the concatenation of the name from the metadata field and the namespace with a hyphen (-) added in-between.

For example, the monitor in Listing 5 would begiven the name client-server-monitor-default because the CR has the name client-servermonitor and exists in the default namespace.

The Resource Matching DSL (RMD) that is provided in the spec key is presented in Section 6.1.2 below.

6.1.2 Resource Matching DSL

The template inputs, services, and agents are defined with the Resource Matching DSL (RMD). All of the RMD is contained in the spec key in a CR. There are four (4) keys that can be defined in the RMD seen in Listing 6.

The first key, templateId, is mandatory. This key defines what template should be used by referencing an ID that have been given to the template by the AC. The three (3) other keys are optional, as an AC template that does not take any inputs is possible to create. The keys, agents, services, and inputs are described below in the next sections.

Agents Selector

Agents are defined with the agents key. The values of the agents key is a list of named selectors.

Each named selector must contain a name that gives the set a referable name used for inputs and a selector that selects Agents based on matching rules.

A full example of this in Listing 7 shows an advanced version that selects multiple agents with several named selectors.

The rules inside a selector follows the same rules as regular label selectors in Kubernetes. All the rules are AND:ed together, i.e. all of the rules must apply for a Agent to be selected.

In the example in Listing 7 the edge-agents named selector will match Agents with the label tier: edge. While the core-agents named selector will match Agents fulfilling both the matchLabels and matchExpressions rules.

The matchLabels key is used to match against Kubernetes labels. All the labels under the same matchLabels key must match for the Agent to be selected.

The matchTags key is used to select Agents that are only known by the AC, these may be Agents that are located remotely outside of a Kubernetes cluster. The tag facility that AC provides is used to retrieve information about these Agents through the AC API.

The matchExpressions key is a clone of the Kubernetes matchExpressions.

Both the matchLabels and matchExpressions functionality use the library functions provided in the Kubernetes core/v1 API. This should also make the RMD syntax more familiar to users of Kubernetes.

Services Selector

Services$^K$ are defined with the services key. The value of the services key is a list of Kubernetes named selectors.

Again, as with the Agents Selector, each named selector must contain a name that gives a selector a referable name used for inputs and a selector that selects Services$^K$ inside the Kubernetes cluster based on matching rules.

The Services Selector can take the matchLabels and matchExpressions rules to match against Services$^K$. The rules work the same way as with Agents with the only difference being that objects in Kubernetes with the Kind Service$^K$ will be selected instead. The matchTags rule does not exist for the Services Selector as it's specific for Agents.

Template Inputs

All the inputs for a template are contained in an inputs key. The example in Listing 8 shows the general outline of how a definition looks that populates an AC template.

Each input block in the example in Listing 8, i.e., server and ratedown, references the template input defined in the AC for a monitor or test template.

An input block contains a type and either a value or a type specific key, such as agent or service. The type key set the input type that should be used. This type references the same type that is defined in the AC API specification.

The value key is simply a raw object or base type, e.g., an integer or YAML-encoded structure. Structures are converted to JSON-encoded structures that can be ingested by the AC API. This will allow inserting raw values into any type, for example the interface type can have the value manually defined as shown in Listing 9 instead of using the agent key.

These raw values could be validated against an OpenAPI specification that the AC API could provide.

There are three (3) types implemented in this proof-of-concept, each of these types support being passed a special helper that will be used to infer values that should be used as input.

The three (3) types (denoted T) and their respective helpers (denoted H) are, 1. interface$^T$—agent$^H$,
2. interface_list$^T$—agents$^H$,
3. url$^T$—service$^H$ More details about each type are described in the next three sections.

Listing 7: A full example of some of the ways to select agents and Services$^K$ using the RMD.

```
agents:
name: agent1
selector:
    matchLabels:
        app.kubernetes.io/instance: agent1
name: agent2
selector:
    matchLabels:
        app.kubernetes.io/instance: agent2
name: core-agents
selector:
    # All keys within a selector (i.e. matchLabels and
matchExpressions)
    # are AND:ed. matchLabels: tier: core
    matchExpressions:
        key: zone opeartor: In,
        values: [south, west]
        {key: environment, operator: NotIn, values: [dev] }
name: edge-agents
selector:
    matchLabels:
    tier: edge
name: remote-agents
selector:
    matchTags: [remote-agent1] # Matches agents with the
specified AC tags.
services:
name: nginx-production
selector:
    matchLabels:
    app: nginx
    matchExpressions:
    {key: environment, operator: NotIn, values: [dev, staging] }
```

Listing 8: A simple example of an input in a RMD CR.

```
# The inputs below are used for
# populating defined template inputs.
inputs:
    # The server key is a template
    # input.
    server:
        type: interface
        agent: agent1    # Selects a single
            # agent that is
            # deployed by KUBERNETES.
```

-continued

```
# The url key is a template input.
    url:
        type: url
        # The service value will match
        # against a service named
        # 'nginx-production'.
    service:
        name: nginx-production
        servicePort: http
        serviceType: ClusterIP
        scheme: http
    # The ratedown key is a template
    # input.
    ratedown:
        type: integer
        value: 10
```

Listing 9: An input that defines an interface using the raw value instead of using an agent helper.

```
inputs:
    server:
        type: interface
        value:
            interface: eth1
            ip_version: 6
            agent_id: 1
```

Listing 10: An input that defines an interface using the agent's helper.

```
server:
    type: interface
    agent: agent1
```

Listing 11: An example of a possible AC API schema that would be populated by an Agent interface.

```
AgentInterface { interface:
    string   *
    ip_version: integer * ($int32)
    agent_id: integer * ($int32)
}
```

1. The interface Type

The interface type takes either the agent helper or a raw value as an input. The type is used for populating a template input with a single Agent.

The agent helper is populated with an Agent set that has been defined with an Agents Selector, i.e., named selector. From this set, an Agent is picked randomly and used as input. To ensure that only a single specific Agent is always used the user have to give the Agent an unique label.

The selected Agent is queried with the AC API to retrieve the Agent ID, interface name, and IP version that are required for the AgentInterface shown in Listing 11.

For example, using the example in Listing 10 and the named Agent selector defined in Listing 7. A set named agent1 will be populated with Agents matching the label. This set is then referenced in the server template input using the agent helper. The Operator will select a random Agent in this set, and then query the AC API for the required values to populate the schema in Listing 11.

Then, the template input of type interface will be populated with the data that matches the AgentInterface.

Lastly, the Operator will send the whole populated template to the AC API where the AC will create the test or monitor.

Listing 12: An input that defines an interface_list using the agents helper.

```
clients:
    type: interface_list
    agents: [agent2, core-agents, edge-agents]
```

2. The interface_list Type

The interface_list type takes either the agents helper or a raw value as an input. The type is used for populating a template input with a list of Agents.

This works mostly the same way as the agents helper previously described. The difference is that the agents helper will collect all the Agent sets provided in the list that the agents helper takes.

All of the Agents that are in these sets will be used and added to a list of AgentInterface shown in Listing 11. As with the interface type, the result will be sent to the AC API so that the AC will create the test or monitor.

Listing 12 uses the agents helper to select three different named Agents selectors, agent2, core-agents, and edge-agents. The sets produced from the selectors will be flattened to a set of unique Agents that are used to populate the interface_list type with a list of interfaces (i.e., AgentInterface) for each Agent.

3. The url Type

The url type takes either the service helper or a raw value as an input. The type is used for populating a template input of the string type. It will infer an URL from the selected $Service^K$ and populate the template input of type url with an URL represented as a string value. As with the interface type, a random Service is picked from the set as the type only takes a single URL.

The selected $Services^K$ set that is used by the service helper is defined in the Services Selector that has been described in Section 6.1.2.

The referenced set of $Services^K$ given by the Service Selector is given with the name key that can be seen in Listing 13. In addition to this key, there are more keys that are used for specifying how the URL should be inferred and also keys that allow for overriding specific parts of the URL.

Listing 13: An input that defines an url using the service helper.

```
url:
    type: url
    service:
    name: nginx-production
    servicePort: http
    serviceType: ClusterIP
    scheme: http
```

These keys are best presented as a list, below are all the supported keys for the service helper listed with a short description, name—References a set that has been created from a Service Selector, i.e. a named selector that matches against $Services^K$, servicePort—Specifies what $Service^K$ port should be used when inferring the URL, serviceType—Specifies what $Service^K$ type should be used when inferring the URL, scheme—Overrides any inferred URL scheme with the provided, port—Overrides any inferred URL port with the provided, host—Overrides any inferred URL host with the provided.

In Listing 13 it is shown a template input of the type url. Here the nginx-production named selector from Listing 7 that match the Service in Listing 14 will be used when inferring an URL. The $Service^K$ Port with the name http will be selected, and its ClusterIP will be used as the host in the URL.

As a $Service^K$ does not provide any information about what application protocol is used, the service helper would infer an URL with the scheme tcp://. To mitigate this, the example in Listing 13 overrides the scheme with the value http that will produce the scheme http://.

If the ClusterIP of the nginx-service $Service^K$ in Listing 14 is 10.43.0.12 then the resulting URL from this example would be http://10.43.0.12:80.

Listing 14: An example Service that would be selected by the example in Listing 7.

```
apiVersion: v1
kind: Service
metadata:
    name: nginx-service
    labels:
        "app": "nginx"
        "environment": "production"
spec:
    ports:
        name: http
        protocol: TCP
        port: 80
        targetPort: 9376
```

This URL will be added by the service helper to the value of the template input with the type url as a string. Lastly, as with the other types explained in this text, the populated template will be sent to the AC API where the AC will create a test or monitor.

Full Examples

To give a better understanding of how monitors and tests are created, Examples are described.

The first Example is a Monitor that will create a monitor from the template with ID equal to 1. To give some context, the template used was a TCP monitor that creates a continuous stream between multiple clients and a server. The example creates several RMD sets using the available selector types. The sets are then used to populate the template inputs.

The second Example is a Test that will create a test from the template with ID equal to 2. To give some context, the template used was a HTTP test that queries an URL from multiple clients and validates the response depending on the HTTP status code and body content. The Example shows cases the url type and selects a nginx $Service^K$ that the selected Agents will query.

6.1.3 Controllers

Each CR that is managed by the Operator is being handled by a separate controller. These are all run by the same manager (i.e., executable). The controllers will listen for requests from the Kubernetes API and fire for its own CR Kind or watch for events for other resources of a Kind that it may need.

The design uses three different controllers that subscribe for resource updates regarding specific Kinds. Two of these controllers, from now on known as the CR controllers, listen for events regarding the Monitor and Test CRs Kind.

The third controller, referred to herein as the Taint controller, listens for events to core Kubernetes Kinds that may require the first two CR controllers to reconcile again.

To summarize the function of each controller,

Monitor Controller—Manages Monitor$^K$ CRs,

Test Controller—Manages Test$^K$ CRs,

Taint Controller—Triggers CR controllers on Agent Pod$^K$, generic Pod$^K$, and Service$^K$ updates.

Monitor Controller

The Monitor Controller will fire a reconciliation for events regarding CRs of the Kind Monitor$^K$. Examples of events that may happen and trigger a reconciliation are, Created new Monitor$^K$, Updated existing Monitor$^K$, Deleted Monitor$^K$.

These events are used to manage the life cycle of a Monitor$^K$ CR in Kubernetes. Changes to the cluster that require the reconfiguration of a monitor in AC are not listened to by the Monitor Controller. This is because the Taint controller will taint the Monitor$^K$ CR by setting the status of the CR to outdated, this will trigger a subsequent Monitor Controller reconciliation for the Monitor$^K$ CR.

The following are steps the Monitor Controller will take depending on the state of the Kubernetes cluster and the AC. The Monitor Controller will begin with the observe segment (see Section 3.2.2). Here the controllers receive a request, i.e., event, from the Kubernetes API that triggers the reconciliation loop. Then the analyze segment begins and the Monitor Controller will ascertain if the CR is scheduled for deletion. A scheduled deletion will result in that the Monitor Controller will act by stopping the associated AC monitor and return. The actual CR will be garbage-collected by Kubernetes after the Monitor Controller finishes its clean up logic.

In the other case, where the CR is not scheduled for deletion, the Monitor Controller will compare the current RMD configuration with the last applied configuration. An unchanged configuration will result in that the Monitor Controller simply returns. While in the other case, a changed configuration of the CR will continue the execution and check if the AC monitor is stopped. If the monitor has been stopped, the Monitor Controller will act by re-creating the monitor in the AC as it has not been scheduled for deletion which we checked for earlier-resulting in that the monitor in the AC is up-to-date with the RMD configuration stored in the CR Spec.

However, if the monitor is still running according to the AC, the Monitor Controller will act by stopping the monitor and change the status of the CR from running to stopped. This will trigger a subsequent reconciliation of the CR. In this subsequent reconciliation the Monitor Controller will follow the same logic as outlined before, i.e., it will create a new monitor in the AC.

Figure 14:
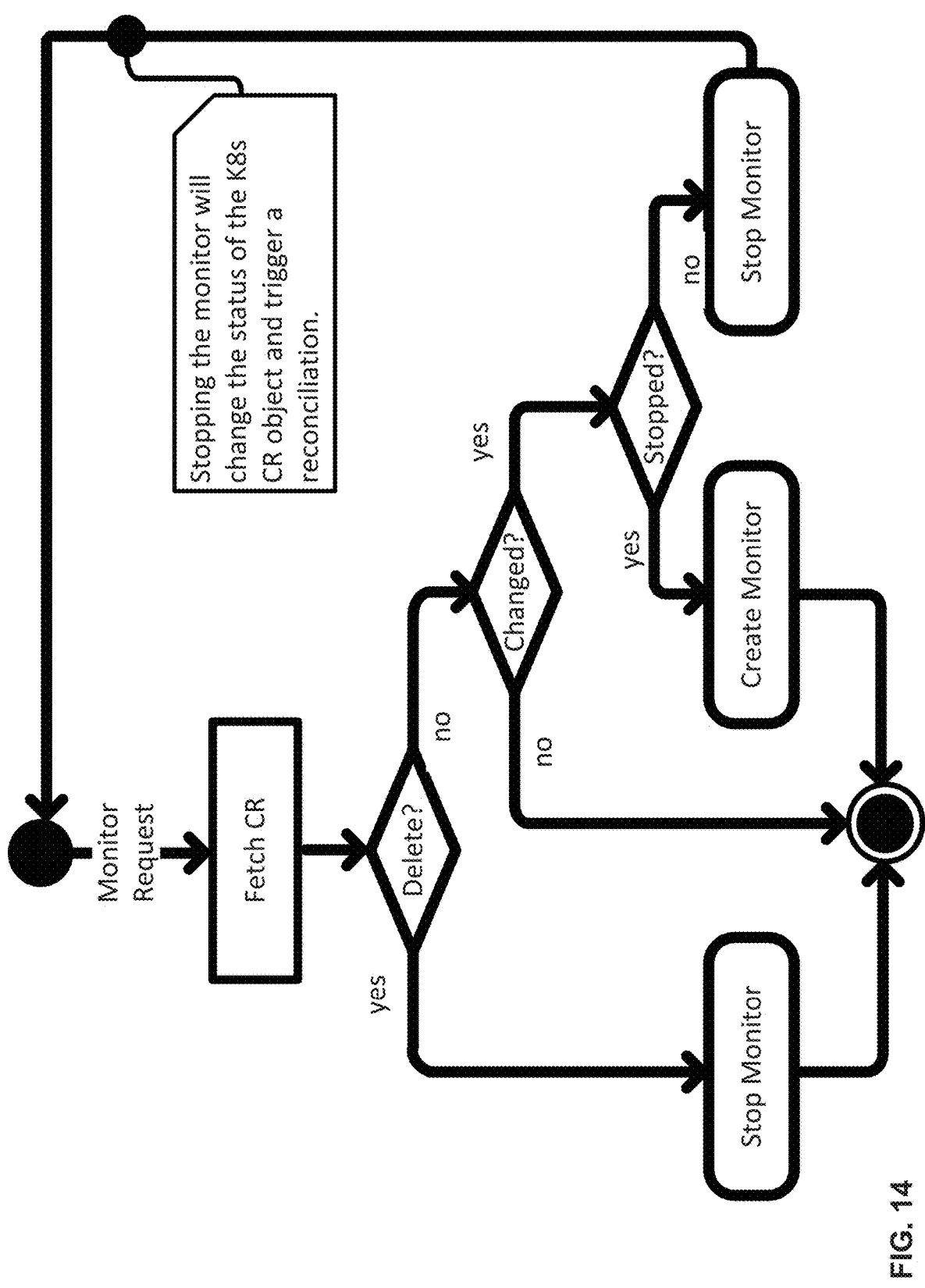
FIG. 14 is a block diagram illustrating an activity diagram of the decisions the Monitor Controller may take during a reconciliation.

FIG. 14 is a block diagram illustrating an activity diagram of the decisions the Monitor Controller may take during a reconciliation. Stopping the monitor will change the status of the Kubernetes CR object, and trigger a reconciliation. FIG. 14 shows an activity diagram of the Monitor Controller logic showing the different logical routes the Monitor Controller can take.

Test Controller

See the previous section about the Monitor Controller, as it describes some details that are left out here for brevity.

Similar to the Monitor Controller the Test Controller will fire a reconciliation for events regarding CRs of the Kind Test$^K$.

The events that will trigger a reconciliation are,

Created new Test$^K$,

Updating existing Test$^K$,

Rescheduled Test$^K$ reconciliation,

Deleted Test$^K$.

While a Monitor$^K$ is run continuously until explicitly removed a Test$^K$ is run in a 'one-shot' manner, i.e., they are removed from the Kubernetes cluster after it has concluded and its Time To Live (TTL) has passed. Concluded in this sense is when the test has either failed, passed, errored, or any other possible status that results in that the test has ended its execution.

When the Test$^K$ has concluded, the TTL will be used by the Test Controller to decide when to remove the Test$^K$ from Kubernetes. The time is counted from when the test was concluded.

Figure 15:
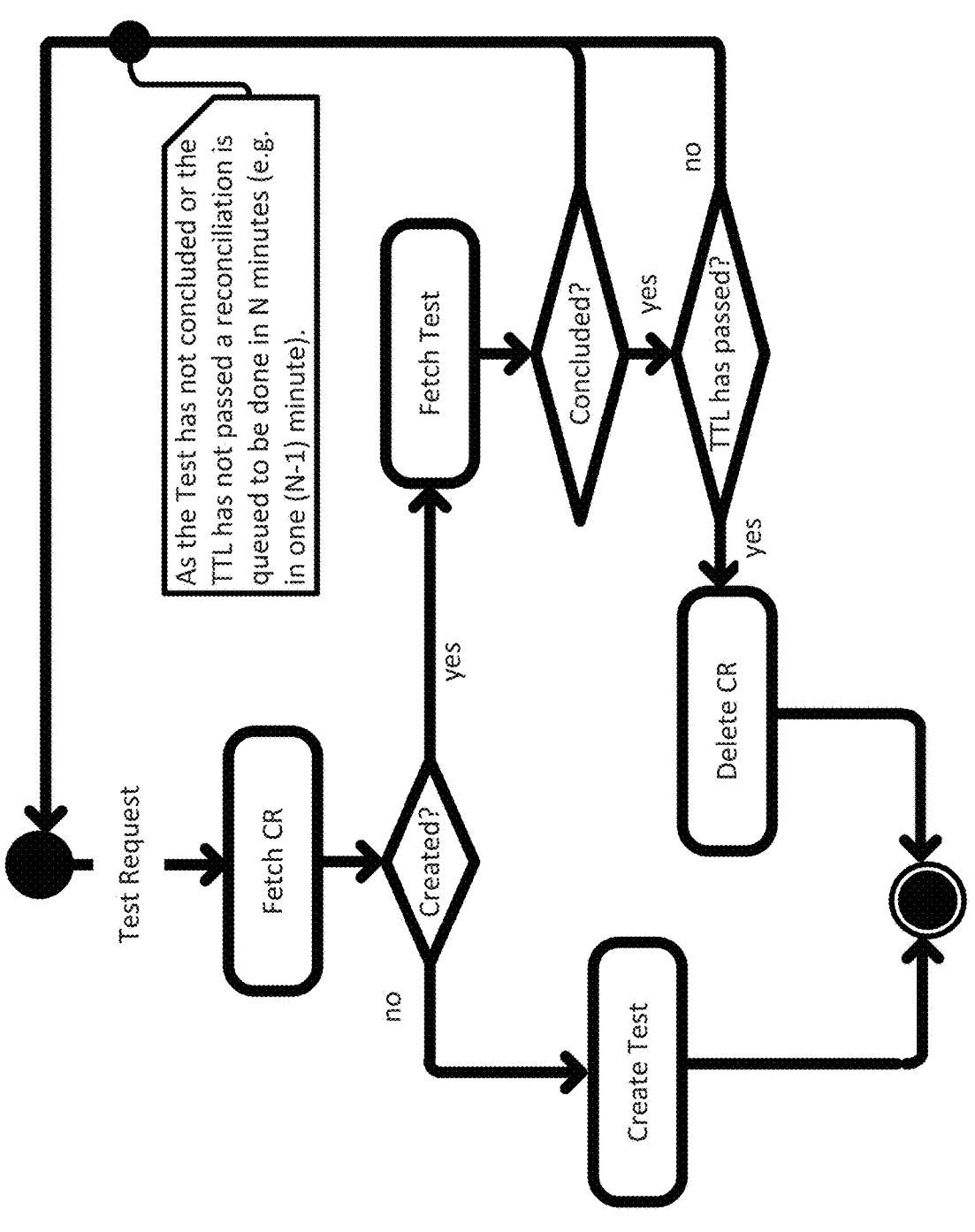
FIG. 15 is a block diagram illustrating an activity diagram of the decisions the test controller may take during a reconciliation.

FIG. 15 is a block diagram illustrating an activity diagram of the decisions the test controller may take during a reconciliation. The activity diagram shows the different paths the Test Controller reconciliation loop may take.

The Test Controller will start reconciliation observe segment when it receives a Test$^K$ request, this happens on every change (created or updated) to a Test$^K$ CR. Then the Test Controller fetches the Test$^K$ object via the Kubernetes API to then start the analyze segment of the reconciliation loop. In the analyze segment it will ascertain if the Test$^K$ object has been created (i.e., its status is set to that it has already been created by a previous reconciliation) or not. If the Test$^K$ object has not been created the Test Controller will act and create the test in via the AC API.

In the other case, if the Test$^K$ has already previously been created by an earlier reconciliation, the Test Controller will continue the observe segment by fetching the test instance via the AC API. Here the status of the test in AC is reconciled where if the test has not yet concluded a subsequent reconciliation will be queued to be done in N minutes (e.g. in one (N=1) minute). This will result in that the same reconciliation described in this paragraph will be executed later.

However, if the test in AC has concluded, the Test Controller will delete the Test$^K$ CR from the Kubernetes cluster once the specified TTL has passed-counted from the time after the Test$^K$ concluded.

Taint Controller

The Taint Controller is one of the simpler controllers. The Taint Controller has the responsibility of forcing the reconciliation of other CRs, in this case only the Monitor$^K$ CR. There have been no clear reason to also forcing the reconciliation of the Test$^K$ as of yet, but the Taint Controller is separated from the Monitor Controller for extensibility and simplifying the logic of the Monitor Controller.

The Taint Controller watches two kind of Kubernetes Kinds, Pod$^K$ and Service$^K$. Both are watched for changes to their labels that may trigger the CR Controllers as the CRs uses labels for matching with resources in the Kubernetes cluster.

Once the Taint Controller has discovered a change that may require the reconciliation of a CR it will taint the CR by settings the CRs Status field current to the boolean value false. Then the CR is updated and the Kubernetes API will trigger the reconciliation of the CR.

Lastly the CR controller will re-set the boolean value of the current Status field to true once it has reconciled.

Figure 16:
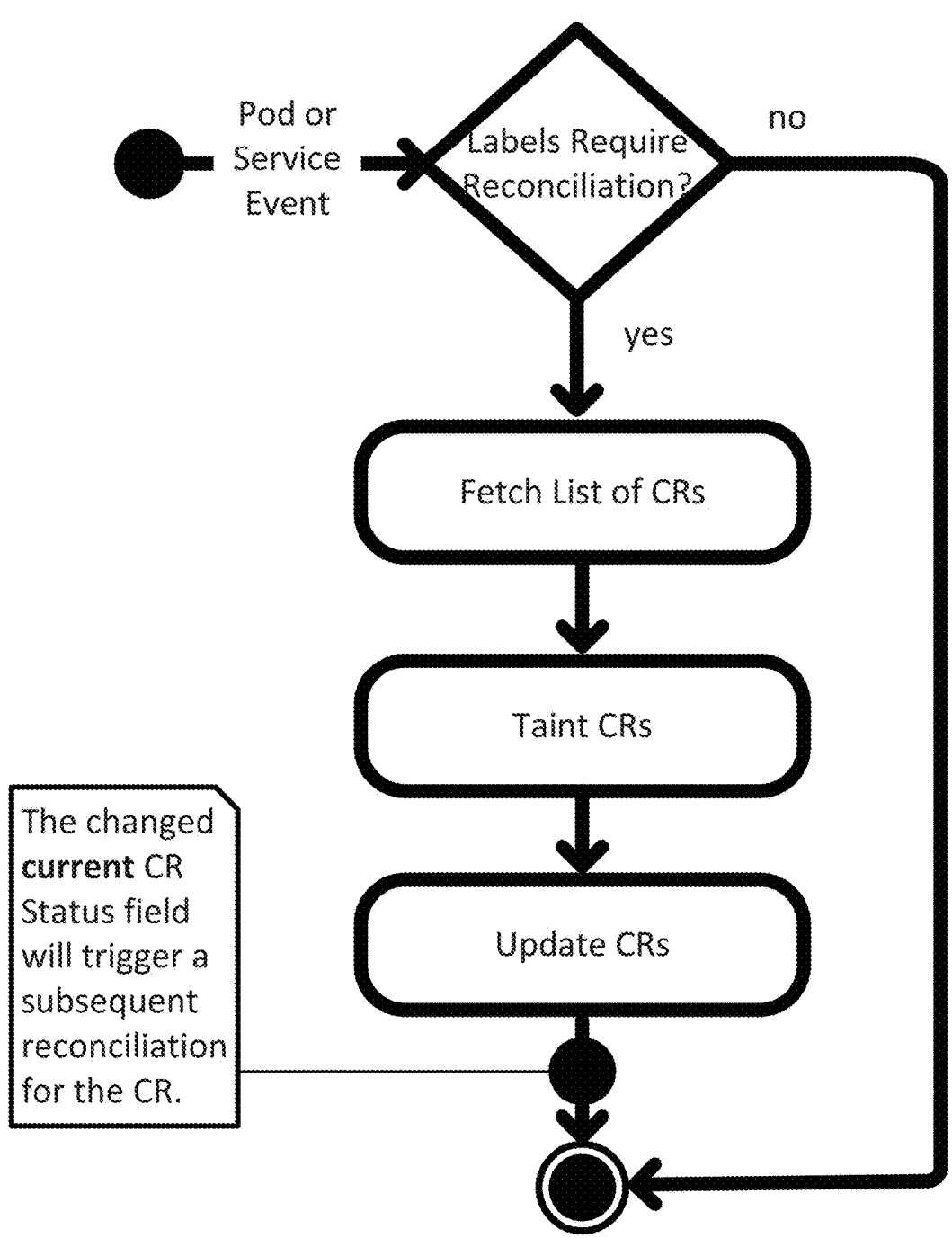
FIG. 16 is a block diagram illustrating an activity diagram of the decisions the Taint Controller may take during a reconciliation.

FIG. 16 is a block diagram illustrating an activity diagram of the decisions the Taint Controller may take during a reconciliation. The activity diagram in FIG. 16 illustrates the different decisions the Taint Control may take during a reconciliation.

6.1.4 Admission Webhooks

The overall theory behind Admission Webhooks are explained in the Theory chapter in Section 3.2.5.

Sidecar Mutating Admission Webhook

The Sidecar Mutating Admission Webhook (from now on known as the Sidecar Webhook for brevity) starts and stops Sidecar containers with Agents based on Pod$^K$ annotations. Admission Webhooks are chosen instead of simply listening to Kubernetes creation or update events like other controllers previously mentioned as Admission Webhooks are fired before they are persisted to the Kubernetes data store backend.

By being fired before, the Sidecar Webhook can mutate the request object before other Kubernetes components has picked up on the change and started to act on the content of the request object. In this case, if the Sidecar would have been added to the Pod$^K$ object without an Admission Webhook, the Pod$^K$ would first have been deployed on a node without the Sidecar container. And then subsequently been updated by the controller which will result in that the Pod$^K$ is terminated and a new Pod$^K$ instance started that has a Sidecar container. This behavior of quick Pod$^K$ restart cycles causes unnecessary cluster churn as every state the Pod$^K$ object enters will cause the Kubernetes API to create events that any cluster component that listens for Pod$^K$ events will have to reconcile. Even the controller that created the Sidecar would have its reconcile loop fired due to the nature of the reconcile loop as explained in Section 3.2.2.

The Sidecar Webhook Controller (from now on known as the Sidecar Controller for brevity) registers itself for Mutating Admission Webhook requests (i.e., the Sidecar Webhook) that regard any Pod$^K$ object that is to be created or updated in Kubernetes. The Sidecar Controller will then start a HTTPS web server that listen for the webhook requests on a URL path that it also specified when registering the Sidecar Webhook with Kubernetes.

In this implementation, the Sidecar Webhook is located at the path /mutate-core-v1-pod and the Sidecar controller only listens for HTTPS requests with the POST method.

As previously mentioned at the beginning of this section, the Sidecar Webhook will base its decisions to add, remove or not mutate a Pod$^K$ object based on its annotations. There is only a single annotation key that the Sidecar Controller cares about, "inject.example.com/sidecar". As previously mentioned at the beginning of this section, the Sidecar Webhook will base its decisions to add, remove or not mutate a Pod$^K$ object based on its annotations. There is only a single annotation key that the Sidecar Controller cares about, "inject.example.com/sidecar", and its Deployment$^K$ will create.

Figure 17:
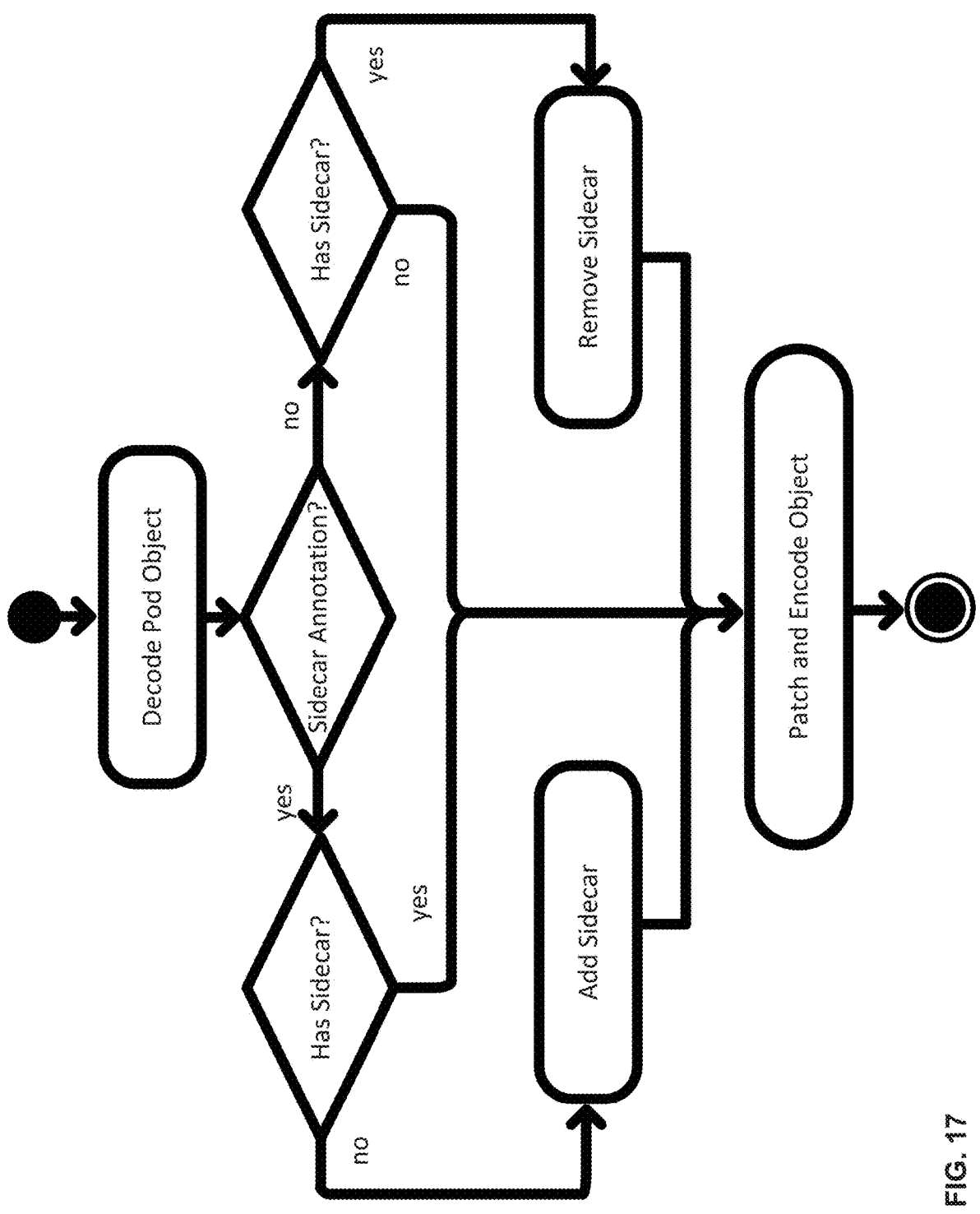
FIG. 17 is a block diagram illustrating an activity diagram showing the Sidecar Controller's decisions made based on the annotations.

FIG. 17 is a block diagram illustrating an activity diagram showing the Sidecar Controller's decisions made based on the annotations. Note that in the implementation the annotation may be considered to exist only if the value stored is the string "true" or any upper or lowercase version of the letters in that order so it forms the word true. The developer of a Deployment$^K$ can explicitly note that its Pods$^K$ should not have a Sidecar container by adding the annotation "sidecar.example.com/inject": "false" (or any other value that is not the word true). In practice the Sidecar Controller will simply ignore this annotation and consider the annotation as non-existent.

Listing 15: An example of a Deployment$^K$ that will will launch two Pods$^K$ with one nginx container and one Agent Sidecar container each.

```
apiversion: apps/v1
kind: deployment
metadata:
    name: nginx-deployment
spec:
    selector:
        matchlabels:
            run: nginx
    replicas: 2
    template:
        metadata:
        labels:
            run: nginx
        annotations:
            "sidecar.example.com/inject": "true"
    spec:
        containers:
            name: nginx
            image: nginx:1.14.2
            ports:
            containerport: 80
```

If the Sidecar Controller has decided to add a Sidecar container it will simply append a container object that is set up with the Agent image and required credentials to the Pod$^K$'s container list. Logically, if the Sidecar Controller has decided to remove the container, it will remove it from the Pod$^K$'s container list. Once the Pod$^K$ object has been mutated, it will be encoded and patched (i.e., sent) that will result in further handling by either other Admission Webhooks or Kubernetes components.

6.2 Agent Charts

The Agent Charts repository houses a single Helm Chart for running Agents in a Kubernetes cluster. The Chart uses a DaemonSet$^K$ as it fulfills the requirement outlined in Section 4.4 that mandates that the deployment of Agents must be able to target designated Kubernetes cluster nodes.

The Chart accepts values related to how the Agents should be scheduled onto nodes and passes them to the DaemonSet$^K$, nodeSelector—Selects nodes based on label keys and values, tolerations—Provide tolerations for tainted nodes, affinity—Attract Pods to nodes using an expressive rule syntax.

These are all standard Kubernetes primitives and should give the user maximum flexibility to deploy Agents onto nodes.

To configure the Agents with settings and credentials the Chart also accepts values related to authentication with the AC, site—The AC instance IP or domain name, email—The AC user e-mail, credentials—The AC credentials, account—The AC account, password—The AC password.

The first two (2) values are stored in a ConfigMap$^K$ that is attached to the resulting DaemonSet$^K$ Pods$^K$. The other three (3) values are stored in a Secret$^K$ that is attached to the resulting DaemonSet$^K$ Pods$^K$ as these are secrets and must be protected.

6.3 Troubleshoot Plugin

The Troubleshoot Plugin is implemented as an integration with the kubectl CLI command and is available by invoking it through kubectl as shown in Listing 16.

The plugin is written in the Go language. To implement the CLI functionality the spf13/cobra is used for parsing CLI arguments and flags. Available at: github.com/spf13/cobra.

Further configuration options for connecting with the Kubernetes API is provided by the Kubernetes.io/cli-runtime/pkg/genericclioptions. Available at: github.com/kubernetes/cli-runtime. The genericclioptions library will automatically read the kubectl configuration so that the user does not have to manually provide any connection configuration for the Kubernetes API. Furthermore, the library provides some standard flags such as for defining the Kubernetes namespace that are available in the standard kubectl CLI.

To communicate with the Kubernetes REST API the Kubernetes.io/client-go library is used. Available at: github-.com/kubernetes/client-go The plugin integrates with kubectl by the binary being named kubectl-troubleshoot and existing in the PATH. The kubectl CLI will find and invoke the kubectl-troubleshoot binary when asked to run kubectl troubleshoot. Any further arguments to the command will be passed as-is to the plugin.

The available commands are, ephemeral—Manage Agents deployed as Ephemeral containers, help—Help about the Troubleshoot CLI.

The ephemeral command allow the user to deploy an Ephemeral container running the Agent image. The available subcommands for the ephemeral command is shown in Listing 17.

Listing 16: Output when invoking kubectl troubleshoot—help.

```
$ kubectl troubleshoot --help
Plugin for troubleshooting resources in Kubernetes using
active assurance methodologies.
Usage:
   kubectl-troubleshoot [command]
Available Commands:
   ephemeral                    Manage Agents deployed as Ephemeral
                                containers
   help   Help about any command
Flags:
   -h, --help                   help for kubectl-troubleshoot
Use "kubectl-troubleshoot [command] --help" for more information about a command
```

Listing 17: Output when invoking kubectl troubleshoot ephemeral-help

```
$ kubectl troubleshoot ephemeral --help
Manage Agents deployed as Ephemeral containers.
Usage:
   kubectl-troubleshoot ephemeral [command]
Available Commands:
   deploy   Deploy an Agent as an Ephemeral container
                              in a Pod
   remove   Remove a Agent that has been deployed as
      an Ephemeral container in a Pod
Flags:
   -h, --help  help for ephemeral
Use "kubectl-troubleshoot ephemeral [command] --help" for more information about
a command.
```

Listing 18: Output when invoking kubectl troubleshoot ephemeral deploy—help.

```
$ kubectl troubleshoot ephemeral deploy --help
Deploy an Agent as an Ephemeral container in a Pod.
```

-continued

```
Usage:
   kubectl-troubleshoot ephemeral deploy POD [flags]
Flags:
   -a, --account string   AC account
   -h, --help  help for deploy
   -H, --host string  AC host
   -t, --token string  AC token (overrides
      'AC_API_TOKEN')
```

There are two subcommands available under the kubectl troubleshoot ephemeral command, deploy POD—Deploy an Ephemeral Agent at POD, remove POD—Remove the Ephemeral Agent from POD.

As noted in Section 3.2.7, Ephemeral containers does not yet support being removed. This command will always result in an error until support has been added to the Kubernetes API.

The targeted $Pod^K$ is referenced by its name in Kubernetes. When a user requests to deploy an Ephemeral Agent in a specified $Pod^K$ the plugin will retrieve the $Pods^K$ for the specified namespace (defaults to the default namespace). Then the target $Pod^K$ with its Ephemeral containers is retrieved by the $Pod^K$ name.

The plugin will ensure that there are no already running Ephemeral Agent for the $Pod^K$ before deploying a new one. If this is the case, the plugin will return and tell the user that the targeted $Pod^K$ has already an Ephemeral Agent deployed.

On the other hand, if there are no Ephemeral Agent deployed, the plugin will append an Ephemeral Agent with the name activeassurance-agent and configure it with the AC credentials that must be provided by the user. The required credentials for deploying an Ephemeral Agent are shown in Listing 18.

When a user requests to remove an Ephemeral Agent the plugin will start by doing the same procedure as when deploying an Ephemeral Agent. It will retrieve the $Pods^K$ for the specified namespace, find the targeted Pod$^K$, and finally retrieve the targeted Pod$^K$ 's Ephemeral containers.

The plugin will then look for an Ephemeral Agent in the list of Ephemeral container that it has retrieved. Ephemeral Agent are always given the same name, active-assurance-agent, so the plugin will simply search for an Ephemeral container by this name.

If there is a match, the plugin will remove the Ephemeral Agent from the list of Ephemeral containers and update the Pod$^K$ using the Kubernetes API.

On the other hand, if there is no match, the plugin will not make any changes to the Pod$^K$, resulting in a no-op.

However, as noted in Section 3.2.7, the Kubernetes API does not yet support the removal of Ephemeral containers. Therefore the final part of the removal stage where the Pod$^K$ is updated using the Kubernetes API will always fail.

This section verifies the proof-of-concept prototypes by testing the deployment scenarios described in Section 4.1. Each scenario is set up by creating a deployment that fulfills the described topology. Then the proof-of-concept prototypes are used to manage the active assurance platform in a Kubernetes cluster environment.

The function of the prototypes in question are then validated. Each validation procedure is using a method that the author considered sufficient to confirm its function. In particular, Chaos Mesh is mainly used to confirm that the prototype is set up correctly and that the AC reports the expected results. The particular Chaos Mesh simulations (known as experiments) for each scenario was chosen so that the components in question would discover a failure.

Finally, a summary is provided in the end of each scenario that describes what has been validated, how the prototype fulfills its requirements, and if the expected results has been achieved.

To give an insight into how the proof of-concept prototypes may be used, each procedure taken for the scenarios is described in detail with accompanying listings. There are many ways one may choose to set up and use the prototypes, and the following scenarios and installations should not be regarded as exhaustive.

7.1 Node to Node Connectivity

The deployment scenario described in Section 4.1.1 is created by deploying three (3) Agents using the Agent Chart described in Section 6.2.

The Agents were deployed with Helm on the Kubernetes cluster with three (3) worker nodes, this resulted in that the Kubernetes cluster was populated with the Agents shown in Listing 19. Because the Chart uses a DaemonSet$^K$, each Agent has been deployed inside its own Pod$^K$ on one Kubernetes worker node each.

The monitor for the deployment scenario is given by the Monitor$^K$ CR in Listing 20 and the template created in the AC. Here, the template inputs 'Clients', 'Rate (Mbit/s)', and 'ES Rate (Mbit/s)' are populated by the inputs clients, es_rate, and rate, respectively. The agents named selector will match against Agents with the label "app": "geared-marsupi-agent".

Listing 19: The command that was used to verify that the Helm command had indeed created an Agent at every node in the Kubernetes cluster.

```
$ kubectl get pods -o=custom-columns= \
    "NAME:metadata.name,NODE:spec.nodeName"
    NAME              NODE
    geared-marsupi-82kqc   kind-worker3
```

-continued

```
geared-marsupi-cc68f   kind-worker2
geared-marsupi-cxkrx   kind-worker
```

Listing 20: The Monitor$^K$ CR that was used to create a TCP full-mesh monitor between every available Agent in the Kubernetes cluster.

```
apiVersion: observability.example.com/v1alpha1 kind: Monitor
metadata:
    name: scenario-1
spec:
    templateId: 1
    agents:
        - name: geared-marsupi
          selector:
              matchLabels:
                  "app": "geared-marsupi-agent"
    inputs:
        clients:
            type: interface_list
            agents: [geared-marsupi]
        es_rate:
            type: float
            value: 0.1
        rate:
            type: float
            value: 1.0
```

The Monitor$^K$ CR was applied successfully to the Kubernetes cluster as shown in Listing 21.

The Operator has read the CR and created a TCP full-mesh task in the AC. Because there are three (3) nodes that are establishing a full-mesh bi-directional stream, there are six (6) streams in total.

Every Agent in the Kubernetes cluster that has the matching label shown in Listing 20 have been used for configuring the task in AC. This can be further verified by looking at the edit page of the task in AC. Indeed, there are three (3) Agents as expected with the same name as in the output shown in Listing 19. The other inputs, 'Rate (Mbit/s)' and 'ES Rate (Mbit/s)', have also been correctly populated with the values defined in the CR in Listing 20.

The Chaos Mesh experiment described in Listing 22 was applied to the Pods$^K$ in the Kubernetes cluster. This experiment introduced a loss of 50% that correlated 50% with the previously sent packet. The experiment ran repeatedly for 10 seconds every 15 seconds.

Listing 21:

```
$ kubectl apply -f scenario-1-monitor.yaml
monitor.example.com/scenario-1 created
$ kubectl get monitors
NAME        ID   CREATED   CURRENT
scenario-1   14   true      true
```

Listing 22: The Chaos Mesh experiment that was used to introduce network loss between the Agent Pods$^K$.

```
apiVersion: chaos-mesh.org/v1alpha1
kind: NetworkChaos
metadata:
    name: scenario-1-experiment
spec:
    action: netem
    mode: one
    selector
        namespaces:
```

-continued

```
        -   default
        labelSelectors:
            "app": "geared-marsupi-agent"
        loss:
            loss: "50"
            correlation: "50"
        duration: "10s"
        scheduler:
            cron: "@every 15s"
```

As expected, the introduced network chaos resulted in that the AC reported that the Agents were having problems maintaining the TCP fullmesh network stream.

Then, one of the Pods$^K$ were deleted to verify that the Agent correctly discovers that a new Pod$^K$ is replaced by the DaemonSet$^K$. The Pod$^K$ with the name geared-marsupi-82kqc was deleted with the command in Listing 23. This resulted in a new Pod$^K$ named geared-marsupi-jpnm5 and that the old monitor was removed and a new was created with the new Agent included. This was shown in the AC, where the old monitor was stopped, and a new one is running.

Lastly, the monitor task was successfully stopped by issuing the command in Listing 24. Subsequently, a verification by looking in the AC UI showed that the monitor task had been stopped. This was displayed in the AC UI as a 'stop' symbol.

This verifies that the proof-of-concept Agent Charts prototype was able to deploy Agents in a cluster on every node as described as a requirement in Section 4.4.

The proof-of-concept Operator prototype successfully started the monitor task with the correct Agents and parameters. Furthermore, the prototype was able act on cluster changes where it stopped the old monitor and created a new one with the new Agent. Lastly, the prototype was able to remove the monitor task CR from the cluster and stop the monitor in the AC.

By starting the Chaos Mesh experiment the Agents did indeed have connection issues, which were successfully reported in the AC UI.

Listing 23: The commands that was used to delete the geared-marsupi-82kqc Pod$^K$ from the Kubernetes cluster and verifying that a new monitor had been created.

```
$ kubectl delete -f pods geared-marsupi-82kqc
pod "geared-marsupi-82kqc" deleted
$ kubectl get pods
NAME                    READY     STATUS    RESTARTS  AGE
geared-marsupi-jpnm5    1/1       Running   0         21s
geared-marsupi-cc68f    1/1       Running   0         44m
geared-marsupi-cxkrx    1/1       Running   0         44m
$ kubectl get monitors
NAME          ID   CREATED      CURRENT
  scenario-1  15   true         true
```

Listing 24: The commands that was used to delete the Monitor$^K$ CR from the Kubernetes cluster and stop the monitor in the AC.

```
$ kubectl delete -f scenario-1-monitor.yaml
monitor.example.com "scenario-1" deleted
$ kubectl get monitors
No resources found in default namespace.
```

7.2 Node to Service Validation

The deployment scenario described in Section is created by deploying a single (1) Agent using the Agent Chart described in Section 6.2. The Chart was deployed using Helm with the command in Listing 25 and a nodeSelector included to the Chart as a file. The content of the file can be found in Listing 26. The included selector instructed the Chart to target a single node that had the specific label node.example.com/select: "true".

The web application is a nginx web server that hosts the default nginx welcome message in a HTML response. The Deployment$^K$ and Service$^K$ that is used can be found in the following Example. The Deployment$^K$ has an added affinity setting so that the Pods$^K$ with the nginx application are only scheduled onto nodes that does not have the node.example-.com/select: "true" label. Furthermore, the affinity setting also ensure that there is only a single nginx Pod$^K$ at each node.

By issuing the commands shown in Listing 27 the Kubernetes cluster setup was verified to be correct.

Listing 25: The Helm command that was run to create an Agent located at a single worker node in the Kubernetes cluster.

```
$   helm install geared-marsupi -f values.yaml \
    ./agent-charts/daemonset-agents
```

Listing 26: The content of the values. yaml file that was used to instruct the DaemonSet$^K$ to create an Agent at the nodes with a specific label.

```
nodeSelector:
    node.example.com/select: "true"
```

Listing 27: The command that was used to verify that the Kubernetes cluster setup was correct.

```
$ kubectl get pods -o=custom-columns= \
    "NAME:metadata.name,NODE:spec.nodeName"
    NAME                                  NODE
    geared-marsupi-n5hss                  kind-worker
    nginx-deployment-787d4dcd49-4cgfm     kind-worker3
    nginx-deployment-787d4dcd49-c2wtx     kind-worker2
```

The monitor for the deployment scenario is given by the Monitor$^K$ CR in Listing 28 and the template created in the AC. The template creates a HTTP task that will continuously validate the response of a HTTP URL target.

The template inputs will be populated with its corresponding input in the Monitor$^K$ CR, 'Clients'—clients, 'URL'—url, 'Time between requests(s)'
    time_between_requests, 'HTTP response code'—response_code, 'Response content'—response_regexp.

The CR have also two (2) selectors, one for Agents and one for Services$^K$. The agent selector, 'ta', will match with Agents that have the label "app": "geared-marsupi-agent". While the services selector, 'nginx', will match with Services$^K$ that have the label "app": "nginx".

The Monitor$^K$ CR was applied successfully to the Kubernetes as shown in Listing 29. In the output from the command, the AC monitor ID is included. This can later be used for finding the same monitor in the AC UI.

Listing 28: The Monitor$^K$ CR that was used to create a HTTP monitor between the Agent and the Service$^K$ in the Kubernetes cluster.

```
apiVersion: observability.example.com/v1alpha1 kind: Monitor
metadata:
    name: scenario-2
spec:
    templateId: 2
    agents:
        - name: ta
          selector:
              matchLabels:
                  app: geared-marsupi-agent
    services:
    - name: nginx
          selector:
              matchLabels:
                  app: nginx
    inputs:
        clients:
            type: interface_list
            agents: [ta]
        url:
            type: url
            service:
                name: nginx
                servicePort: http
                serviceType: ClusterIP
                scheme: http
        time_between_requests:
            type: integer
            value: 10
        response_code:
            type: integer
            value: 200
        response_regexp:
            type: string
            value: "(nginx)"
```

Listing 29: The commands that were used to apply the Monitor[K] CR and then verify that the Operator had indeed created the monitor.

```
$ kubectl apply -f scenario-2-monitor.yaml
monitor.example.com/scenario-2 created
$ kubectl get monitors
NAME        ID     CREATED     CURRENT
scenario-2  18     true        true
```

That the monitor had been created was further verified by looking in the AC UI where the monitor could be found as shown in FIG. 7.8. Here, the single Agent in the Kubernetes cluster has been correctly matched against using the label for the Agent in Listing 28.

Looking at the edit page in the AC UI for the monitor, it can be verified that the Operator has correctly populated the URL with the Service[K] and that the 'Clients' input is populated by the Agent. The 'Time between requests(s)', 'HTTP response code', and 'Response content' inputs are also correctly populated with the values defined in the CR in Listing 28.

The Chaos Mesh experiment described in Listing 30 was applied to the nginx Pods[K] in the Kubernetes cluster. This experiment introduced network packet corruption for 90% of all packets for a duration of 10 seconds every 15 seconds. The corruption of packets correlated with 50% of the time with a previously corrupted packet.

As expected, the introduced network chaos was reported in the AC UI. The network corruption resulted in that the Service[K] periodically returned the wrong HTTP status and a bad body content that did not match the regular expression.

This verifies that the proof-of-concept Operator prototype is able to match against a Service[K] in the cluster and run a HTTP monitor task against it. Furthermore, the CR in Listing 28 show cases the possibility of providing integer and string values to a template in the AC.

The Agent Chart was able to be used for creating a single Agent that was not located on the same node as the nginx Pods[K]. However, this required an explicit affinity setting in the nginx Deployment[K]. By applying a Chaos Mesh experiment that introduced packet corruption for the nginx Pods[K] the Agent did indeed find the issue and reported it to the AC.

Listing 30: The Chaos Mesh experiment that was used to introduce network packet corruption between the Service[K] and Pods[K].

```
apiVersion: chaos-mesh.org/v1alpha1 kind: NetworkChaos
metadata:
    name: scenario-2-experiment
spec:
    action: netem
    mode: all
    selector:
        namespaces:
            - default
        labelSelectors:
            "run": "nginx"
    corrupt:
        corrupt: "90"
        correlation: "50"
    duration: "10s"
    scheduler:
        cron: "@every 15s"
```

7.3 Pod to Pod Connectivity

The deployment scenario described in 4.1.3 is created by deploying a DHT in the Kubernetes cluster. The DHT consists of four (4) DHT nodes (inside Pods[K]) that are scheduled onto the available Kubernetes worker nodes. The Agents are deployed inside the DHT node Pods[K] by adding the Agent Sidecar annotation "sidecar.example.com/inject": "true".

All the resources that were used to deploy this DHT are described herein for reference.

By issuing the commands in Listing 31 the DHT was created and verified to have been set up correctly. Indeed, there are four (4) Pods[K] hosting the DHT node application and the Pods[K] have been scheduled onto all of the available Kubernetes worker nodes. Importantly, the READY column in the output show that there are two (2) running containers inside each Pod[K]. This demonstrates that not only have the DHT node container been started, but also a second container hosting the Agent application.

Inspecting each Pod[K] by issuing a command like shown in Listing 32 it can be further verified that each Pod[K] also hosts the Agent application running as a Sidecar container.

In the AC UI the Sidecar Agents can be found.

Listing 31: The commands that was used to deploy the DHT and verifying that it had been correctly set up. Some columns from the second command have been removed for brevity.

```
$ kubectl apply -f dht.yaml
service/bootstrap created
deployment.apps/bootstrap
```

-continued

```
deployment created
deployment.apps/node-
deployment created
$ kubectl get pods -o wide
NAME                   READY  STATUS   AGE  IP          NODE
bootstrap-deployment-  2/2    Running  11s  10.244.1.2  kind-worker3
node-deployment-       2/2    Running  11s  10.244.2.2  kind-worker2
6575bbb87d-bgts4                            2
node-deployment-       2/2    Running  11s  10.244.1.2  kind-worker3
6575bbb87d-kqlc4                            5
node-deployment-       2/2    Running  11s  10.244.3.2  kind-worker
```

Listing 32: The output from inspecting one of the Pods$^{K}$. The ' . . . ' indicates output that have been removed for brevity.

```
$ kubectl describe pods node-deployment-6575bbb87d-bgts4
...
Labels:
  example.com/instance-type=agent
  ...
Annotations:
  sidecar.example.com/inject: true
  sidecar.example.com/name: sidecar-agent-gxrq9
...
Containers:
  camomile:
                ...
    Image:   dhtnode
                ...
  sidecar-test-agent:
                ...
    Image:   example.com/agent-application:...
                ...
```

After the Sidecar Agents had been verified to be running, an UDP test was applied. This test verifies, among other things, the packet rate and loss. The test was defined using a Test$^{K}$ CR attached in Listing 33. The Sidecar Agents that were located at each DHT node Pod$^{K}$ was matched against using the labels "run": "node" and "run": "bootstrap". The template was created in the AC UI before applying the Test$^{K}$ CR. The template ID given by the AC was then referenced in the Test$^{K}$ CR. Lastly, the value inputs 'Loss (%)' and 'Rate (Mbit/s)' that are required by the template was given by the inputs es_loss and loss, respectively, in the Test$^{K}$ CR.

Listing 33: The Test$^{K}$ CR that was used to create a UDP test between the DHT Pods$^{K}$

```
apiVersion: observability.example.com/v1alpha1 kind: Test
metadata:
  name: scenario-3
spec:
  templateId: 1
  agents:
    - name: nodes
      selector:
        matchLabels:
          "run": "node"
```

-continued

```
    - name: bootstrap
      selector:
        matchLabels:
          "run": "bootstrap"
  inputs:
    clients:
      type: interface_list
      agents: [nodes, bootstrap]
    es_loss:
      type: float
      value: 10
    rate:
      type: float
      value: 1.0
```

The Test$^{K}$ CR was successfully applied and verified to have been created in the Kubernetes cluster by issuing the commands in Listing 34. The test has been given an ID in AC and that it has begun running. However, the start time is unknown due to a bug in the AC API. The end time is marked as unknown because the test has not finished yet.

Looking in the AC UI the running test can be found. Here there are four (4) Agents running a full-mesh UDP test between each other. This is expected as there are four (4) DHT nodes.

Looking at the edit page in the AC UI for the test, it can be verified that the Operator has correctly populated the 'Loss (%)' and 'Rate (Mbit/s)' template inputs as defined in the Test$^{K}$ CR in Listing 33.

Listing 34: The commands that was used to apply and verify that the Test$^{K}$ had been created in the Kubernetes cluster. Some output have been truncated for brevity.

```
$ kubectl apply -f scenario-3-test.yaml test.example.com/scenario-3
created
$ kubectl get tests
NAME        ID  START TIME  END TIME   STATUS
scenario-3  19  <unknown>   <unknown>  running
```

Listing 35: The output that was given while monitoring the test from the command line.

```
$ kubectl get tests -w
NAME        ID  START      END TIME              STATUS   TTL
scenario-3  19  <unknown>  <unknown>             running  forever
scenario-3  19  <unknown>  <unknown>             running  forever
scenario-3  19  <unknown>  2020-10-19T12:56:56Z  passed   forever
```

The test was run for 60 seconds and could be monitored using the command line as shown in Listing 35. The last line from this command show that the test have finished and has concluded as 'passed', i.e., a successful test result.

Indeed, from the AC UI the result can be further verified as passed. Here the test has the same end time (in the 'Completed' column) as in the command line output in Listing 35.

Now, a Chaos Mesh experiment was created that introduced a 50% loss with 50% correlation to a previously lost packet. The experiment ran repeatedly for 10 seconds with an interval of 15 seconds. Given that the test is configured to fail when the loss is above 10% it should be enough to create a test result failure. The experiment was configured to introduce the loss to the Pods$^K$ with the "run": "node" label.

The old Test$^K$ resource was removed before running the test again. This is due to two (2) reasons. First (1), in the Kubernetes cluster there must only be one resource with the same name for a namespace. Second (2), Test$^K$ are only run once for a specific time and must be re-applied to be run again. After the old Test$^K$ had been removed, the Test$^K$ was applied and monitored using the command line. These steps can be found in Listing 37.

As expected, shown in Listing 37, the test fails. The actual reason for failure can be seen in the AC UI where the loss is reported to be above 10% between some Agents. A screenshot of this can be found in FIG. 7.16.

Listing 38: The commands used to re-apply the resources without the Sidecar annotation, and verify that the Sidecars were removed.

```
$ kubectl apply -f dht.yaml service/bootstrap
unchanged deployment.apps/bootstrap-deployment
configured deployment.apps/node-deployment
configured
$ kubectl get pods
NAME                                    READY    STATUS        RESTARTS    AGE
bootstrap-deployment-6cf56f944f-vh86l   1/1      Running       0           16s
bootstrap-deployment-77bfbd8748-xws7j   2/2      Terminating   0           19h
node-deployment-7755579cc8-8qbw5        1/1      Running       0           15s
node-deployment-7755579cc8-d8jbx        1/1      Running       0           16s
node-deployment-7755579cc8-dpld8        1/1      Running       0           13s
node-deployment-db9bd7c8f-4dg4t         2/2      Terminating   0           19h
node-deployment-db9bd7c8f-k8jgz         2/2      Terminating   0           19h
node-deployment-db9bd7c8f-ps6qv         2/2      Terminating   0           19h
```

The Chaos Mesh experiment configuration can be found attached in Listing 36.

Listing 36: The Chaos Mesh experiment used that was configured to make the test fail.

```
kind: NetworkChaos
metadata:
    name: scenario-3-experiment
spec:
    action: netem
    mode: one
    selector:
        namespaces:
        - default
        labelSelectors:
            "run": "node"
    loss:
        loss: "50"
        correlation: "50"
    duration: "10s"
    scheduler:
        cron: "@every 15s"
```

Listing 37: The commands used to remove, re-apply and monitor the test.

Finally, to remove the Agent Sidecar containers, the "sidecar.example.com/inject": "true" annotation was removed from the Kubernetes resource files described. The resources were re-applied to the Kubernetes cluster and later verified to have had the Sidecars removed. Listing 38 show that after the annotation had been removed, the old Pods$^K$ were terminated. The new instances are started without the Sidecars (1/1 ready containers instead of 2/2).

This verifies that the proof-of-concept Operator prototype is able to deploy Agent Sidecar containers in Pods that have been annotated with the "siddecar.example.com/inject": "true" annotation. The Operator also successfully matched against these Agent Sidecar containers and used them to populate a test in the AC. However, there were bugs in the AC API that resulted in that the start time is not available from the command line. The Chaos Mesh experiment show cased that network loss could be found between the Pods that the Agent Sidecar container were located in. Finally, the Agent Sidecars were successfully removed after the Sidecar annotation had been deleted from the Kubernetes resources. As expected, deleting the annotation resulted in that the Pods$^K$ were terminated and replaced by new instances.

```
$ kubectl delete -f scenario-3-test.yaml
test.observability.example.com "scenario-3" deleted
$ kubectl apply -f scenario-3-test.yaml
test.observability.example.com/scenario-3 created
$ kubectl get -w tests
NAME         ID    START TIME    END TIME                STATUS      TTL
scenario-3   21    <unknown>     <unknown>               scheduled   forever
scenario-3   21    <unknown>     <unknown>               running     forever
scenario-3   21    <unknown>     2020-10-19T14:35:44Z    failed      forever
```

7.4 Ingress Validation

The deployment scenario is deployed as described in Section 4.1.4. Two (2) Agents instances have been deployed in one region each, North California and Ireland. The Kubernetes cluster is located in Stockholm and have a nginx Ingress$^K$ controller installed. The Agents were assigned a tag named 'remote' through the AC UI.

As described in Section 4.1.4, the Kubernetes cluster deployment hosts a HTTP Service$^K$ that load balances requests over two (2) Pods$^K$. The web application is a simple nginx web server that responds with the default nginx welcome page. Lastly, the Service is externally accessible by an Ingress$^K$ resource that points to the Service$^K$. All the resources for the Kubernetes cluster deployment are described herein for reference. The AC server was located on the same instance as the Kubernetes cluster.

By issuing the commands in Listing 39 the web application was created and verified to have been set up correctly. Indeed, there are two (2) Pods$^K$ hosting the nginx web application. The firewall in front of the instance hosting the Kubernetes cluster was configured to allow incoming connections from the Agents and the authors computer. The web application was verified to be accessible remotely from the authors computer and the Agents was verified to be connected with the AC.

Then, the Monitor$^K$ CR found in Listing 39 was applied to the Kubernetes cluster. This CR will use a URL template with the ID four (4). The CR have been configured to populate the template input with Agents that have the tag named 'remote'. The template inputs 'URL', 'URL response code', and 'Response content' are populated by the in-puts url, response_code, and response_regexp, respectively.

Listing 39: The commands that was used to deploy the web application and verifying that it had been correctly set up. Some columns from the first command have been removed for brevity.

```
$ kubectl get pods -o wide
NAME              READY STATUS  RESTARTS  AGE   IP          NODE
nginx-deployment-6 1/1  Running  0        159m  10.244.2.2  kind-worker3
nginx-deployment-6 1/1  Running  0        159m  10.244.1.5  kind-worker2
$ kubectl get services nginx-service
NAME          TYPE       CLUSTER-IP          EXTERNAL-IP  PORT(S)  AGE
nginx-service ClusterIP  10.96.20.25         <none>       80/TCP   159m
$ kubectl get ingress nginx-ingress
NAME          CLASSHOSTS     ADDRESS     PORTS      AGE
nginx-ingress <none>  *          localhost    80         159m
```

Listing 40: The Monitor$^K$ CR that was created. The URL have been truncated to fit the width of this document.

```
apiVersion: observability.example.com/v1alpha1 kind: monitor
metadata:
    name: scenario-4
spec:
    templateId: 3
    agents:
        - name: remote
          selector:
              matchTags: ["remote"]
    inputs:
        clients: { type: interface_list, agents: [remote] }
        url:
            type: string
            value: "http://[..].eu-north-1.[..].amazonaws.com/"
        response_code: { type: integer, value: 200 }
        response_regexp: { type: string, value: "(nginx)" }
```

The commands in Listing 41 were run to apply the CR and verify that it has been created. Indeed, there is a monitor that has been created in the AC. The two (2) available remote Agents can also be verified to have been matched by the Operator. Further verification can be made by looking edit page of the running monitor. Here, all of the template inputs have been filled with the correct values and Agent clients.

Finally, to simulate a WAN misconfiguration, the firewall rule that allowed the Agent in Ireland to access the web application was removed. As expected, the misconfiguration resulted in that the AC UI reported that the Ireland Agent cannot access the web service anymore.

Importantly, this scenario verifies that the Operator can match against remote Agents that are not located in the Kubernetes cluster. The possibility to use raw values for URL template inputs was show cased in the CR in Listing 40. Here the url input was provided a string instead of the url type like in Listing 28. Lastly, the introduced WAN misconfiguration show that the deployment scenario can indeed help with identifying network issues outside of the Kubernetes cluster.

Listing 41: The commands that was run to apply the Monitor$^K$ CR and subsequently verify that it was created.

```
$ kubectl apply -f scenario-4-monitor.yaml
monitor.example.com/scenario-4 configured
$ kubectl get monitors
NAME        ID    CREATED    CURRENT
scenario-4  25    true       true
```

7.5 Troubleshoot Pod

The deployment scenario described in 4.1.5 is created by deploying a DHT in the Kubernetes cluster. The DHT consists of two (2) DHT nodes (inside Pods$^K$) that are scheduled onto the available Kubernetes worker nodes. The Pods are interconnected with one Service$^K$ each. All the resources that were used to deploy this DHT are described herein.

By issuing the commands in Listing 43, the DHT was created and verified to have been set up correctly. Here, there are two (2) Pods$^K$ that have been given one Service$^K$ each.

Then, the proof-of-concept Troubleshoot Plugin prototype described in 6.3 was used to deploy ephemeral Agents on each Pod$^K$. The Agents was deployed using the commands in Listing 44. Each command targeted a specific Pod$^K$, i.e., dht-node-1 and dht-node-2, and was given the required credentials so that the Agents could authenticate with the AC.

The Pods$^K$ were then inspected to verify that the plugin had deployed the ephemeral Agents containers. Indeed, as shown for one of the Pods$^K$ in Listing 45, the Agents were correctly deployed as ephemeral containers. The set up was further verified by looking in the AC UI. Here, the two (2) Agents were found and had been given the same name as the Pods$^K$ they were hosted in by the plugin.

In the requirement in Section 4.5, it is demanded that the targeted Pods$^K$ must not be restarted as a side effect of adding the ephemeral Agents. By running the command in Listing 42, it was verified that the Pods$^K$ had not restarted since adding the ephemeral Agents. Indeed, the RESTARTS column show that the Pods$^K$ have never been restarted since deployment.

Listing 42: The command that was run to verify that the Pods$^K$ had not been restarted after adding the ephemeral Agents.

```
$ kubectl kubectl get pods
NAME        READY   STATUS    RESTARTS   AGE
dht-node-1  1/1     Running   0          11m
dht-node-2  1/1     Running   0          11m
```

Listing 43: The commands that was run to apply the DHT deployment and subsequently verify that it was created correctly.

```
$ kubectl apply -f dht.yaml
pod/dht-node-1 created
pod/dht-node-2 created
service/dht-node-1 created
service/dht-node-2 created
$ kubectl get pods
NAME        READY   STATUS    RESTARTS   AGE
dht-node-1  1/1     Running   0          6s
dht-node-2  1/1     Running   0          6s
```

Listing 44: The commands that was run deploy an ephemeral Agent on each Pod$^K$.

```
$ export AC_API_TOKEN=<redacted>
$ kubectl troubleshoot ephemeral deploy dht-node-1 \
    -H 10.10.10.1 -a dev
$ kubectl troubleshoot ephemeral deploy dht-node-2 \
    -H 10.10.10.1 -a dev
```

Listing 45: The command that was run to inspect the dht-node-1 Pod$^K$. The ' . . . ' indicates output that have been removed for brevity.

```
$ kubectl describe pods dht-node-1
Name: dht-node-1
...
Containers:
  camomile:
    ...
Ephemeral Containers:
  active-assurance-agent:
    ...
    Image: example.com/agent-application
    ...
    State: Running
```

A simple full-mesh UDP test that ran for 60 seconds was created between the Agents. This test was defined through the AC UI.

Then, the Chaos Mesh CR in Listing 46 was applied to the Kubernetes cluster. This CR introduced 50% loss that was 50% correlated with a previously lost packet. The loss repeatedly occurred for 10 seconds every 15 seconds. Lastly, the previously run test in 7.24 was re-run, resulting in the report in 7.23. Here, the introduced repeatedly occurring network loss can be seen.

This scenario verifies that it is possibly to deploy ephemeral Agents that will not cause the side effect of restarting Pods$^K$. These Agents were available as usual in the AC UI where the user can create troubleshooting tasks between them. Finally, the introduced network loss show cased the possibility of finding network related errors between the Pods in a cluster.

However, the available tasks in the AC UI were limited. For example, tests for finding the MTU and running packet capture were not available. As noted in Section 3.2.7 and 6.3 it is not possibly to remove Ephemeral Containers, as such the Agents will remain in the Pods indefinitely or until the Pods are restarted.

Listing 46: The Chaos Mesh CR that was applied to introduce network loss.

```
apiVersion: chaos-mesh.org/v1alpha1 kind: NetworkChaos
metadata:
    name: scenario-5-experiment
spec:
    action: netem
    mode: all
    selector:
        namespaces:
          - default
        labelSelectors:
            "node": "dht-node-1"
    corrupt:
        corrupt: "50"
        correlation: "50"
    duration: "10s"
    scheduler:
        cron: "@every 15s"
```

7.6 Initial Deployment Validation

The deployment scenario described in 4.1.6 is created by deploying a HTTP web application in the Kubernetes cluster and deploying a single (1) Agent. The web application consists of two Pods$^K$ that are managed by a Deployment$^K$. The web application is a simple nginx web server that responds with the default nginx welcome page. The Deployment$^K$ is accessible from the outside of the cluster using a Service$^K$ and an Ingress$^K$. All the resources that were used to deploy the web application are described.

The Agent was deployed using the Agents Chart described in 6.2. The Chart was deployed using Helm with the command in Listing 47. A nodeSelector was included to the Chart as a file. The content of the file can be found in Listing 48. The included selector instructed the Chart to target a single (1) node that had the specific label node.example-.com/select: "true".

Listing 47: The Helm command that was run to create an Agent located at a single worker node in the Kubernetes cluster.

```
$ helm install geared-marsupi -f values.yaml \
    ./agent-charts/daemonset-agent
```

US 12,701,070 B2

65                                                          66

Listing 48: The content of the values.yaml file that was
used to instruct the DaemonSet[K] to create an Agent at the
nodes with a specific label.

nodeSelector:

"node.example.com/select": "true"

By issuing the commands in Listing 49, the web appli-
cation was created and verified to have been set up correctly.
Here there are two (2) Pods[K] hosting nginx that are load
balanced by a Service[K]. The Service[K] is accessible from
outside of the Kubernetes cluster by an Ingress[K]. The nginx
application was verified to be accessible and serving the
expected welcome page from outside of the Kubernetes
cluster.

Then, the Test[K] CR in Listing 50 was applied to the
Kubernetes cluster. This CR will use an URL template with
the ID one (1). The template configuration can be found in
FIG. 7.25. The CR have been configured to populate the
template with the Agent that have the label geared-marsupi-
agent. The template inputs 'URL', 'URL response code', and
'Response content' are populated by the inputs url, respon-
se_code, and response_regexp, respectively. Furthermore,
the CR is configured with ttlSecondsAfterFinished: 600, this
will tell the Operator to remove the CR after six hundred
(600) seconds (ten (10) minutes) after the test has concluded.

Listing 49: The commands that was run to apply the nginx
deployment and subsequently verify that it was created
correctly.

```
$ kubectl apply -f nginx.yaml ingress.networking.k8s.io/nginx-ingress created service/nginx-
service created deployment.apps/nginx-deployment created
$ kubectl get pods kubectl get pods
NAME                                  READY    STATUS     RESTARTS    AGE
geared-marsupi-px7hj                  1/1      Running    0           2m1s
nginx-deployment-677c8559d7-cm4lb     1/1      Running    0           2s
nginx-deployment-677c8559d7-jfkwr     1/1      Running    0           2s
$ kubectl get service
NAME            TYPE        CLUSTER-IP     EXTERNAL-IP    PORT(S)    AGE
nginx-service   ClusterIP   10.96.22.77    <none>         80/TCP     8s
$ kubectl get ingress
NAME            CLASS       HOSTS          ADDRESS        PORTS      AGE
nginx-ingress   <none>      *              localhost      80         13s
```

Listing 50: The commands that was run to apply the nginx
deployment and subsequently verify that it was created
correctly.

```
apiVersion: observability.example.com/v1alpha1
kind: test
metadata:
    name: scenario-6
spec:
    templateId: 1
    ttlSecondsAfterFinished: 600
    agents:
        - name: agents
          selector:
              matchLabels: { app: "geared-marsupi-agent" }
    inputs:
        clients: { type: interface_list, agents: [agents] }
        url:
            type: string
            value: "http://[..].eu-north-1.[..].amazonaws.com/"
        response_code: { type: integer, value: 200 }
        response_regexp: { type: string, value: "(nginx)" }
```

The commands in Listing 51 were run to apply the CR and
verify that it had been created. The last command monitored
the status of the Test[K] CRs in Kubernetes. To further verify
that the test was running, the test indeed showed as running
in the AC UI. The test finally reported as 'passed', i.e., it had
successfully executed without any issues discovered. The
status was verified by looking in the AC UI. Indeed, the AC
also reported the test as passed.

Finally, returning to Listing 51, a sleep command was run
to wait for the ten (10) minutes that the TTL was set to.
Then, the Test[K] CRs were fetched again, and the Operator
had removed the CR as expected by the configured TTL.

Listing 51: The commands that was run to apply the nginx
deployment and subsequently verify that it was created
correctly. After ten (10) minutes, the CR had been removed
from the Kubernetes cluster.

```
$ kubectl apply -f scenario-6-test.yaml
test.example.com/scenario-6 created
$ kubectl get -w tests
NAME        ID    START TIME    END TIME               STATUS    TTL
scenario-6  1     <unknown>     <unknown>              running   10m0s
scenario-6  1     <unknown>     2020-10-23T10:25:16Z   passed    10m0s
$ sleep 10m
$ kubectl get tests
No resources found in default namespace.
```

Now, a Chaos Mesh experiment defined by the CR in Listing 53 was applied. This experiment introduced ninety (90) % packet corruption with a correlation of fifty (50) % with a previously corrupted packet. The corruption occurred for ten (10) seconds every fifteen (15) seconds.

In Listing 52, the Test$^K$ CR from Listing 50 was re-applied. Then, the test results were monitored for using the command line. After the test had finished, it was reported as an error. This is expected as the introduced packet corruption should make the test fail. Indeed, further verification done by looking in the AC UI show reports of reoccurring timeouts and validation failures that can be attributed to the packet corruption.

This scenario verifies that activation tests can be run, and results queried through the Kubernetes API. Once a status change event happens to a Test$^K$ CR in Kubernetes consumers that watch the CR are notified. Importantly, this allows for programmatic usage of activation tests with orchestrators. For example, a NFV-MANO that uses the Kubernetes API could start activation tests and be notified by the results. These activation results can then be used by the orchestrator to act accordingly. Furthermore, the scenario verifies that the TTL functionality works. Where the CR is removed after it has concluded and the TTL has passed.

Listing 52: The commands that were run to re-apply the Test$^K$ CR and monitor the results from the command line.

```
$ kubectl apply -f scenario-6-test.yaml
test.example.com/scenario-6 created
$ kubectl get -w tests
NAME ID    START   TIME         END TIME               STATUS      TTL
scenario-6  23    <unknown>    <unknown>              scheduled   10m0s
scenario-6  23    <unknown>    <unknown>              running     10m0s
scenario-6  23    <unknown>    2020-10-23T12:33:41Z   error       10m0s
```

Listing 53: The Chaos Mesh experiment CR that introduced ninety (90) % packet corruption with a correlation of fifty (50) % with a previously corrupted packet.

```
apiVersion: chaos-mesh.org/v1alpha1 kind: NetworkChaos
metadata:
  name: scenario-6-experiment
spec:
  action: netem
  mode: all
  selector:
    namespaces:
      - default
    labelSelectors:
      "run": "nginx"
  corrupt:
    corrupt: "90"
    correlation: "50"
  duration: "10s"
  scheduler:
    cron: "@every 15s"
```

In this section, some of the aspects of the design and implementation are discussed.

8.1 Removal of AgentSet

In some implementations, there can be a CR called AgentSet. This CR provided the function of provisioning Agents in the Kubernetes cluster with rich selectors. An example can be found in Listing 54. The design was inspired by the DaemonSet$^K$ where it would be the central resource that managed all Agents in the cluster. The credentials required would also be declared in the same CR, however, it may be better to utilize standard Kubernetes resources, like Secrets$^K$.

The AgentSet was removed from a later version, in favor of focusing on the deployment of tests and monitors. Instead, Agents were to be deployed using standard Kubernetes primitives, such as DaemonSet$^K$ and Deployment$^K$.

By providing the Agents as Helm Charts instead, an easy deployment experience could still be provided. Most of the selector functionality is still possible as Kubernetes provide matchers such as matchExpressions. Importantly, the Helm Chart ensures that credentials are stored correctly in Secrets$^K$ and ConfigMaps$^K$.

As the current incarnation of the Agent Charts repository only contain a DaemonSet$^K$-based Chart, the possible deployments are limited. For example, to deploy Agents on specific nodes either a nodeSelector or affinity settings has to be used. This requires that labels are added to the Kubernetes worker nodes. Additionally, DaemonSet$^K$ does not support the podAffinity settings, resulting in that it is harder to schedule Agents onto nodes with or without a specific Pod$^K$. An example of this issue shows how the Deployment$^K$ is convoluted by an affinity setting that is related to the Agents DaemonSet$^K$. It should not be required to change affinity settings for other resources than those related to running the Agents.

Listing 54: The AgentSet CR from an earlier version.

```
apiVersion: example.com/v1alpha1
kind: AgentSet
metadata:
  name: example-agent-set
spec:
  selector:
    # A list of rules are OR:ed together.
    # Select all pods that match a label...
    - match: pods
```

-continued

```
# The labels key match resources that contain the
# defined labels.
labels:
    app: memcached
    zone: south
# ... OR a specific node with a given name.
- match: nodes
    name: kube-worker-1 # The node key matches a node
                        # with the given name.
agent:
    site: app.example.com
    credentials:
        token: TXhEW0v9gQ2EZ3ASvSbOQkJl4keavU7IJe4rgLZd
    image:
        name: "example.com/agent-application:latest"
```

Using the AgentSet CR described in Listing 54, the Agents would be deployed onto nodes that were also hosting specific Pods$^K$ without requiring any changes made to said Pods$^K$. This may result in a more maintainable system as dependencies would not span over multiple resources, and does not need to be adapted for Agents.

However, providing a Deployment$^K$-based Helm Chart in the Agent Charts repository could potentially solve this issue. Here, the Agent Pods$^K$ could be provided with a podAffinity. Giving the possibility of deploying Agents onto nodes with or without specific Pods. This approach may have its own set of issues, and would require to be evaluated before it is put into comparison with the AgentSet CR idea.

8.2 Annotation for Matching Resources

An earlier design required that an annotation operator.example.com/match: true was provided for every resource that the Operator could match against. This was to reduce the chattiness between the Operator and the Kubernetes API by applying a filter. However, this requirement was removed because it would require already existing resources to be changed in the Kubernetes cluster, limiting the possibility of running quick tests and monitors to troubleshoot running resources to just those that already had the annotation.

8.3 Configure Helpers with Annotations

In the current design there is no support for selecting several Services$^K$ or Pods$^K$ and use them for a template input that takes a list, e.g., a list of URLs. For example, a use case where the user wants to monitor multiple HTTP Services$^K$ in a cluster that all share the same label is not possible. This is a feature limitation in the used active assurance platform, and would require support for a list of URLs in the HTTP tool.

If, however this would be added, support for matching against multiple Services$^K$ with the url helper could be needed. Furthermore, the user may want to match against Services$^K$ using different ports or ServiceTypes.

In an earlier implementation this was solved using annotations, but later discarded as it required resources to be changed in the Kubernetes cluster as discussed in Section 8.2. In this version, there were several annotations that could be used to configure what parameters the url helper would use for a Service, url.template.example.com/host:

<hostname>—Allowed for overriding the hostname to use.

url.template.example.com/service-type:

<service-type>—Allowed for overriding the ServiceType, e.g use a ClusterIP instead of the name of the service.

url.template.example.com/port: <port>

Allowed for overriding the port.

url.template.example.com/match:

<service-port-name>—Allowed for specifying for the helper what ServicePort should be used when generating the URL.

Were the active assurance platform to add support for e.g., a list of URLs, this approach could be re-evaluated and possibly added to the design again.

8.4 Fingerprint Tests and Monitors

The logic of the reconciliation loops can be simplified by always generating a fingerprint that identifies the current incarnation of a test or monitor. Once a monitor or test has been generated, a fingerprint can be generated from the produced template inputs and other relevant data that may require the monitor or test to be updated in the AC.

Future reconciliations can compare its version of a test or monitor with the old by comparing their fingerprints. If there are no differences, then the reconciliation would result in a no-op. While a different fingerprint would result in that the test or monitor is updated in the AC.

This approach would eliminate many of the conditional statements required to analyze the state of the Kubernetes cluster. Instead, the controller will observe the state, generate a monitor or test from it, and compare the fingerprint with the previous monitor or tests. However, this could potentially result in more requests to the Kubernetes and AC APIs, where the controllers will always have to do the matching logic to be able to generate a fingerprint.

This disclosure describes a novel approach to active assurance in Kubernetes. The Operator introduces a method of active assurance of containerized services that integrates with the Kubernetes ecosystem. The Operator parses the Resource Matching DSL (RMD) that describe active testing or monitoring of services in a declarative format. Together, these two provide the functionality to run active assurance between Agents and against services that have been matched against using the meta-data of resources, i.e., manifests, in Kubernetes. The method is summarized as, by reading a declarative active testing or monitoring descriptor, and by matching against relevant service associated metadata from the Kubernetes API. The active testing or monitoring can be operated by an orchestration layer that determines the active testing or monitoring configuration from the descriptor and collected metadata.

This method provides possibility for orchestrators to deploy activation testing defined in the RMD through the Kubernetes API that verifies the functionality of services. Here, the Operator will trigger the active testing in the Agent Controller (AC) between Agents, or between Agents and the services. And subsequently provide the results through the Kubernetes API or the AC API for the orchestrator.

Agents can be configured and deployed using standard Kubernetes primitives, e.g., DaemonSet$^K$ and Deployment$^K$. The standard Kubernetes distribution already provide the ability to define the meta data, i.e., labels and annotations, that the Operator uses for matching against the Agents. Agents packaged as Helm Charts should be provided for easier deployment and ensure best practices.

Troubleshooting of Kubernetes resources is done by introducing ephemeral, or disposable, Agents that are run inside other applications Pods$^K$. Ephemeral Agents will not force the targeted Pod$^K$ to restart, and therefore the condition of the Pod$^K$ is retained. This could be beneficial to troubleshoot a specific state of the Pod$^K$. The usage of ephemeral Agents is simplified by providing a kubectl plugin that can deploy and configure the Agents on Pods$^K$ in a cluster. However, due to limitations and that the feature for ephemeral containers in the Kubernetes API is not final, the Agents cannot be removed from a Pod$^K$. Another limitation is that the Operator is unable to match against ephemeral Agents, meaning that declarative tests and monitors are not possible to be written for this Agent type.

Lastly, the Operator has the ability to deploy Sidecar Agent containers. These are automatically attached to Pods$^K$ that have a special annotation. The IPC and network namespace is shared with other container process in a Pod$^K$. This could be beneficial for network related tests from the same network namespace, i.e., interface, as an application process. These Sidecar Agent containers differentiate themselves from the ephemeral Agent containers as they will require the Pod$^K$ to be restarted. On the other hand, a Sidecar Agent container can be matched against, in contrast to the ephemeral Agent containers.

The three prototypes described herein together form a suite of tools that can be used for running active assurance in a Kubernetes cluster following declarative paradigms. The verification scenarios show that the tools are adequate for a simple Kubernetes cluster and deployments. Other environments, e.g., 5G and other telecommunications infrastructure backed by Kubernetes.

10.2 End-to-End Testing

End-to-end (E2E) is used for testing the Kubernetes distribution. Other vendors can also use the framework that they provide to run E2E tests against a test cluster. The prototypes should have E2E tests to test the functionality. Deployment scenarios that were presented earlier in this disclosure could be used as a base for future E2E tests. Other deployment scenarios may be used.

10.3 Expand the RMD

The Resource Matching DSL (RMD) can be extended to support other Kubernetes primitives. In the current version Service$^K$ and Agent are the only supported primitives that can be matched against using named selectors.

One example is the Pod$^K$ primitive. A Pod$^K$ contain one or more IPs that can be matched against and used to run tests or monitors against. Furthermore, within a Pod$^K$ there are containers that uses specific ports. The container ports can be matched against and used together with a Pod$^K$ IP to produce a IP and port pair. Other Kubernetes primitives should be evaluated for its value in matching against with the RMD.

There also exists platform specific primitives, e.g., TWAMP reflectors. Like with Agents, TWAMP reflectors could be a special resource in a Kubernetes cluster that can be matched against. Furthermore, remote TWAMP reflectors could also be supported by adding support for matching against reflectors that have been given tags in the AC.

10.4 Continuous Test

In the current incarnation, the Test$^K$ CR is run and, once it has concluded, the CR object will be removed from the Kubernetes cluster by the Operator. This CR can be expanded to not only be 'one-shot', but also have a continuous mode that will re-run the Test$^K$ if there are changes to the cluster that might affect the resources that the test uses.

The difference between a continuous Test$^K$ and a Monitor$^K$ would be that the test is run for N unitof-time and will only run again on specific cluster changes, while the monitor continuously generates traffic. The results could then be queried from Kubernetes using e.g., kubectl.

The cluster changes could be monitored, and reruns triggered in the same manner as the current implementation using Taint controllers.

Below in Listing 55 follows an example of a run of a 'one-shot' Test$^K$, and the continuous variant is shown in Listing 56.

10.5 Update Monitors and Tests

The AC API does not yet support updating existing instances of monitors and tests from a template. This results in that the current implementation stops and re-creates the monitor or test as a new instances with a new ID. It is therefore harder to follow reports in the AC UI as they are potentially spread out over several instances.

There could be a possibility of creating monitors and tests without templates, but this approach would have challenges to implement.

10.6 More Deployment Strategies

During the verification phase, it was discovered that the DaemonSet$^K$ strategy does not support Pod$^K$ affinity. A useful feature to control where the Agent are deployed based on where other Pods$^K$ are located in the cluster. By also providing a Helm Chart that implement the Deployment$^K$ strategy, this is made possible.

10.7 Removal of Ephemeral Containers

Ephemeral Containers cannot be removed from a Pod$^K$ that they have been added to. This is a current limitation in the Kubernetes API. As a result, ephemeral Agents will be left running in a Pod$^K$ until the Pod$^K$ is restarted. As an Agent establishes a VPN tunnel it will use some of the networking bandwidth of the Pod$^K$ even though it is not being used. The bandwidth used should not be enough to negatively impact the Pod$^K$, but this continues to be something that can be investigated. However, as the Kubernetes API may add support for removing Ephemeral Containers in the future, this should not be an issue once the Agents can be removed.

Listing 55: Example of a 'one-shot' Test$^K$.

```
# Create oneshottest:
$ kubectl apply-f oneshottest.yaml
# Look up the status for the test:
$ kubectl get tests
NAME            READY       STATUS      RESULT      AGE
oneshottest     1/1         Running     Pending     1s
# We wait for 60s to let the test finish...
$ sleep 60s
# The test is still there due to a TTL of 5 minutes:
$ kubectl get tests
NAME            READY       STATUS      RESULT      AGE
oneshottest     1/1         Running     Success     1m1s
# After a while (i.e. 5 min) the test has been removed by the Operator
$ kubectl get tests
No resources found in defaultnamespace.
```

Listing 56: Example of a 'continuous' Test$^K$.

```
$ kubectl apply -f continuoustest.yaml
$ kubectl get tests
NAME            READY       STATUS      RESULT      AGE
continuoustest  1/1         Running     Pending     1s
$    sleep 60s
$ kubectl get tests
NAME            READY       STATUS      RESULT      AGE
continuoustest  1/1         Finished    Success     1m1s
$    sleep 10m
# The test still exists
$ kubectl get tests
NAME            READY       STATUS      RESULT      AGE
continuoustest  1/1         Finished    Success     10m1s
# Now, let's create a deployment that make the test to re-run:
$ kubectl apply -f nginx.yaml
# The test has started running again:
$ kubectl get tests
NAME            READY       STATUS      RESULT      AGE
continuoustest  1/1         Running     Pending     10m2s
```

5G network slicing is a network architecture that enables the multiplexing of virtualized and independent logical networks on the same physical network infrastructure. Each network slice is an isolated end-to-end network tailored to fulfill diverse requirements requested by a particular application. For this reason, this technology assumes a central role to support 5G mobile networks that are designed to efficiently embrace a plethora of services with very different service level requirements (SLR). The realization of this service-oriented view of the network leverages on the concepts of software-defined networking (SDN) and network function virtualization (NFV) that allow the implementation of flexible and scalable network slices on top of a common network infrastructure. When network slices are created there is need to validate the slices so that they meet SLR and further on monitor the SLA provided by slices. In the absence of the techniques this disclosure, validating and monitoring the network slices is troublesome to implement.

The declarative active assurance techniques described herein can be applied to validation and monitoring of network slices. UE/eNB/gNB simulator is an application simulating UEs, eNBs, and gNBs towards 5G core network. The simulator supports functionality for attaching/detaching UEs to the network and starting/stopping user plane communication sessions and proxying data connections from the test agent to the user plane. Whenever a network slice is created, test agent and simulator are created and attached to the slice and then various tests are executed to test fulfilment of SLR of the slice. Furthermore, the same test agent and simulator can be kept monitoring SLA continuously.

The test agent and UE/eNB/gNB simulator Docker images are added to Kubernetes as resources (Pods) that can be created using declarative (e.g., intent-based) rules. The creation of both is then controlled by monitoring operator 350 which interacts with the agent controller (control center). The control center controls execution of tests and provides results via its UI and northbound APIs. In this manner, the whole testing and monitoring infrastructure can be integrated as part of a Kubernetes operated 5G network, enabling flexible control of the testing and monitoring of network slices.

As an example, the slice testing/quality assurance process can include the following: (1) When a slice is created, a network simulator is created with UE, eNB, and gNB configurations by network operator; (1.1) UE configuration includes configuration for UEs to be attached to the gNB including network slice identifiers and types to be used. For example, see https://github.com/aligungr/UERANSIM/blob/master/config/free5gc-uc.yaml. gNB configuration may include gNB IP addresses and AMF IP address, see https://github.com/aligungr/UERANSIM/blob/master/config/free5gc-gnb.yaml; these may include respective IP addresses for different 5G interfaces serviced by the gNB; (2) Simulator is deployed into Kubernetes with the configurations; (3) While deploying, a simulator service is created for every UE and service type to expose services for quality assurance; (4) Services are labelled with labels needed by monitoring operator to launch quality assurance; describing for example slice service type and test agent to be used in quality assurance; (5) Monitoring operator starts slice service verification by starting relevant tests for service level verification; (6) Test agents perform service level verification, for example with UDP test which sends constant rate UDP stream between test agents and service level is determined from received rate, jitter and drops between endpoints; (7) Verification results are collected to control center and provided to network operators. Creation of configurations (step 1) and deploying to Kubernetes (Steps 2, 3, 4) may be automated/scripted.

Figure 18:
FIG. 18 is a conceptual diagram illustrating example configuration and corresponding user interface display for node-to-node active assurance monitoring, in accordance with techniques described in this disclosure.

FIG. 18 is a conceptual diagram illustrating example configuration and corresponding user interface display for node-to-node active assurance monitoring, in accordance with techniques described in this disclosure.

Figure 19:
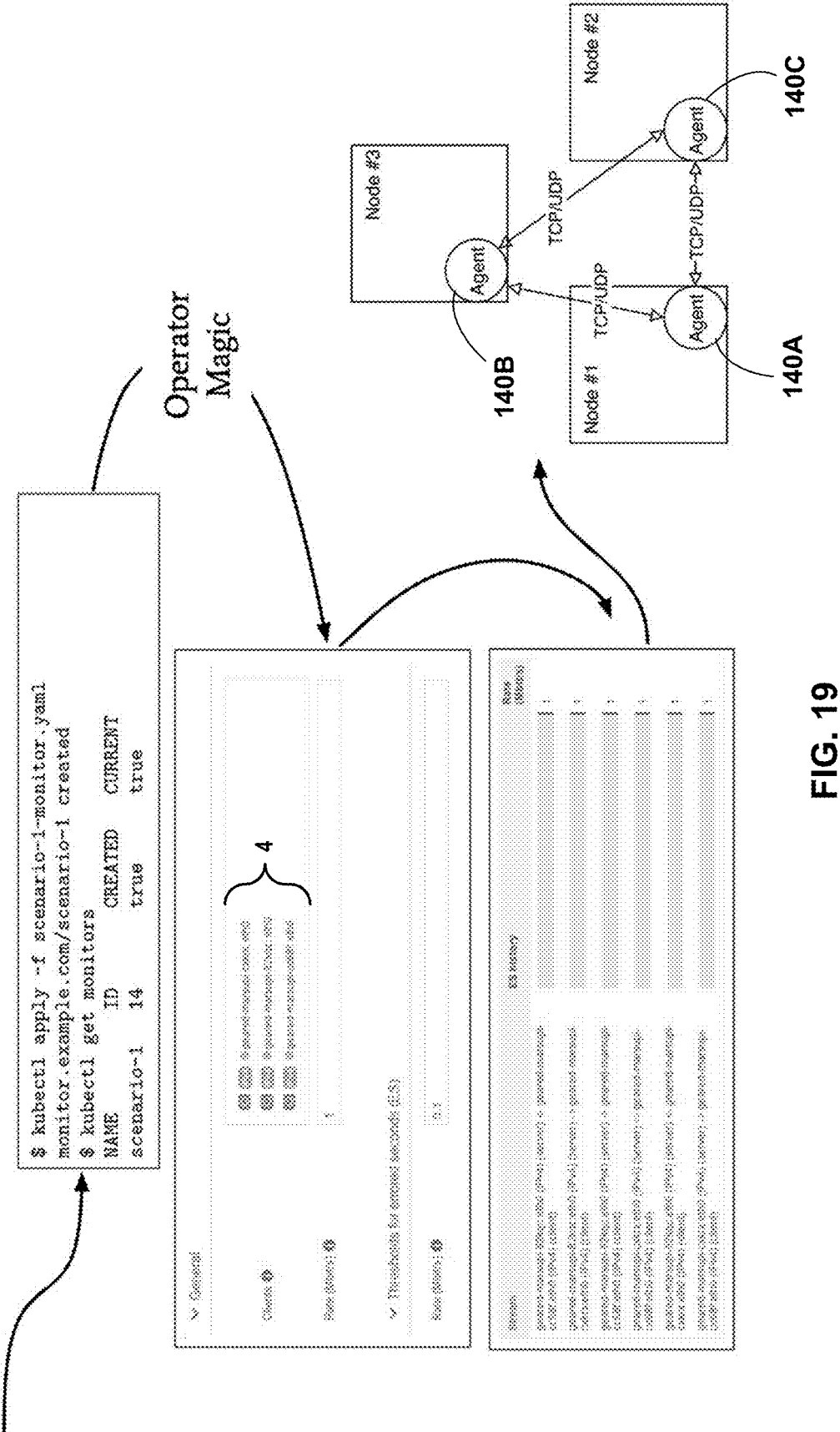
FIG. 19 is a conceptual diagram illustrating example configuration and corresponding user interface displays for creating monitor scenarios for active assurance monitoring between test agents on different nodes, in accordance with techniques described in this disclosure.

FIG. 19 is a conceptual diagram illustrating example configuration and corresponding user interface displays for creating monitor scenarios for active assurance monitoring between test agents on different nodes, in accordance with techniques described in this disclosure. Test agent 140A may correspond to test agents described herein, such as in FIG. 1-10, 12, or 13, for example.

Figure 20:
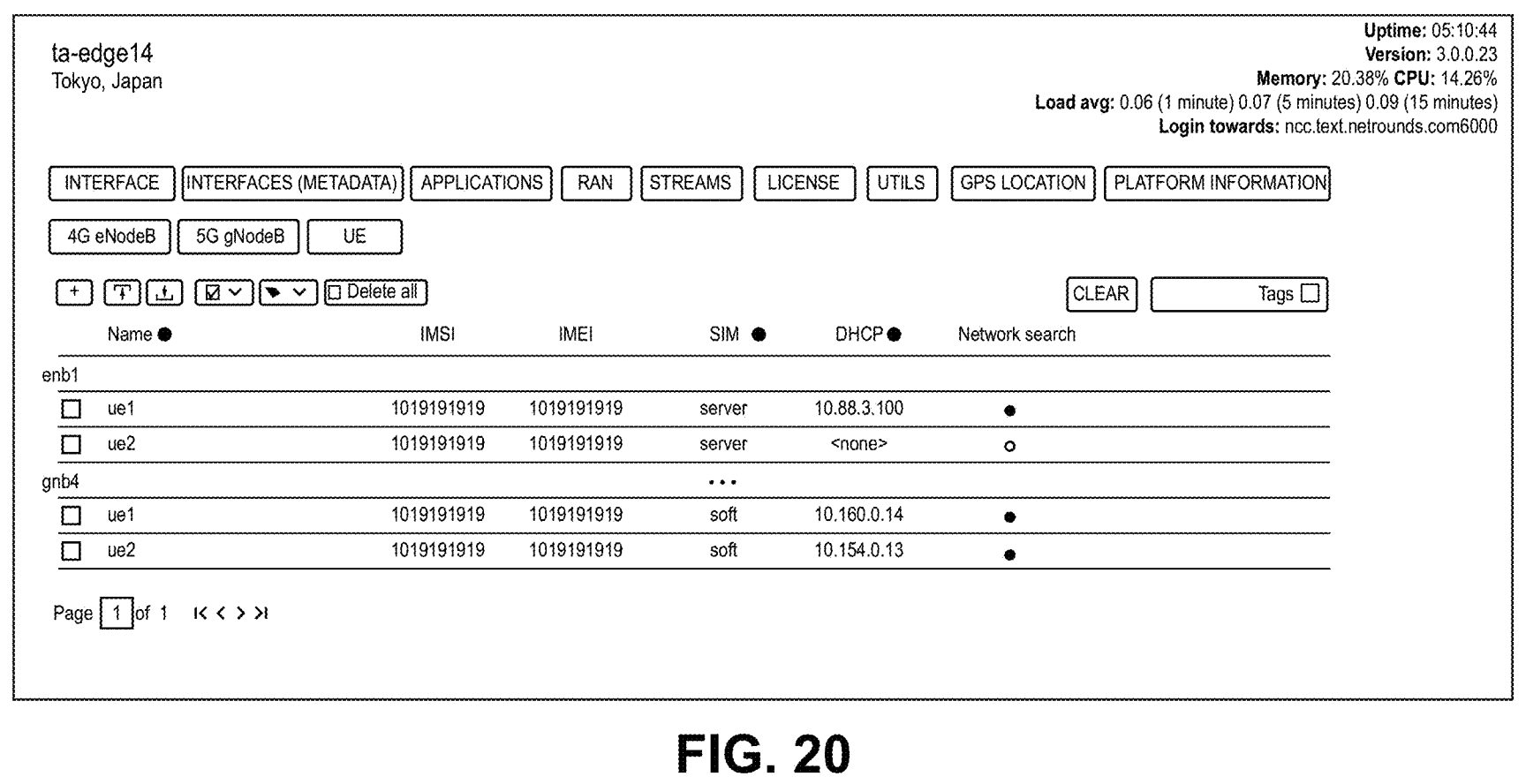

FIG. 20 is an example user interface display for configuring simulated Radio Access Network (RAN) elements such as UEs. The user interface display may be presented by the control center of FIG. 3, for example.

Figure 21:
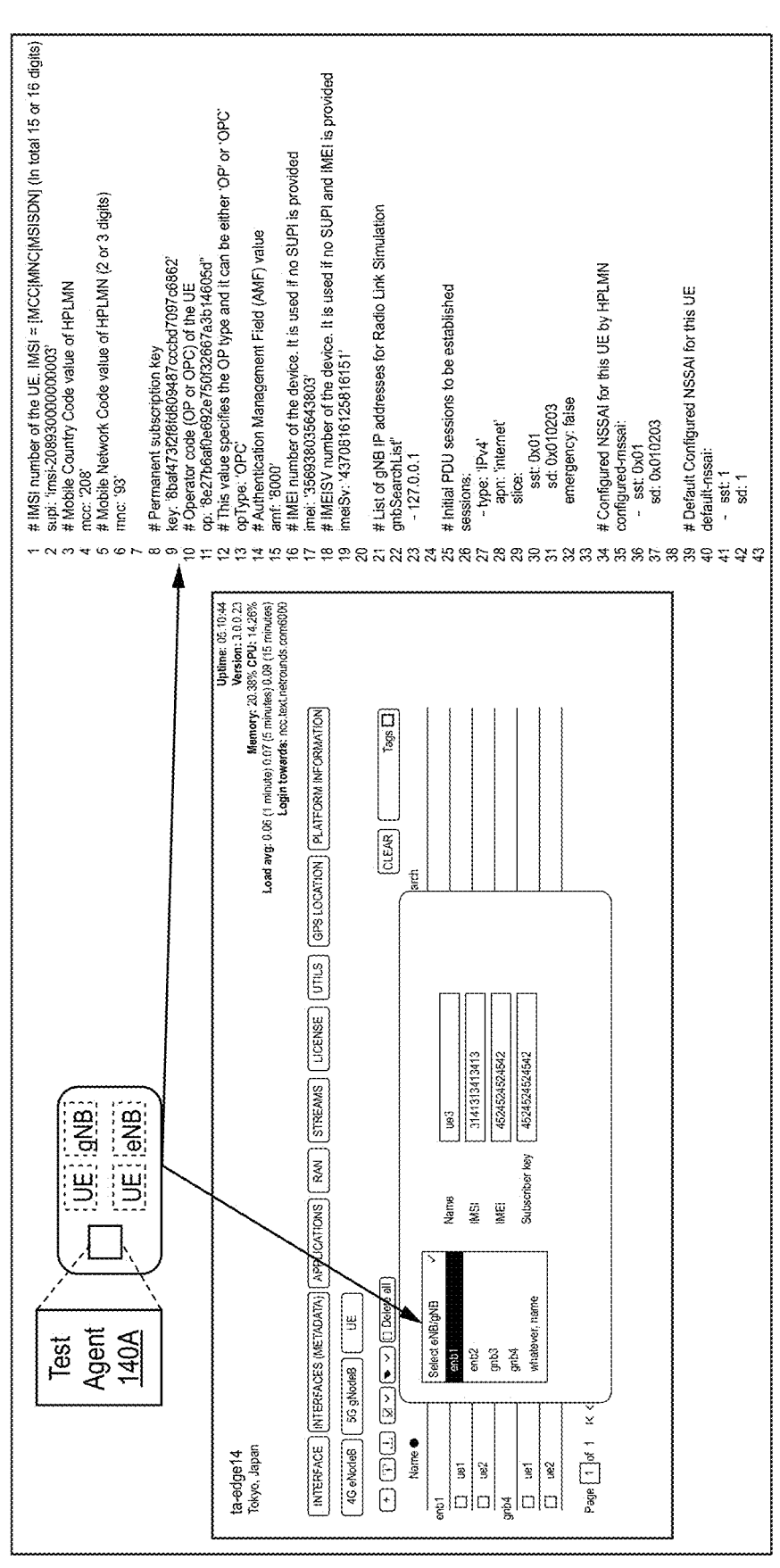
FIG. 21 is a conceptual diagram illustrating example configuration and corresponding user interface display for adding simulated UEs and eNodeBs that can be used by the monitoring operator for network slice testing, in accordance with techniques described in this disclosure.

FIG. 21 is a conceptual diagram illustrating example configuration and corresponding user interface display for adding simulated UEs and eNodeBs that can be used by the monitoring operator for network slice testing, in accordance with techniques described in this disclosure. The test agent 140A is deployed as described herein.

Figure 22:
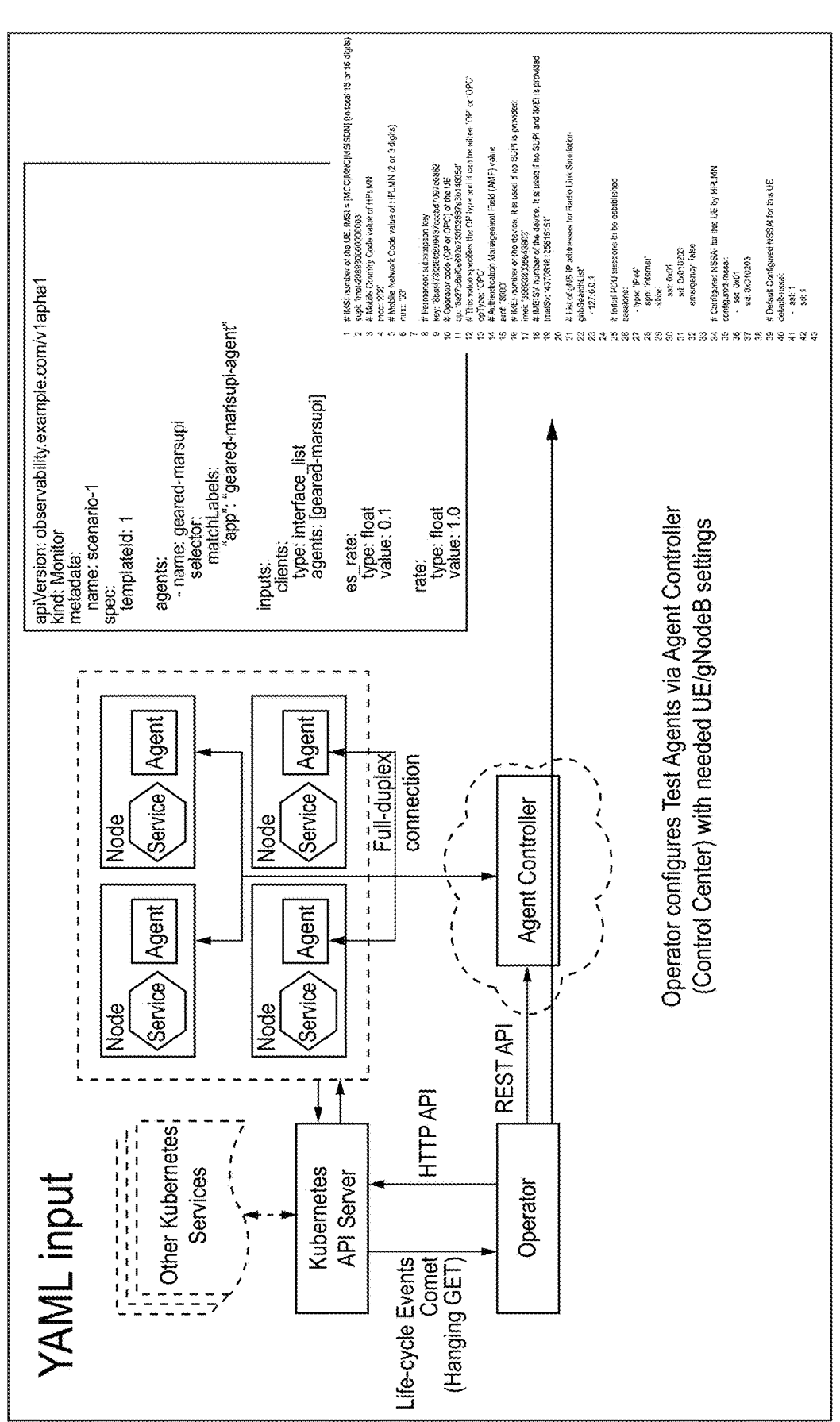
FIG. 22 is a conceptual diagram illustrating example YAML input that causes a monitoring operator to configure test agents via an Agent Controller (Control center) with the needed UE/eNodeB/gNodeB settings to carry out the intent of the YAML input, in accordance with an aspect of techniques described in this disclosure.

FIG. 22 is a conceptual diagram illustrating example YAML input that causes a monitoring operator to configure test agents via an Agent Controller (Control center) with the needed UE/eNodeB settings to carry out the intent of the YAML input, in accordance with an aspect of techniques described in this disclosure. The monitoring operator may be, for example, monitoring operator 250 of FIG. 3 or monitoring operator 350 of FIG. 10.

Figure 23:
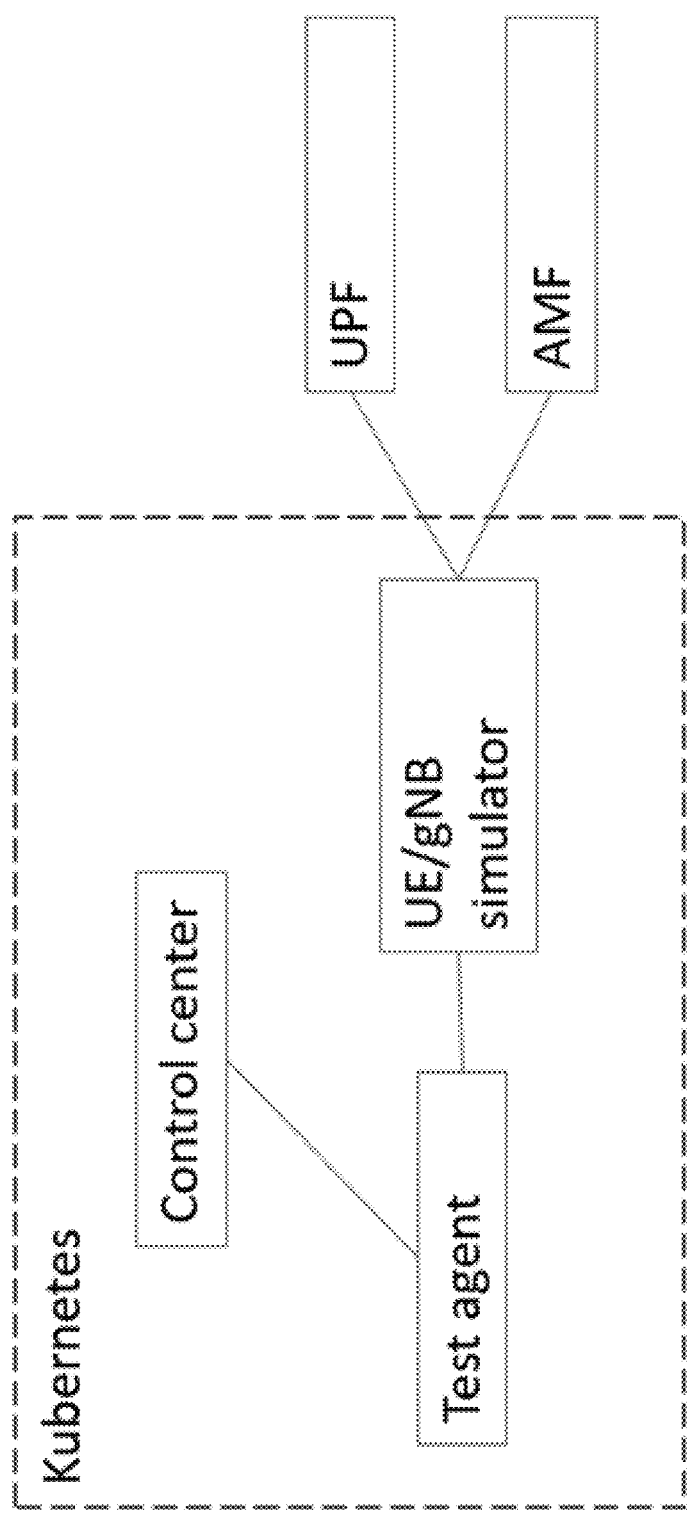
FIG. 23 is a block diagram illustrating an example system for testing network slices, in accordance with an aspect of techniques described in this disclosure.

FIG. 23 is a block diagram illustrating an example system for testing network slices, in accordance with an aspect of techniques described in this disclosure. When a slice is created, a network simulator is created with UE and gNB configurations by network operator. UE configuration includes configuration for UEs to be attached to the gNB including network slice identifiers and types to be used. gNB configuration includes gNB IP addresses and AMF IP address. Simulator is deployed into Kubernetes with the configurations. While deploying, simulator service is created for every UE and service type to expose services for quality assurance. Services are labelled with labels needed by monitoring operator to launch quality assurance, describing for example slice service type and test agent to be used in quality assurance. Creation of configurations and deploying to Kubernetes can be automated.

Monitoring operator starts slice service verification by starting relevant tests for service level verification. Test agents perform service level verification, for example with UDP test which sends constant rate UDP stream between test agents and service level is determined from received rate, jitter and drops between endpoints. Verification results are collected to the control center, and provided to network operators.

According to the present disclosure, active assurance of 4G/5G network slices may work together with Kubernetes and how the Kubernetes platform is controlled. Techniques according to the present disclosure may automatically deploy test agents in nodes or as pod sidecars. Additionally, techniques according to the present disclosure may automatically set up the user plane in the mobile network and present an interface to the test agent. Further, techniques or systems according to the present disclosure may automatically start tests or monitors as defined in the YAML. For example, if a new node is added to a cluster, a Test Agent may be automatically deployed based on label matching. The Test Agent UE/eNodeB application may be automatically configured and the user plane may be set up. A specified test/monitor may be started. Each of the steps or processes may be controlled by the YAML file via the Operator, such as further described by to U.S. Patent App. No. 63/114,444, referenced above.

There may be different classes (types) of network slices. Some network slices are used for real time traffic so they may need low latency. Other network slices may be used for browsing and may not need as much throughput. Defining the resource types and integrating with the actual network can allow for control through Kubernetes resources, which provides for centralized control and relatively easy automation. According to the present disclosure, techniques may include creating parameters of network slices, then creating the testing based on the parameters.

Figure 24:
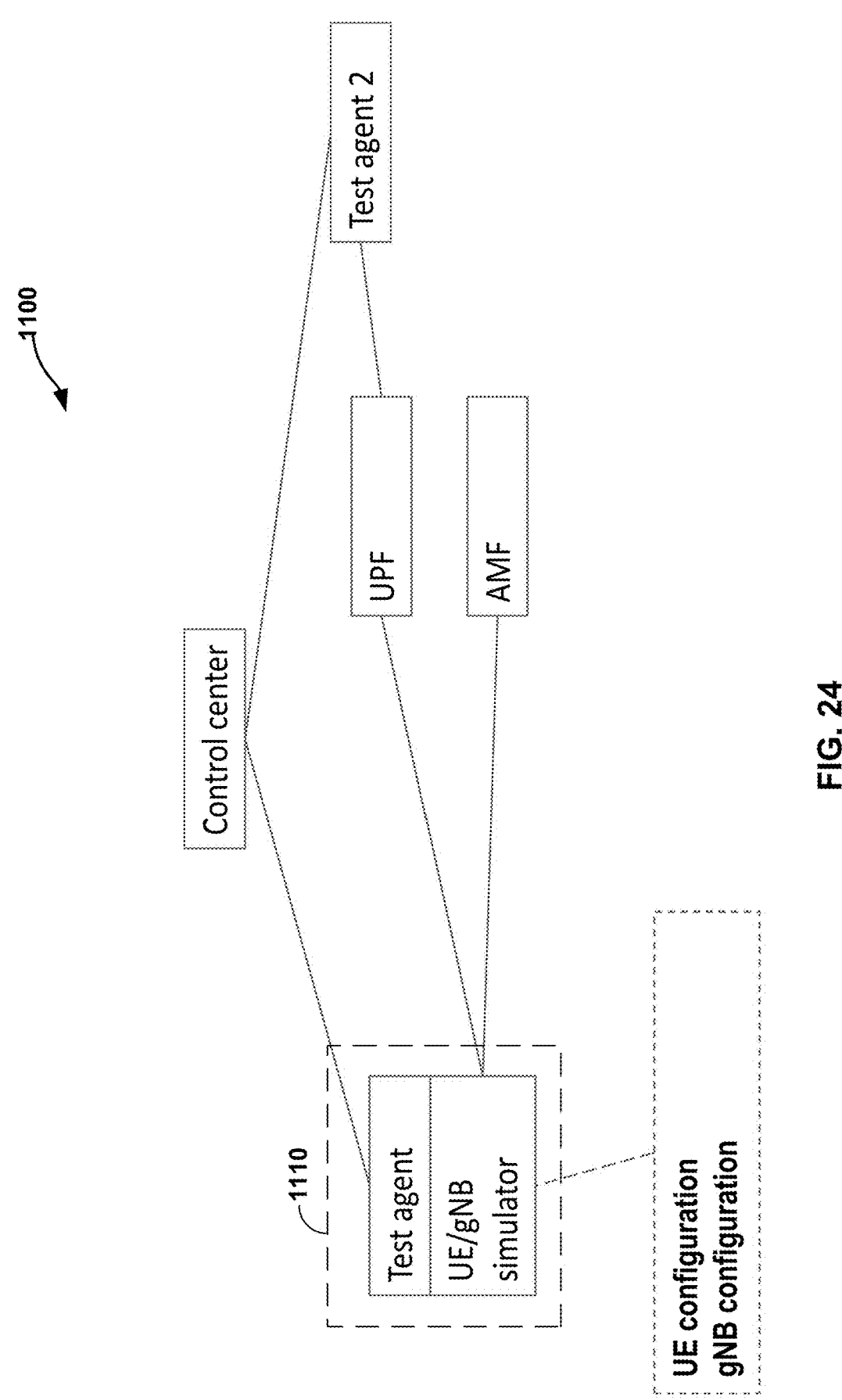
FIG. 24 is a block diagram illustrating an example system for testing network slices using test agent and simulators that are located in the same virtual execution element, in accordance with an aspect of techniques described in this disclosure.

FIG. 24 is a block diagram illustrating an example system 1100 for testing network slices using test agent and simulators that are located in the same virtual execution element 1110, in accordance with an aspect of techniques described in this disclosure. In FIG. 24, the service type may be predefined. For example, the service type may be eMBB (enhanced mobile broadband) from the network standard for mobile devices. Different service types may be defined for real-time streaming and others. The monitoring operator is configured to derive from the service type what kind of quality is needed for the network slice. A pure test agent may test the core network. A Kubernetes operator may control or operate the service by matching labels. A test agent may be provided on the data network side. In some examples, the data network may not be simulated but instead the real or core network may be tested. The services simulated may be network functions. Simulator services may be different service types that may be tested in different configurations.

Network slicing may be done through simulators deployed with Kubernetes with particular configurations which may be coordinated into the service slice testing. Service slice testing may be completed with a simulator deployed with Kubernetes, for example.

A network operator may launch creation of a network slice. As a part of the creation of a network slice, resources for quality-of-service monitoring or testing may be automatically created. Those resources may be read by a Kubernetes operator that is controlling testing. The Kubernetes operator may deploy network simulators as needed.

The following is an example UE configuration. The configuration should provide the UE's IMSI, IMEI, master key (in case of simulating the SIM), NSSAI, etc.

```
# IMSI number of the UE. IMSI = [MCC|MNC|MSISDN] (In total 15 or 16 digits)
supi: 'imsi-901700000000001'
# Mobile Country Code value of HPLMN
mcc: '901'
# Mobile Network Code value of HPLMN (2 or 3 digits)
mnc: '70'
# Permanent subscription key
key: '465B5CE8B199B49FAA5F0A2EE238A6BC'
# Operator code (OP or OPC) of the UE
op: 'E8ED289DEBA952E4283B54E88E6183CA'
# This value specifies the OP type and it can be either 'OP' or 'OPC'
opType: 'OPC'
# Authentication Management Field (AMF) value
amf: '8000'
# IMEI number of the device. It is used if no SUPI is provided
imei: '356938035643803'
# IMEISV number of the device. It is used if no SUPI and IMEI is
provided
imeiSv: '4370816125816151'
# List of gNB IP addresses for Radio Link Simulation
gnbSearchList:
    - 127.0.0.1
# Initial PDU sessions to be established
sessions:
    - type: 'IPv4'
      apn: 'internet'
      slice:
          sst: 1
# Configured NSSAI for this UE by HPLMN
configured-nssai:
    - sst: 1
# Default Configured NSSAI for this UE
default-nssai:
    - sst: 1
      sd: 1
# Supported encryption algorithms by this UE
integrity:
    IA1: true
    IA2: true
    IA3: true
# Supported integrity algorithms by this UE
ciphering:
    EA1: true
    EA2: true
    EA3: true
# Integrity protection maximum data rate for user plane
integrityMaxRate:
    uplink: 'full'
    downlink: 'full'
```

A gNB configuration according to the present disclosure provides local addresses for the simulated interfaces as well as addresses of the AMF the gNB connects to, for example: ngapIp: 127.0.0.1 #gNB's local IP address for N2 Interface (Usually same with local IP)

gtpIp: 127.0.0.1 #gNB's local IP address for N3 Interface (Usually same with local IP) #List of AMF address information amfConfigs:

address: 127.0.0.1

Configurations to Kubernetes resources may be completed. For necessary configuration, Test Agent, UE, gNB custom resources are created. For example, refer to https://kubernetes.io/docs/tasks/extend-kubernetes/custom-resources/_print/.

For example, an example custom resource definition is shown below:

```
apiVersion: apiextensions.Kubernetes.io/v1
kind: CustomResourceDefinition
metadata:
    name: ue.stable.example.com
spec:
    group: stable.example.com
    versions:
    name: v1
    served: true
    storage: true
    schema:
    openAPIV3Schema:
    type: object
    properties:
    spec:
    type: object
    properties:
    imei:
            type: string
    ...
    scope: Namespaced
    names:
    plural: userequipments
    singular: userequipment
    kind: UserEquipment
    shortNames:
    ue
```

Creating the UE resource may be done, for example, as shown below:

```
apiVersion: "stable.example.com/v1"
kind: UserEquipment
metadata:
    name: my-ue-object
    labels:
    example.com/ue.group: test1
spec:
    imei: 356938035643803
    imsi: 901700000000001
```

Resources may be bound together. An example test agent including a list of UEs and gNBs is shown below. This test agent uses a selector to bind the user equipment to it and define the gNBs.

```
apiVersion: "stable.example.com/v1"
kind: UserEquipment
metadata:
    name: my-ue-object
    labels:
    example.com/ue.group: test1
```

-continued

```
spec:
    imei: 356938035643803
    imsi: 901700000000001
```

An example configuration for binding to the service monitoring is as follows:

```
apiVersion: example.com/v1alpha1
kind: NetworkMonitor
metadata:
    name: scenario-2
spec:
    templateId: 2
    agents:
    name: ta
    selector:
    matchLabels:
    example.com/serviceType: eMBB
    services:
    name: nginx
    selector:
    matchLabels:
    app: nginx
    inputs:
    clients:
    type: interface_list
    agents: ta
    url:
    type: url
    service:
    name: nginx
    servicePort: http
    serviceType: ClusterIP
    scheme: http
    time_between_requests:
    type: integer
    value: 10
    response_code:
    type: integer
    value: 200
    response_regexp:
    type: string
    value: "(nginx)"
```

This network monitor uses selector to bind to previously defined test agent and another selector to bind to responder service nginx. Similarly, test agents can be bound as responders and other types of tests may be defined. For example, UDP bandwidth tests may be conducted between Test Agents on a mobile network and Test Agents on a data network.

Figure 25:
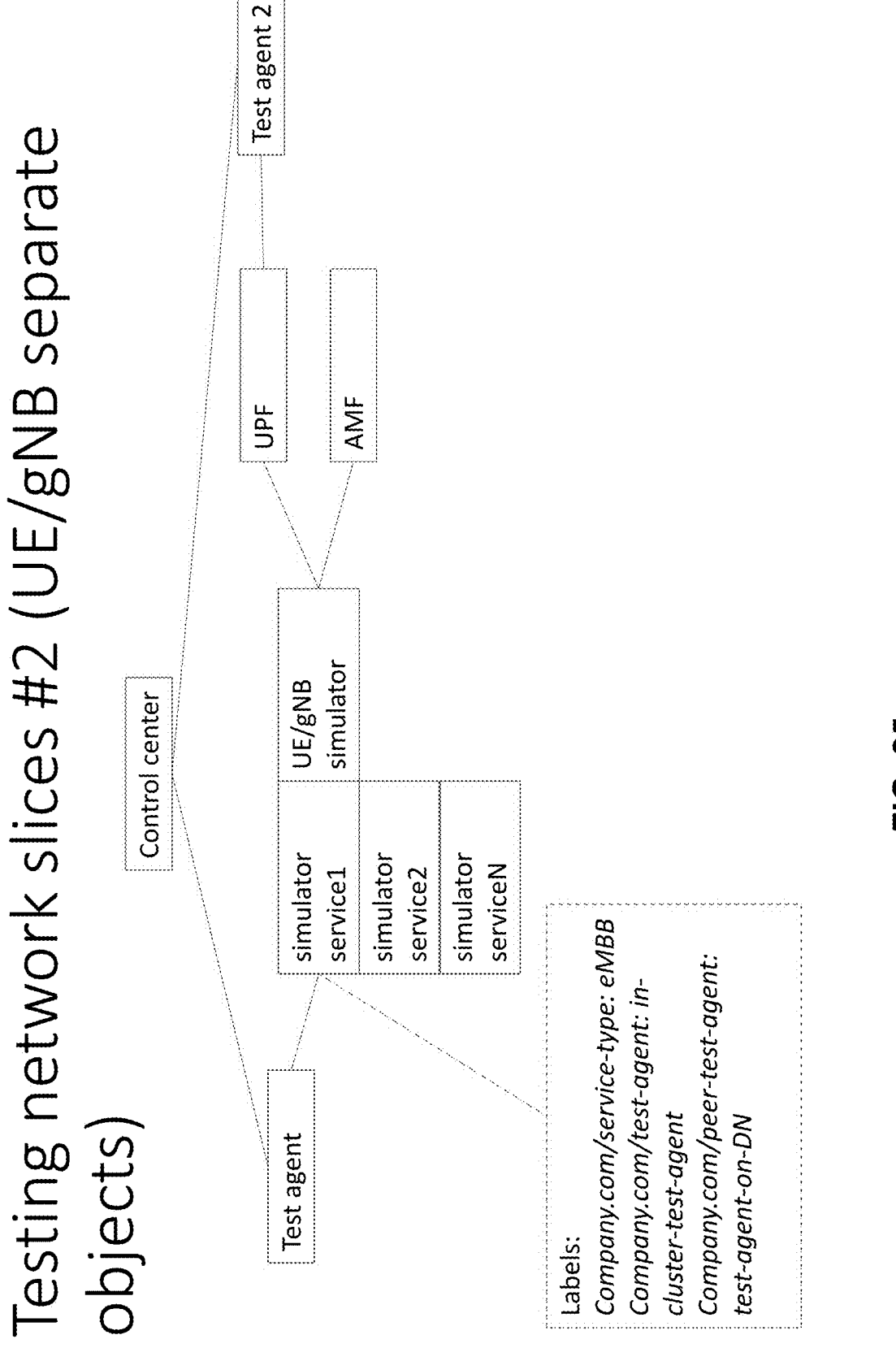
FIG. 25 is a block diagram illustrating an example system for testing network slices using test agent located in a different virtual execution element from the simulators, in accordance with an aspect of techniques described in this disclosure.

FIG. 25 is a block diagram illustrating an example system for testing network slices using test agent located in a different virtual execution element from the simulators, in accordance with an aspect of techniques described in this disclosure.

Techniques according to the present disclosure may include a first phase of testing. The first phase may include a certificate to assure its working as intended. The first phase may include 1 GB for 1 min with 1 millisecond latency. The first phase may make sure the slice is handling the bandwidth. The first phase may use monitoring parameters that use more bandwidth, since network traffic is not yet flowing and will not be affected by the testing.

Techniques according to the present disclosure may include a second phase of testing. The second phase certificate may include monitoring of an established network slice. The second phase may include monitoring traffic and include monitoring in a way that uses less bandwidth, such as by sending probe packets less frequently. The second phase may be a longer running test on the network slice than the first phase, but that sends probe packets less frequently.

In some examples, the same test agent is used to test and certify both the first phase and second phase. In other examples, a new test agent is used to test and certify the second phase, relative to the first phase. The test agents may be configured differently by the control center in the first phase of testing and the second phase of testing. The different test configurations may send different volumes of test traffic, as described above. Simulating the UE/gNB may run in parallel.

FIG. 26 is a flowchart illustrating an example operation of a computing system, in accordance with one or more techniques of this disclosure. In the example of FIG. 26, a computing system, such as the computing system of FIG. 1, receives a declarative testing descriptor for active testing of a virtualized service (2600). The computing system may obtain, from an orchestration layer, metadata associated with the virtualized service, wherein the metadata specifies a unique name for a virtualized service within the namespace of a cluster managed by the orchestration layer (2650). The orchestration layer may be, for example, a virtualization platform API such as a Kubernetes platform API. The computing system determines, using the declarative testing descriptor and the metadata, an active testing configuration for an instance of the virtualized service (2655). The computing system starts an active test according to the active testing configuration and determining service level violations for the instance of the virtualized service based on a result of the active test (2660).

The active testing configuration includes, for example, one or more of test agent IP addresses, test agent tags, service endpoints, template names and parameters. Starting the active test includes providing the active testing configuration to a control center that orchestrates the active test for monitoring performance, wherein the control center instantiates test agents and monitoring services based on the active testing configuration.

The control center includes a customer controller process that listens for events defined by a custom resource from the orchestration layer, and receives the metadata in response to identifying an event by the listening. The control center deploys a virtualized Test Agent within a cluster of an orchestration platform to perform the active test, or deploys a virtualized Test Agent inside a sidecar container to perform the active test. In some examples, deploying the virtualized test agent inside the sidecar container includes using an admission webhook for deploying the virtualized test agent, wherein a target pod on which the sidecar container is deployed is defined by an annotation to the pod definition.

The monitoring operator performs measuring, based on the active test, service performance between nodes. Where the virtualized service comprises a first virtualized service, the starting the active test includes creating a second virtualized service to enable performance testing of the first virtualized service. In some examples, starting the active test includes deploying a test agent outside a cluster and using the test agent for testing outbound virtualized services.

In some examples, the computing system triggers, in response to determining the service level violations, healing operations in a network. The computing system may be part of an edge cloud system. In some examples the computing system receives, from the orchestration layer such as a Kubernetes API, an indication of a change to a cluster associated with the plurality of virtual services; determining, by the computing system and in response to receiving the indication, updated active testing configuration using the declarative testing description and the updated metadata; and automatically updating, by the computing system, placement of one or more virtual test agents according to the updated active testing configuration. The computing system may also be providing labels in a custom resource that defines inputs of a test agent or a monitor, wherein the labels are defined as objects within the metadata, and wherein determining updated active testing configuration comprises dynamically matching the test agent to the virtualized services by matching the labels against objects within a Kubernetes cluster.

FIG. 27 is a flow diagram illustrating an example operation of a computing system, in accordance with one or more techniques of this disclosure. The computing system may be, for example, computing system 100 of FIG. 2. As seen in the example of FIG. 27, the computing system receives a declarative testing descriptor for active testing of a first virtualized service (1402). The computing system obtains, from an orchestration layer, metadata associated with a requested network slice, the network slice implemented by the first virtualized services, wherein the metadata specifies a unique name for the first virtualized service within a namespace of a cluster managed by the orchestration layer (1404). The computing system determines, based on the declarative testing descriptor and the metadata, an active testing configuration for validating the requested network slice, the active testing configuration including test configuration parameters, placement of a test agent, and simulation elements to be assigned for validating the requested network slice and implemented by second virtualized services (1406). The computing system an active test on the network slice using the simulation elements according to the active testing configuration (1408). The computing system an indication of whether a result of the active test indicates the network slice meets service level requirements (1412).

FIG. 28 is a flow diagram illustrating an example operation of a computing system, in accordance with one or more techniques of this disclosure. The computing system may be, for example, computing system 100 of FIG. 2. In the example of FIG. 28, a computing system receives a declarative testing descriptor for active testing of a network slice implemented by first virtualized services in a network (1510). The computing system receives, from an orchestration layer, metadata associated with network slice (1520). The computing system determines, based on the declarative testing description and the metadata, active testing configuration for testing the network slice (1530). The computing system starts an active test according to the active testing configuration and determines service level violations based on a result of the active test (1540).

Example 1: A computing system includes processing circuitry coupled to a memory device, the processing circuitry configured to: receive a declarative testing descriptor for active testing of a first virtualized service; obtain, from an orchestration layer, metadata associated with a requested network slice, the network slice implemented by the first virtualized services, wherein the metadata specifies a unique name for the first virtualized service within a namespace of a cluster managed by the orchestration layer; determine, based on the declarative testing descriptor and the metadata, an active testing configuration for validating the requested network slice, the active testing configuration including test configuration parameters, placement of a test agent, and simulation elements to be assigned for validating the requested network slice and implemented by second virtualized services; start an active test on the network slice using the simulation elements according to the active testing configuration; and output an indication of whether a result of the active test indicates the network slice meets service level requirements.

Example 2: The computing system of example 1, wherein the processing circuitry being configured to receive the declarative testing descriptor comprises the processing circuitry being configured to receive, for each of a plurality of service types, a service type and a corresponding active testing configuration for the service type.

Example 3: The computing system of example 1, further includes responsive to determining that the result of the active test indicates the network slice meets required service level requirements, discontinue using the simulation elements for the network slice.

Example 4: The computing system of example 1, further includes responsive to determining that the result of the active test indicates the network slice does not meet required service level requirements, performing an action.

Example 5: The computing system of example 1, further includes subsequent to using the network slice in the network for live network traffic: starting an active test according to the active testing configuration; and determining service level violations based on a result of the active test.

Example 6: The computing system of example 1, wherein the first and second virtualized services comprise containerized services.

Example 7: The computing system of example 1, wherein the orchestration layer comprises a Kubernetes orchestrator.

Example 8: The computing system of example 1, wherein the second virtualized services comprise at least one service selected from a group consisting of a Radio Unit (RU), a Distributed Unit (DU), and a Centralized Unit (CU), and wherein the test agent is located based on a location of the at least one service.

Example 9: The computing system of example 1, wherein the first virtualized services in the network comprise at least one service selected from a group consisting of an Access and Mobility Management Function (AMF) and a user plane function (UPF) to implement the network slice for a mobile network.

Example 10: A method includes receiving, by a computing system, a declarative testing descriptor for active testing of virtualized services in a network; obtaining, from an orchestration layer, metadata associated with a requested network slice, the network slice implemented by first virtualized services; determining, by the computing system and based on the declarative testing description and the metadata, active testing configuration for validating the requested network slice, the active testing configuration including test configuration parameters, placement of a test agent, and simulation elements to be assigned for validating the requested network slice and implemented by second virtualized services; starting an active test on the network slice using the simulation elements according to the active testing configuration; and outputting an indication of whether the result of the active test indicates the network slice meets required service level requirements.

Example 11: The method of example 10, further comprising deploying virtual Test Agents within a cluster.

Example 12: The method of examples 10 and 11, further comprising deploying a virtual Test Agent as a sidecar.

Example 13: The method of examples 10 through 12, further comprising measuring performance between nodes.

Example 14: The method of examples 10 through 13, further comprising creating services for allowing performance testing between nodes.

Example 15: The method of examples 10 through 14, further comprising deploying a test agent outside a cluster and using the test agent for testing outbound services.

Example 16: The method of examples 10 through 15, further comprising triggering healing operations in a network based on determining service level violations exist.

Example 17: The method of examples 10 through 16, wherein the computing system is part of an edge cloud system.

Example 18: A method includes receiving, by a computing system, a declarative testing descriptor for active testing of a network slice implemented by first virtualized services in a network; receiving, by the computing system and from an orchestration layer, metadata associated with the network slice; determining, by the computing system and based on the declarative testing description and the metadata, active testing configuration for testing the network slice; and starting an active test according to the active testing configuration and determining service level violations based on a result of the active test.

Example 19: The method of example 18, further includes creating second virtualized services for allowing active testing between nodes.

Example 20: The method of examples 18 through 19, wherein the first virtualized services in the network comprise at least one service selected from a group consisting of an Access and Mobility Management Function (AMF) and a user plane function (UPF) to implement the network slice for a mobile network.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. Non-transitory computer-readable media storing instructions that, when executed, cause processing circuitry to:

receive data indicative of a declarative testing descriptor for active testing of a network slice implemented by a first virtualized service of a plurality of virtualized services;

obtain, from an orchestration layer, metadata associated with objects of a cluster of the network slice implemented by the first virtualized service, wherein the metadata specifies a unique name for the first virtualized service within a namespace of the cluster managed by the orchestration layer, and wherein the objects correspond to resources within the cluster of the network slice;

provide labels in a custom resource that defines inputs of a test agent, wherein the labels are used to bind the test agent to the first virtualized service, and wherein the labels correspond to objects of the cluster of the network slice that is associated with the metadata;

determine, based on the declarative testing descriptor and the metadata, an initial active testing configuration for validating the network slice by matching the test agent to the first virtualized service based on the labels in the custom resource matching the objects of the cluster of the network slice implemented by the first virtualized service; and based on received updated metadata indicating a change to the cluster of the network slice implemented by the first virtualized service, determine, based on the declarative testing descriptor and the updated metadata, an updated active testing configuration by matching the test agent to a second virtualized service of the plurality of virtualized services based on matching the labels in the custom resource using the updated metadata.

2. The non-transitory computer-readable media of claim 1, wherein to receive the data indicative of the declarative testing descriptor, the instructions cause the processing circuitry to: receive, for each of a plurality of service types, data indicative of a service type and data indicative of a corresponding initial active testing configuration for the service type.

3. The non-transitory computer-readable media of claim 1, wherein the initial active testing configuration includes test configuration parameters, placement of the test agent, and one or more simulated elements to be assigned for validating the network slice, and wherein the instructions further cause the processing circuitry to:

based on placing the test agent according to the active testing configuration, start an active test of the network slice using the one or more simulated elements; and output an indication of whether a result of the active test indicates the network slice meets service level requirements.

4. The non-transitory computer-readable media of claim 3, wherein the instructions further cause the processing circuitry to: based on a determination that the result of the active test indicates the network slice meets service level requirements, discontinue using the one or more simulated elements for the network slice.

5. The non-transitory computer-readable media of claim 3, wherein the instructions further cause the processing circuitry to: based on a determination that the result of the active test indicates the network slice does not meet service level requirements, perform an action.

6. The non-transitory computer-readable media of claim 3, wherein the one or more simulated elements are implemented by a third virtualized service of the plurality of virtualized services and simulate one or more network functions of the network slice.

7. The non-transitory computer-readable media of claim 3, wherein to start the active test, the instructions cause the processing circuitry to: send, using the test agent and according to the initial active testing configuration, simulated network traffic and active test packets.

8. The non-transitory computer-readable media of claim 1, wherein the instructions further cause the processing circuitry to:

based on using the network slice in a network for live network traffic:

start an active test according to the initial active testing configuration or the updated active testing configuration; and determine one or more service level violations based on a result of the active test.

9. The non-transitory computer-readable media of claim 8, wherein the instructions further cause the processing circuitry to: trigger healing operations in the network based on a determination that the one or more service level violations exist.

10. The non-transitory computer-readable media of claim 1, wherein the first virtualized service comprises at least one service selected from a group consisting of an Access and Mobility Management Function (AMF) and a user plane function (UPF) to implement the network slice for a mobile network.

11. The non-transitory computer-readable media of claim 1, wherein the first virtualized service comprises one or more containerized services.

12. The non-transitory computer-readable media of claim 1, wherein the instructions further cause the processing circuitry to: create a third virtualized service for allowing active testing between nodes.

13. The non-transitory computer-readable media of claim 1, wherein the instructions further cause the processing circuitry to:

deploy the test agent outside the cluster; and use the test agent for testing outbound services.

14. A computing system comprising:

processing circuitry coupled to memory, the processing circuitry configured to:

receive data indicative of a declarative testing descriptor for active testing of a network slice implemented by a first virtualized service of a plurality of virtualized services;

obtain, from an orchestration layer, metadata associated with objects of a cluster of the network slice implemented by the first virtualized service, wherein the metadata specifies a unique name for the first virtualized service within a namespace of the cluster managed by the orchestration layer, and wherein the objects correspond to resources within the cluster of the network slice;

provide labels in a custom resource that defines inputs of a test agent, wherein the labels are used to bind the test agent to the first virtualized service, and wherein the labels correspond to objects of the cluster of the network slice that is associated with the metadata;

determine, based on the declarative testing descriptor and the metadata, an initial active testing configuration for validating the network slice by matching the test agent to the first virtualized service based on the labels in the custom resource matching the objects of the cluster of the network slice implemented by the first virtualized service; and based on received updated metadata indicating a change to the cluster of the network slice implemented by the first virtualized service, determine, based on the declarative testing descriptor and the updated metadata, an updated active testing configuration by matching the test agent to a second virtualized service of the plurality of virtualized services based on matching the labels in the custom resource using the updated metadata.

15. The computing system of claim 14, wherein the processing circuitry is further configured to:

based on using the network slice in a network for live network traffic:

start an active test according to the initial active testing configuration or the updated active testing configuration; and determine one or more service level violations based on a result of the active test.

16. The computing system of claim 15, wherein the processing circuitry is further configured to: trigger one or more healing operations in the network based on the determination of the one or more service level violations.

17. The computing system of claim 14, wherein the first virtualized service comprises at least one service selected from a group consisting of an Access and Mobility Management Function (AMF) and a user plane function (UPF) to implement the network slice for a mobile network.

18. The computing system of claim 14, wherein the computing system is part of an edge cloud system.

19. A method comprising:

receiving, by a computing system, data indicative of a declarative testing descriptor for active testing of a network slice implemented by a first virtualized service of a plurality of virtualized services;

obtaining, by the computing system and from an orchestration layer, metadata associated with objects of a cluster of the network slice implemented by the first virtualized service, wherein the metadata specifies a unique name for the first virtualized service within a namespace of the cluster managed by the orchestration layer, and wherein the objects correspond to resources within the cluster of the network slice;

providing, by the computing system, labels in a custom resource that defines inputs of a test agent, wherein the labels are used to bind the test agent to the first virtualized service, and wherein the labels correspond to objects of the cluster of the network slice that is associated with the metadata;

determining, by the computing system and based on the declarative testing descriptor and the metadata, an initial active testing configuration for validating the network slice by matching the test agent to the first virtualized service based on the labels in the custom resource matching the objects of the cluster of the network slice implemented by the first virtualized service; and based on received updated metadata indicating a change to the cluster of the network slice implemented by the first virtualized service, determining, by the computing system, based on the declarative testing descriptor and the updated metadata, an updated active testing configuration by matching the test agent to a second virtualized service of the plurality of virtualized services based on matching the labels in the custom resource using the updated metadata.

20. The method of claim 19, further comprising:

based on using the network slice in a network for live network traffic:

starting an active test according to the initial active testing configuration or the updated active testing configuration, and determining one or more service level violations based on a result of the active test; and triggering one or more healing operations in the network based on the determination of the one or more service level violations.

* * * * *